(12) United States Patent
Shin et al.

(10) Patent No.: US 12,010,689 B2
(45) Date of Patent: Jun. 11, 2024

(54) METHOD AND SYSTEM FOR TRANSMITTING AND RECEIVING DATA IN NARROW BAND WIRELESS COMMUNICATION SYSTEM

(71) Applicant: LG ELECTRONICS INC., Seoul (KR)

(72) Inventors: Seokmin Shin, Seoul (KR); Changhwan Park, Seoul (KR); Joonkui Ahn, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 453 days.

(21) Appl. No.: 17/280,801

(22) PCT Filed: Sep. 27, 2019

(86) PCT No.: PCT/KR2019/012670
§ 371 (c)(1),
(2) Date: Mar. 26, 2021

(87) PCT Pub. No.: WO2020/067820
PCT Pub. Date: Apr. 2, 2020

(65) Prior Publication Data
US 2022/0015089 A1  Jan. 13, 2022

Related U.S. Application Data

(60) Provisional application No. 62/767,443, filed on Nov. 14, 2018.

(30) Foreign Application Priority Data

Sep. 27, 2018  (KR) .................. 10-2018-0115085
Oct. 5, 2018  (KR) .................. 10-2018-0119334
(Continued)

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1819* (2013.01); *H04L 1/1896* (2013.01); *H04W 24/08* (2013.01);
(Continued)

(58) Field of Classification Search
CPC ... H04W 72/21; H04W 24/08; H04W 52/365; H04W 72/53; H04W 52/362;
(Continued)

(56) References Cited

U.S. PATENT DOCUMENTS

2017/0013610 A1  1/2017  Lee et al.
2021/0352690 A1*  11/2021  Shin ............ H04L 5/0053
(Continued)

FOREIGN PATENT DOCUMENTS

CN  107734693  2/2018
CN  107926008  4/2018
(Continued)

OTHER PUBLICATIONS

Huawei et al: "Feature lead summary of Support for transmission in preconfigured UL resources", 3GPP Draft; R1-1809571, 3GPP, vol. RAN WG1, No. Gothenburg, Sweden; Aug. 22, 2018, XP051516932 (Year: 2018).*
(Continued)

*Primary Examiner* — Mehmood B. Khan
(74) *Attorney, Agent, or Firm* — LEE, HONG, DEGERMAN, KANG & WAIMEY

(57) ABSTRACT

Disclosed is a method for transmitting and receiving data between a user equipment (UE) and a base station in a narrowband wireless communication system. Specifically,
(Continued)

the method includes transmitting, to the UE, a preconfigured uplink (UL) resource (PUR) configuration via RRC signalling, receiving, from the UE, uplink data on the PUR when the UE is in an idle mode, and transmitting, to the UE, a feedback for the uplink data, wherein the feedback is configured to be transmitted on an NPDCCH after a specific time has passed from the PUR reception.

8 Claims, 26 Drawing Sheets

(30) Foreign Application Priority Data

Nov. 2, 2018 (KR) .......................... 10-2018-0133988
Nov. 12, 2018 (KR) .......................... 10-2018-0138057
Nov. 14, 2018 (KR) .......................... 10-2018-0140246

(51) Int. Cl.
| | | |
|---|---|---|
| *H04L 1/1867* | (2023.01) | |
| *H04W 24/08* | (2009.01) | |
| *H04W 72/23* | (2023.01) | |
| *H04W 72/53* | (2023.01) | |
| *H04W 74/08* | (2009.01) | |
| *H04W 74/0833* | (2024.01) | |

(52) U.S. Cl.
CPC .......... *H04W 72/23* (2023.01); *H04W 72/53* (2023.01); *H04W 74/0841* (2013.01)

(58) Field of Classification Search
CPC .......... H04W 74/0841; H04W 52/262; H04W 72/23; H04L 1/08; H04L 1/1896; H04L 5/0094; H04L 1/1864; H04L 1/1861; H04L 1/1819; H04L 5/0044; H04L 5/0007; H04L 5/0055; H04L 5/0053; H04L 1/0025; H04L 27/2602; H04L 5/0048; H04L 5/0051; H04L 1/1822; Y02D 30/70
See application file for complete search history.

(56) References Cited

U.S. PATENT DOCUMENTS

| | | | |
|---|---|---|---|
| 2022/0015089 A1* | 1/2022 | Shin ...................... | H04W 72/21 |
| 2022/0046661 A1* | 2/2022 | Jeon ...................... | H04W 72/23 |
| 2022/0116881 A1* | 4/2022 | Shin ...................... | H04L 1/1861 |
| 2022/0418029 A1* | 12/2022 | Tirronen ............... | H04W 72/23 |

FOREIGN PATENT DOCUMENTS

| | | |
|---|---|---|
| KR | 1020110111269 | 10/2011 |
| WO | 2018080758 | 5/2018 |
| WO | 2018170516 | 9/2018 |
| WO | WO-2018170516 A2 * | 9/2018 ............ H04W 24/04 |

OTHER PUBLICATIONS

European Patent Office Application Serial No. 19864731.5, Search Report dated Oct. 28, 2021, 14 pages.
ZTE, "Further consideration on early data transmission in eFeMTC and FeNB-IoT," 3GPP TSG-RAN WG2 Meeting#99, R2-1710987, Oct. 2017, 9 pages.
Nokia et al., "Preconfigured Grant for Uplink transmission," 3GPP TSG RAN WG1 Meeting #94, R1-1808440, Aug. 2018, 4 pages.
LG Electronics, "Discussion on preconfigured UL resources in NB-IoT," 3GPP TSG RAN WG1 Meeting #94bis, R1-1810241, Oct. 2018, 7 pages.
3rd Generation Partnership Project (3GPP), "LTE; Evolved Universal Terrestrial Radio Access (E-UTRA) and Evolved Packet Core (EPC); User Equipment (UE) conformance specification; Part 3: Test suites (3GPP TS 36.523-3 version 15.0.0 Release 15)," ETSI TS 136 523-3 V15.0.0, Aug. 2018, 889 pages.
Huawei et al., "Feature lead summary of Support for transmission in preconfigured UL resources," 3GPP TSG RAN WG1 Meeting #94, R1-1809571, Aug. 2018, 11 pages.
LG Electronics, "Discussion on preconfigured UL resources in MTC," 3GPP TSG RAN WG1 Meeting #94, R1-1808466, Aug. 2018, 5 pages.
Nokia, Nokia Shanghai Bell, "Transmission in preconfigured UL resources," 3GPP TSG-RAN WG1 #94, R1-1808431, Aug. 2018, 4 pages.
MediaTek Inc., "Remaining issues for Rel-14 NB-IoT 2 HARQ processes" 3GPP TSG-RAN WG1 #88, R1-1702750, Feb. 2017, 3 pages.
MediaTek Inc., "Discussion on two HARQ processes," 3GPP TSG-RAN WG1 #86, R1-1610020, Oct. 2016, 3 pages.
ZTE, "Support for transmission in preconfigured UL resources for MTC," 3GPP TSG-RAN WG1 #94, R1-1808632, Aug. 2018, 4 pages.
PCT International Application No. PCT/KR2019/012670, International Search Report dated Jan. 23, 2020, 5 pages.
The State Intellectual Property Office of the People's Republic of China Application Serial No. 201980071196.4, Notice of Allowance dated Jun. 16, 2023, 6 pages.
CATT, "Remaining issues on evaluation methodology for self-evaluation," 3GPP TSG RAN Meeting #94, R1-1808413, Aug. 2018, 9 pages.
Sierra Wireless, "Pre-configured UL Resources Design Considerations," 3GPP TSG RAN WG1 Meeting 94, R1-1808358, Aug. 2018, 5 pages.
Sierra Wireless, "LTE-M Preconfigured UL Resources Summary," 3GPP TSG RAN WG1 Meeting 94, R1-1809528, Aug. 2018, 4 pages.

* cited by examiner

METHOD AND SYSTEM FOR TRANSMITTING AND RECEIVING DATA IN NARROW BAND WIRELESS COMMUNICATION SYSTEM

CROSS-REFERENCE TO RELATED APPLICATIONS

This application is the National Stage filing under 35 U.S.C. 371 of International Application No. PCT/KR2019/012670, filed on Sep. 27, 2019, which claims the benefit of earlier filing date and right of priority to Korean Application Nos. 10-2018-0115085, filed on Sep. 27, 2018, 10-2018-0119334, filed on Oct. 5, 2018, 10-2018-0133988, filed on Nov. 2, 2018, 10-2018-0138057, filed on Nov. 12, 2018, 10-2018-0140246, filed Nov. 14, 2018, and also claims the benefit of U.S. Provisional Application Ser. No. 62/767,443, filed on Nov. 14, 2018, the contents of which are all incorporated by reference herein in their entirety.

TECHNICAL FIELD

The present disclosure relates to a method and system for transmitting and receiving a feedback in a narrowband (NB) wireless communication system.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure provides a method for efficiently transmitting and receiving data in a narrowband (NB) wireless communication system.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect, there is provided a method for transmitting, by a base station, data to a user equipment (UE) in a narrowband (NB) wireless communication system, the method comprising transmitting, to the UE, a preconfigured uplink (UL) resource (PUR) configuration via RRC signalling; when the UE is in an idle mode, receiving, from the UE, uplink data on the PUR; and transmitting, to the UE, a feedback for the uplink data, wherein the feedback is configured to be transmitted on an NPDCCH after a specific time has passed from the PUR reception.

The specific time may be a specific number of at least one subframe.

The specific number may be four.

The method may further comprise monitoring a feedback window on a search space for transmitting the feedback, and indicating, to the UE, stopping the monitoring based on whether or not DCI including the feedback is received on the feedback window.

The method may further comprise configuring to transmit, to the UE, a response on other second field excluding a first field required to indicate a PUR retransmission from a plurality of fields included in a UL grant.

Advantageous Effects

According to the present disclosure, a user equipment (UE) of a narrowband wireless communication system can minimize an amount of battery consumed to receive ACK/NACK for data transmitted to a base station.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

MODE FOR INVENTION

Figure 1:
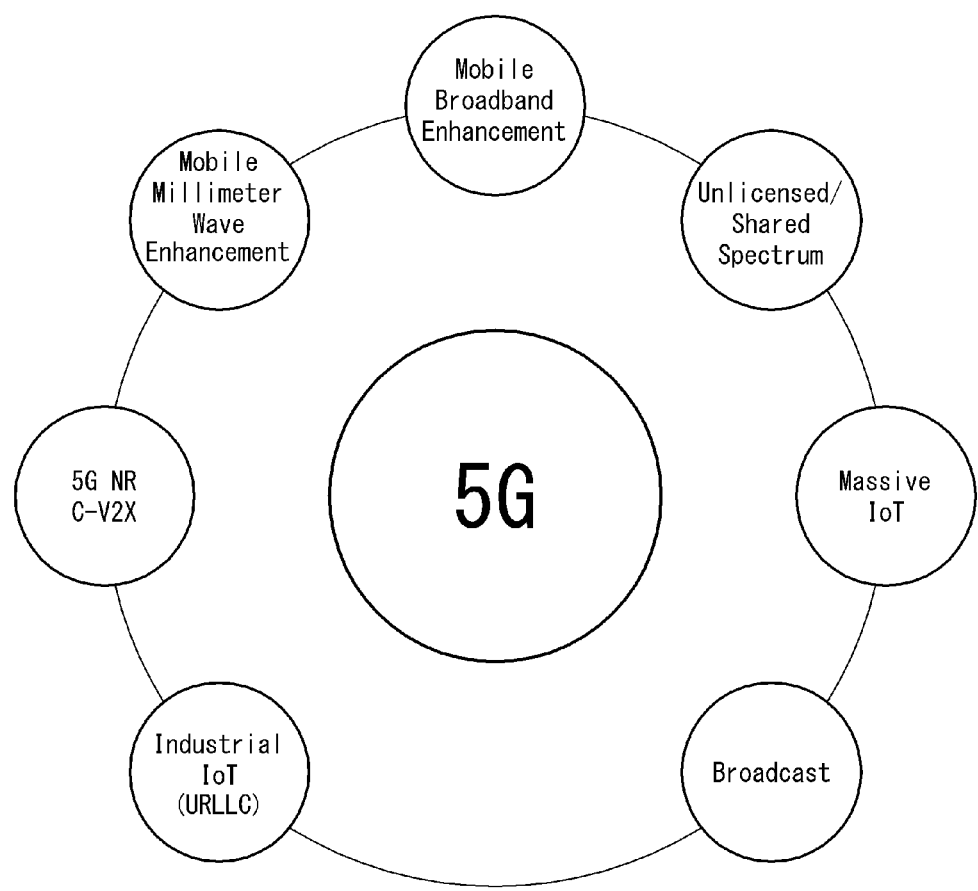
FIG. 1 illustrates an example of 5G scenario to which the present disclosure is applicable.

Reference will now be made in detail to implementations of the disclosure, examples of which are illustrated in the accompanying drawings. A detailed description to be disclosed below together with the accompanying drawing is to describe exemplary implementations of the present disclosure and not to describe a unique implementation for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine type communication (MTC) device, a machine-to-machine (M2M) device, a device-to device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without radio service (GPRS)/enhanced data rates for GSM evolution (EDGE).

The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using EUTRA, adopts the OFDMA in the downlink and the SC-FDMA in the uplink. LTE-A (advanced) is the evolution of 3GPP LTE.

Further, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Implementations of the present disclosure can be supported by standard documents disclosed in at least one of IEEE 802, 3GPP, and 3GPP2 which are the wireless access systems. That is, steps or parts in implementations of the present disclosure which are not described to clearly show the technical spirit of the present disclosure can be described by the standard document.

3GPP LTE/LTE-A/New RAT (NR) is primarily described for clear description, but technical features of the present disclosure are not limited thereto.

In the present disclosure, 'A and/or B' may be interpreted in the same sense as 'including at least one of A or B'.

Below, we describe an example of 5G use scenarios in which the method proposed in this specification may apply.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive occasion in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

5G Scenario

FIG. 1 illustrates an example of 5G scenario to which the present disclosure is applicable.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive occasion in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of the training of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving or Autonomous-Driving>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

<Extended Reality (XR)>

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

Figure 2:
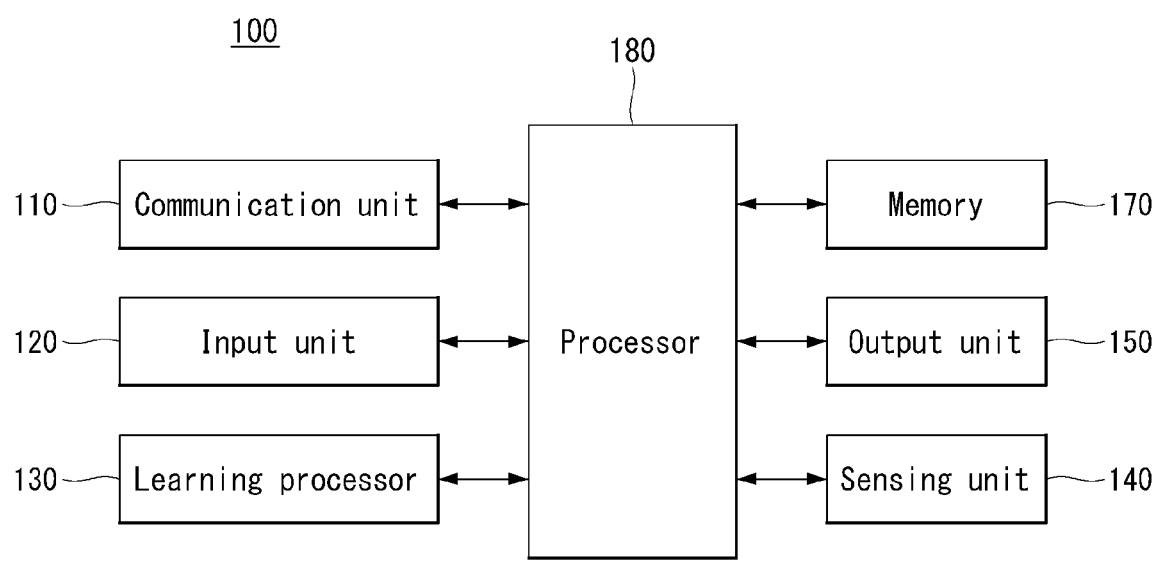
FIG. 2 illustrates an AI device 100 according to an embodiment of the present disclosure.

FIG. 2 illustrates an AI device 100 according to an embodiment of the present disclosure.

The AI device 100 may be implemented as a stationary device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, digital signage, a robot, and a vehicle.

Referring to FIG. 2, a terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100e or an AI server 200 using wired/wireless communication technologies. For example, the communication unit 110 may transmit and receive sensor information, user input, a learning model, or a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, and near field communication (NFC).

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, a lidar, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 180 may control at least some of the elements of the AI device 100 in order to execute an application program stored in the memory 170. Moreover, the processor 180 may combine and drive two or more of the elements included in the AI device 100 in order to execute the application program.

Figure 3:
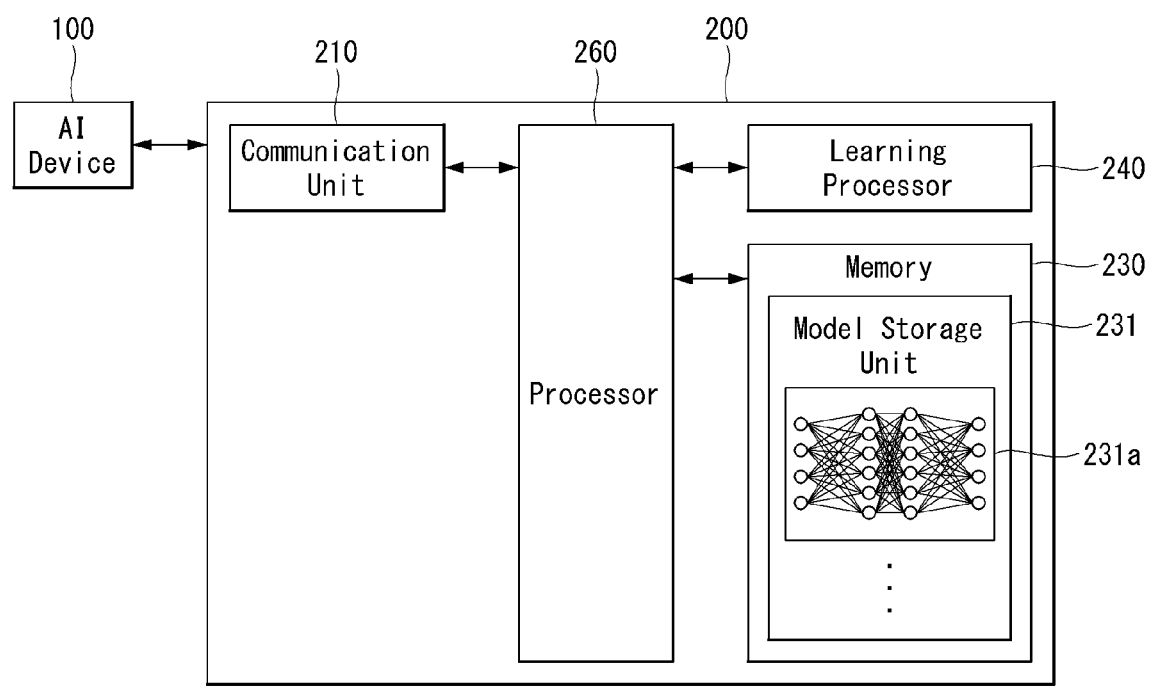
FIG. 3 illustrates an AI server 200 according to an embodiment of the present disclosure.

FIG. 3 illustrates an AI server 200 according to an embodiment of the present disclosure.

Referring to FIG. 3, the AI server 200 may mean an apparatus which trains an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 4:
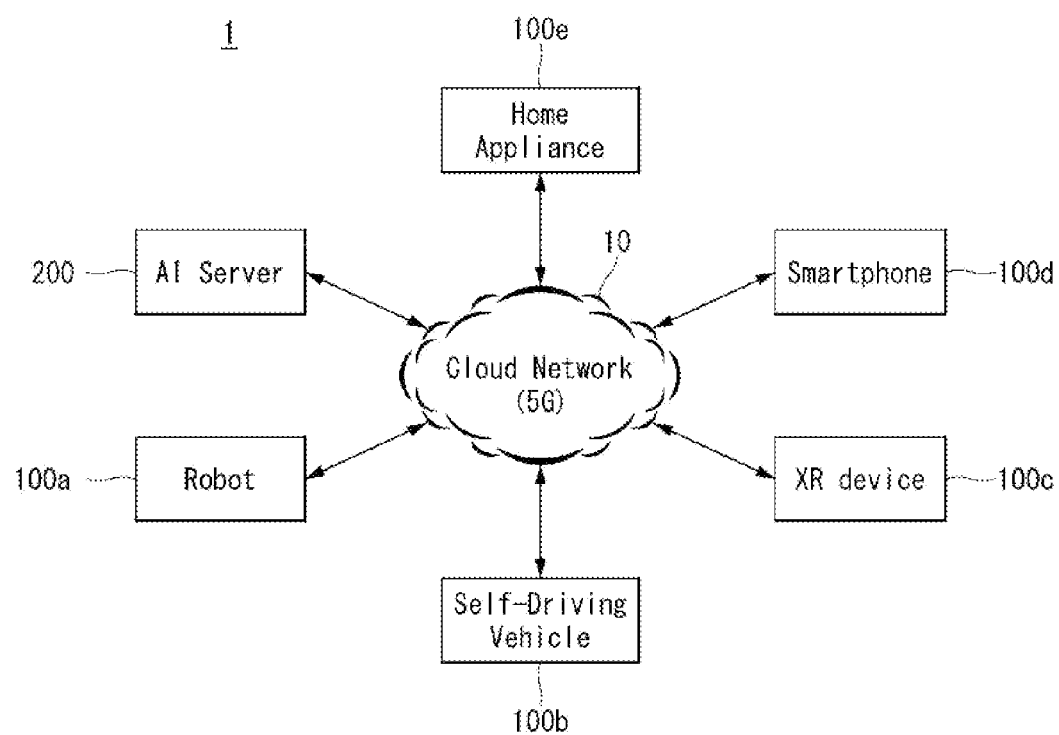
FIG. 4 illustrates an AI system 1 according to an embodiment of the present disclosure.

FIG. 4 illustrates an AI system 1 according to an embodiment of the present disclosure.

Referring to FIG. 4, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 4 may be considered to be detailed embodiments of the AI device 100 shown in FIG. 2.

<AI+Robot>

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among a lidar, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowerpot and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

<AI+Self-Driving>

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

<AI+XR>

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

<AI+Robot+Self-Driving>

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI+Robot+XR>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

<AI+Self-Driving+XR>

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Overview of NB-IoT

NB-IoT technology is described below.

Overview of System

Figure 5:
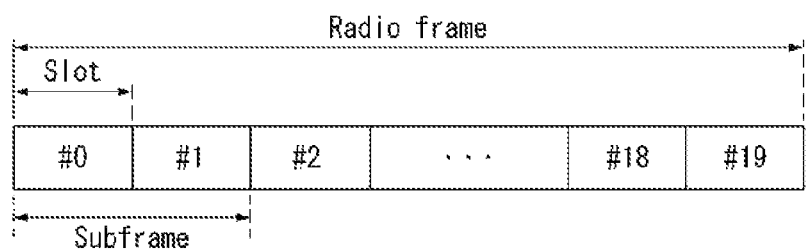
FIG. 5 illustrates an example of LTE radio frame structure.

FIG. 5 illustrates an example of LTE radio frame structure.

In FIG. 5, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame, or the number of slots included in the subframe, or the number of OFDM symbols included in the slot may be modified in various manners.

Figure 6:
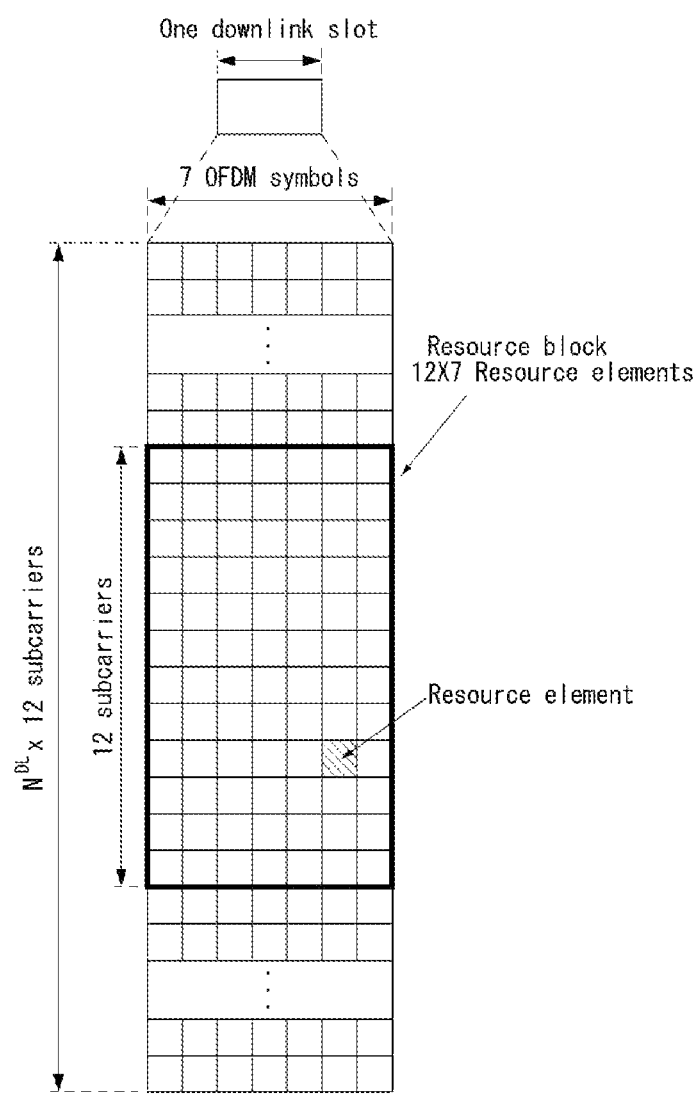
FIG. 6 illustrates an example of a resource grid for a downlink slot.

FIG. 6 illustrates an example of a resource grid for a downlink slot.

In FIG. 6, a downlink slot includes a plurality of OFDM symbols in time domain. The present disclosure is described herein by way of example that one downlink slot includes 7 OFDM symbols, and one resource block (RB) includes 12 subcarriers in frequency domain. However, the present disclosure is not limited thereto. Each element on a resource grid is referred to as a resource element (RE). One RB includes 12×7 REs. The number NDL of RBs included in the downlink slot depends on a downlink transmit bandwidth. The structure of an uplink slot may be same as the structure of the downlink slot.

Figure 7:
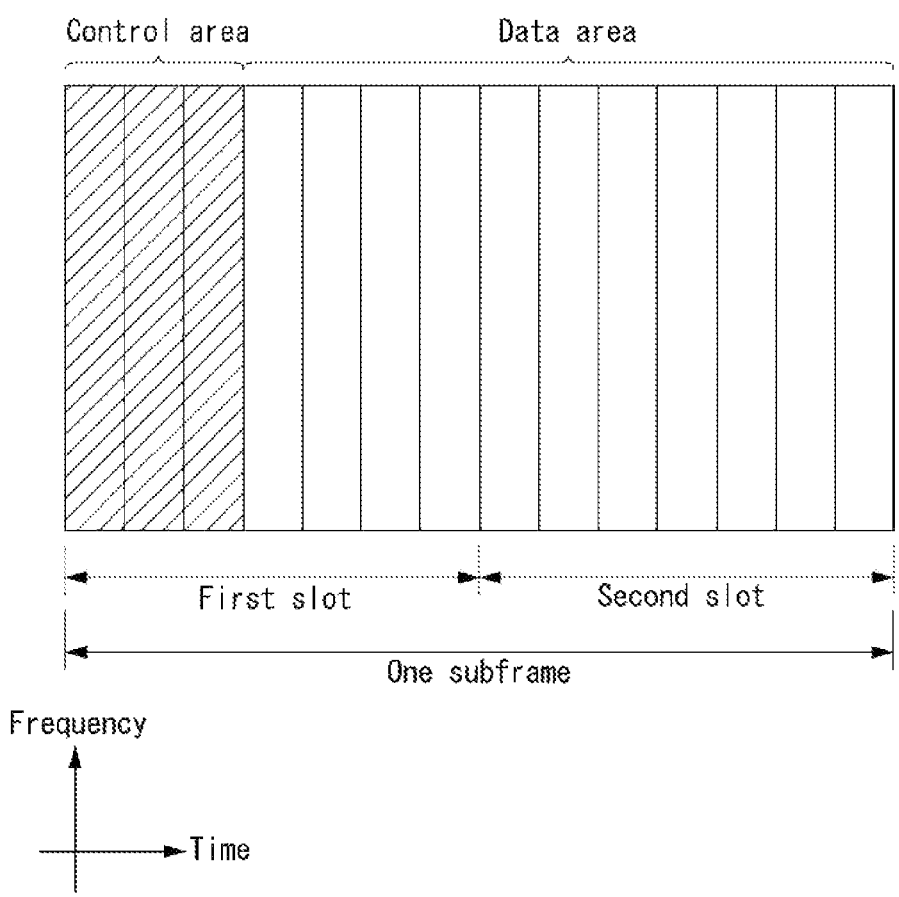
FIG. 7 illustrates an example of a downlink subframe structure.

FIG. 7 illustrates an example of a downlink subframe structure.

In FIG. 7, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted on the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. For another example, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response to transmission of a random access preamble of the UE, a random access-RNTI (RA-RNTI) can be masked to the CRC.

Figure 8:
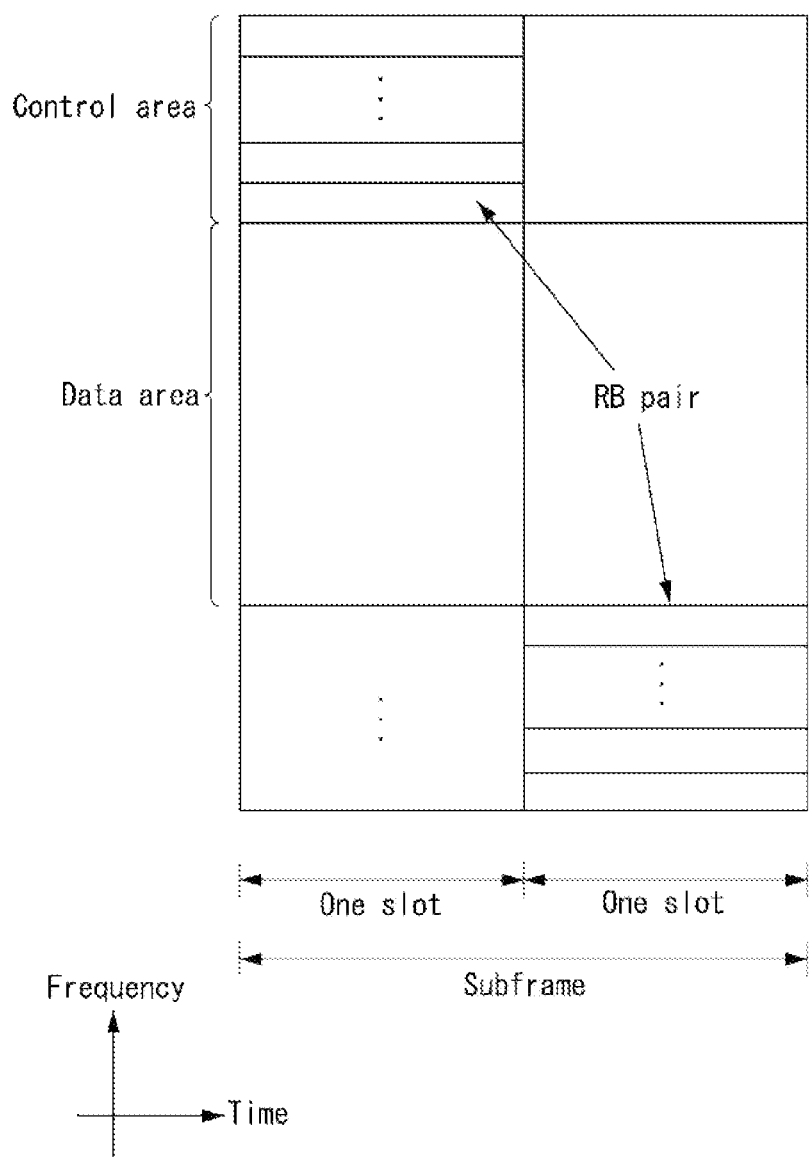
FIG. 8 illustrates an example of an uplink subframe structure.

FIG. 8 illustrates an example of an uplink subframe structure.

In FIG. 8, an uplink subframe can be divided into a control region and a data region in a frequency domain. The control region is allocated a physical uplink control channel (PUCCH) for carrying uplink control information. The data region is allocated a physical uplink shared channel (PUSCH) for carrying user data. To maintain a single carrier property, one UE does not transmit the PUCCH and the PUSCH at the same time. The PUCCH for one UE is allocated to an RB pair in a subframe. RBs belonging to the RB pair each occupy different subcarriers on two slots. This is called that the RB pair allocated to the PUCCH is frequency-hopped in a slot boundary.

Hereinafter, a frame structure in LTE is described in more detail.

Throughout LTE specification, unless otherwise noted, the size of various fields in the time domain is expressed as a number of time units $T_s=1/(15000 \times 2048)$ sec.

Downlink and uplink transmissions are organized into radio frames with $T_f=307200 \times T_s=10$ ms duration. Two radio frame structures are supported.

Type 1: applicable to FDD
Type 2: applicable to TDD

Frame Structure Type 1

Frame structure type 1 is applicable to both full duplex and half duplex FDD. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots, where subframe i consists of slots 2i and 2i+1.

For FDD, 10 subframes are available for downlink transmission, and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Figure 9:
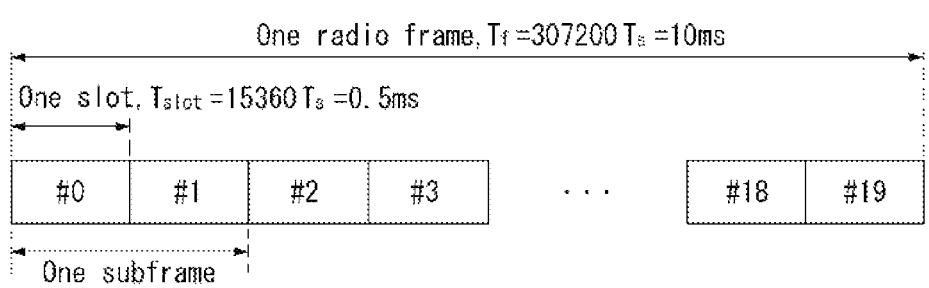
FIG. 9 illustrates an example of frame structure type 1.

FIG. 9 illustrates an example of frame structure type 1.

Frame Structure Type 2

Frame structure type 2 is applicable to TDD. Each radio frame of length $T_f=307200 \times T_s=10$ ms consists of two half-frames of length $15360 \cdot T_s=0.5$ ms each. Each half-frame consists of five subframes of length $30720 \cdot T_s=1$ ms. The supported uplink-downlink configurations are listed in Table 2, where for each subframe in a radio frame, "D" denotes the subframe is reserved for downlink transmissions, "U" denotes the subframe is reserved for uplink transmissions, and "S" denotes a special subframe with the three fields of a downlink pilot time slot (DwPTS), a guard period (GP), and an uplink pilot time slot (UpPTS). The length of DwPTS and UpPTS is given by Table 1 subject to the total length of DwPTS, GP and UpPTS being equal to $30720 \cdot T_s=1$ ms. Each subframe i is defined as two slots, 2i and 2i+1 of length $T_{slot}=15360 \cdot T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

Figure 10:
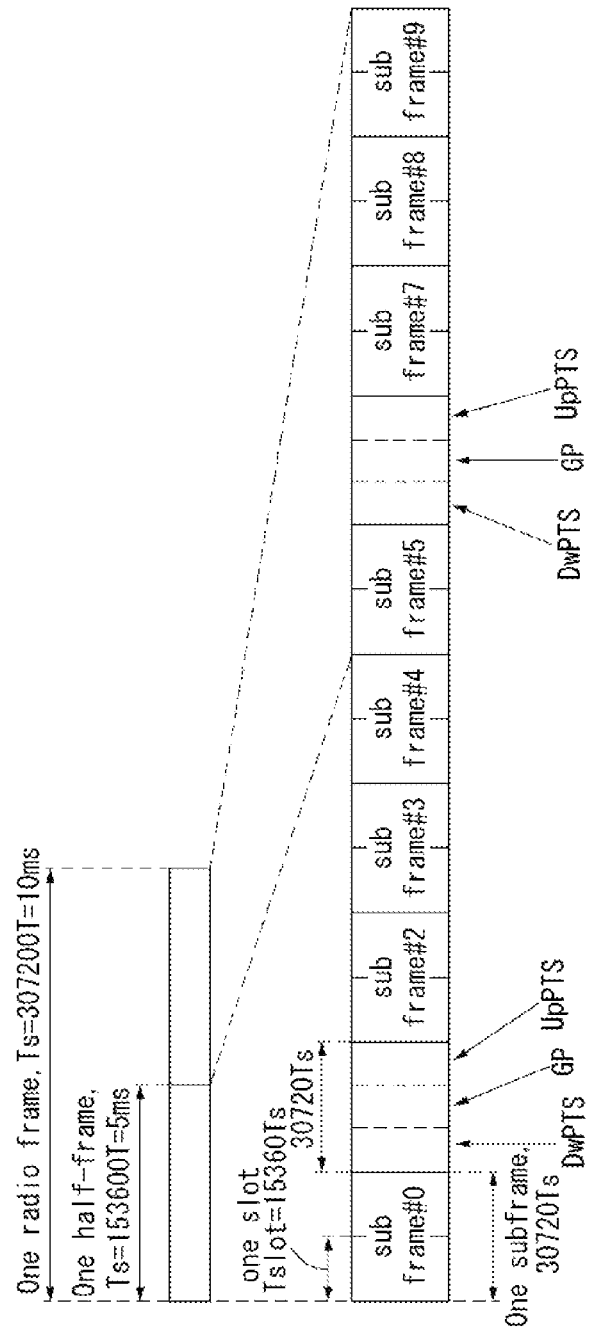
FIG. 10 illustrates another example of frame structure type 2.

FIG. 10 illustrates another example of frame structure type 2.

Table 1 represents an example of configuration of a special subframe.

TABLE 1

| Special subframe configuration | normal cyclic prefix in downlink | | | extended cyclic prefix in downlink | | |
|---|---|---|---|---|---|---|
| | | UpPTS | | | UpPTS | |
| | DwPTS | normal cyclic prefix in uplink | extended cyclic prefix in uplink | DwPTS | normal cyclic prefix in uplink | extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 represents an example of uplink-downlink configuration.

TABLE 2

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

NB-IoT

Narrowband (NB)-Internet of Things (IoT) is the standard for supporting low complexity and low cost devices and is defined to perform only relatively simple operations as compared to the existing LTE devices. NB-IoT follows a basic structure of the LTE and operates based on the contents defined below. If NB-IoT reuses channels or signals of LTE, NB-IoT may follow the standard defined in the existing LTE.

Uplink

The following narrowband physical channels are defined.
Narrowband Physical Uplink Shared Channel (NPUSCH)
Narrowband Physical Random Access Channel (NPRACH)

The following uplink narrowband physical signals are defined.
Narrowband demodulation reference signal From a subcarrier perspective, an uplink bandwidth $N_{sc}^{UL}$ and a slot duration $T_{slot}$ are given by the following Table 3.

Table 3 represents an example of NB-IoT parameters.

TABLE 3

| Subcarrier spacing | $N_{sc}^{UL}$ | $T_{slot}$ |
|---|---|---|
| $\Delta f$ = 3.75 kHz | 48 | 61440 · $T_s$ |
| $\Delta f$ = 15 kHz | 12 | 15360 · $T_s$ |

A single antenna port p=0 is used for all the uplink transmissions.

Resource Unit

A resource unit is used to explain mapping of NPUSCH and resource elements. The resource unit is defined by consecutive symbols $N_{symb}^{UL} N_{slots}^{UL}$ in a time domain, and is defined by consecutive subcarriers $N_{sc}^{RU}$ in a frequency domain, where $N_{sc}^{RU}$ and $N_{symb}^{UL}$ are given by the following Table 4.

Table 4 represents an example of supported combinations of $N_{sc}^{RU}$, $N_{slots}^{UL}$ slots and $N_{symb}^{UL}$.

TABLE 4

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
| | 15 kHz | 1 | 16 | |
| | | 3 | 8 | |
| | | 6 | 4 | |
| | | 12 | 2 | |
| 2 | 3.75 kHz | 1 | 4 | |
| | 15 kHz | 1 | 4 | |

Narrowband Physical Uplink Shared Channel (NPUSCH)

A narrowband physical uplink shared channel is supported by two formats:
NPUSCH format 1 used to carry the UL-SCH
NPUSCH format 2 used to carry uplink control information Scrambling is done according to clause 5.3.1 of TS 36.211. The scrambling sequence generator is initialized with $c_{ini} = n_{RNTI} \cdot 2^{14} + n_f \bmod 2 \cdot 2^{13} + \lfloor n_s/2 \rfloor + N_{ID}^{Ncell}$, where $n_s$ is the first slot of the transmission of the codeword. In case of NPUSCH repetitions, the scrambling sequence is reinitialized according to the above formula after every $M_{identical}^{NPUSCH}$ transmission of the codeword with $n_s$ and $n_f$ set to the first slot and the frame, respectively, used for the transmission of the repetition. The quantity $M_{identical}^{PUSCH}$ is given by clause 10.1.3.6 in TS 36.211.

Table 5 specifies the modulation mappings applicable for the narrowband physical uplink shared channel.

TABLE 5

| NPUSCH format | $N_{sc}^{RU}$ | Modulation scheme |
|---|---|---|
| 1 | 1 | BPSK, QPSK |
| | >1 | QPSK |
| 2 | 1 | BPSK |

NPUSCH can be mapped to one or more than one resource units, $N_{RU}$, as given by clause of 3GPP TS 36.213, each of which is transmitted $M_{rep}^{PUSCH}$ times.

The block of complex-valued symbols z(0), . . . , $z(M_{rep}^{NPUSCH}-1)$ is multiplied with the amplitude scaling factor $\beta_{NPUSCH}$ in order to conform to the transmit power $P_{NPUSCH}$ specified in 3GPP TS 36.213, and mapped in sequence starting with z(0) to subcarriers assigned for transmission of NPUSCH. The mapping to resource elements (k, l) corresponding to the subcarriers assigned for transmission and not used for transmission of reference signals, is in increasing order of first the index k, then the index l, starting with the first slot in the assigned resource unit.

After mapping to $N_{slots}$ slots, the $N_{slots}$ slots are repeated $M_{identical}^{NPUSCH}-1$ additional times, before continuing the mapping of z(•) to the following slot, where the following Equation 1 is repeated until the slots have been transmitted.

$$M_{identical}^{NPUSCH} = \begin{cases} \min(\lceil M_{rep}^{NPUSCH}/2 \rceil, 4) & N_{sc}^{RU} > 1 \\ 1 & N_{sc}^{RU} = 1 \end{cases} \quad \text{[Equation 1]}$$

$$N_{slots} = \begin{cases} 1 & \Delta f = 3.75 \text{ kHz} \\ 2 & \Delta f = 15 \text{ kHz} \end{cases}$$

After transmissions and/or postponements due to NPRACH of 256·30720$T_s$ time units, a gap of 40·30720$T_s$ time units is inserted where the NPUSCH transmission is postponed. The portion of a postponement due to NPRACH which coincides with a gap is counted as part of the gap.

When higher layer parameter npusch-AllSymbols is set to false, resource elements in SC-FDMA symbols overlapping with a symbol configured with SRS according to srs-SubframeConfig are counted in the NPUSCH mapping but not used for transmission of the NPUSCH. When higher layer parameter npusch-AllSymbols is set to true, all symbols are transmitted.

Uplink Control Information on NPUSCH without UL-SCH Data

The one bit information of HARQ-ACK $o_0^{ACK}$ is coded according to Table 15, where for a positive acknowledgement $o_0^{ACK}=1$ and for a negative acknowledgement $o_0^{ACK}=0$.

Table 6 represents an example of HARQ-ACK code words.

TABLE 6

| HARQ-ACK $\langle o_0^{ACK} \rangle$ | HARQ-ACK $\langle b_0, b_1, b_2, \ldots, b_{15} \rangle$ |
|---|---|
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |

Power Control

The UE transmit power for NPUSCH transmission in NB-IoT UL slot i for the serving cell is given by the following Equations 2 and 3.

If the number of repetitions of the allocated NPUSCH RUs is greater than 2, $$P_{NPUSCH,c}(i) = P_{CMAX,c}(i) \text{ [dBm]} \quad \text{[Equation 2]}$$

otherwise, $$P_{NPUSCH,c}(i) = \min \begin{Bmatrix} P_{CMAX,c}(i), \\ 10\log_{10}(M_{NPUSCH,c}(i)) + P_{O\_NPUSCH,c}(j) + \alpha_c(j) \cdot PL_c \end{Bmatrix}$$

[dBm] [Equation 3]

where, $P_{CMAX,c}(i)$ is the configured UE transmit power defined in 3GPP TS 36.101 in NB-IoT UL slot i for serving cell c.

$P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided by higher layers for j=1 and for serving cell c, where j∈{1,2}. For NPUSCH (re)transmissions corresponding to a dynamic scheduled grant then j=1 and for NPUSCH (re)transmissions corresponding to the random access response grant then j=2.

$P_{O\_UE\_NPUSCH,c}(2)=0$ and $P_{O\_NORMINAL\_NPUSCH,c}(2)=P_{O\_PRE}+\Delta_{PREAMBLE\_Msg3}$, where the parameter preamble-InitialReceivedTargetPower $P_{O\_PRE}$ and $\Delta_{PREAMBLE\_Msg3}$ are signalled from higher layers for serving cell c.

For j=1, for NPUSCH format 2, $\alpha_c(j)=1$; for NPUSCH format 1, $\alpha_c(j)$ is provided by higher layers for serving cell c. For j=2, $\alpha_c(j)=1$.

$PL_c$ is the downlink path loss estimate calculated in the UE for serving cell c in dB and $PL_c$=nrs-Power+nrs-PowerOffsetNonAnchor—higher layer filtered NRSRP, where nrs-Power is provided by higher layers and subclause 16.2.2 in 3GPP 36.213, nrs-powerOffsetNonAnchor is set to zero if it is not provided by higher layers and NRSRP is defined in 3GPP TS 36.214 for serving cell c and the higher layer filter configuration is defined in 3GPP TS 36.331 for serving cell c.

If the UE transmits NPUSCH in NB-IoT UL slot i for serving cell c, power headroom is computed using the following Equation 4.

$$PH_c(i) = P_{CMAX,c}(i) - \{P_{O\_NPUSCH,c}(l) + \alpha_c(l) \cdot PL_c\} \text{ [db]} \quad \text{[Equation 4]}$$

UE Procedure for Transmitting Format 1 NPUSCH

A UE, upon detection on a given serving cell of a NPDCCH with DCI format N0 ending in NB-IoT DL subframe n intended for the UE, performs, at the end of n+$k_0$ DL subframe, a corresponding NPUSCH transmission using NPUSCH format 1 in N consecutive NB-IoT UL slots $n_i$ with i=0, 1, . . . , N−1 according to the NPDCCH information, where subframe n is the last subframe in which the NPDCCH is transmitted and is determined from the starting subframe of NPDCCH transmission and the DCI subframe repetition number field in the corresponding DCI, and $N=N_{Rep}N_{RU}N_{slots}^{UL}$, where the value of $N_{Rep}$ is determined by the repetition number field in the corresponding DCI, the value of $N_{RU}$ is determined by the resource assignment field in the corresponding DCI, and the value of $N_{slots}^{UL}$ is the number of NB-IoT UL slots of the resource unit corresponding to the allocated number of subcarriers in the corresponding DCI.

$n_0$ is the first NB-IoT UL slot starting after the end of subframe n+$k_0$.

The value of $k_0$ is determined by the scheduling delay field ($I_{Delay}$) in the corresponding DCI according to Table 7.

Table 7 represents an example of $k_0$ for DCI format N0.

TABLE 7

| $I_{Delay}$ | $k_0$ |
|---|---|
| 0 | 8 |
| 1 | 16 |
| 2 | 32 |
| 3 | 64 |

The resource allocation information in uplink DCI format N0 for NPUSCH transmission indicates to a scheduled UE.

a set of contiguously allocated subcarriers ($n_{sc}$) of a resource unit determined by the subcarrier indication field in the corresponding DCI, a number of resource units ($N_{RU}$) determined by the resource assignment field in the corresponding DCI according to Table 9, a repetition number ($N_{Rep}$) determined by the repetition number field in the corresponding DCI according to Table 10.

The subcarrier spacing Δf of NPUSCH transmission is determined by the uplink subcarrier spacing field in the narrowband random access response grant according to subclause 16.3.3 in 3GPP TS 36.213.

For NPUSCH transmission with subcarrier spacing Δf=3.75 kHz, $n_{sc}=I_{SC}$, where $I_{SC}$ is the subcarrier indication field in the DCI.

For NPUSCH transmission with subcarrier spacing Δf=15 kHz, the subcarrier indication field ($I_{SC}$) in the DCI determines the set of contiguously allocated subcarriers ($n_{sc}$) according to Table 8.

Table 8 represents an example of allocated subcarriers for NPUSCH with Δf=15 kHz.

TABLE 8

| Subcarrier indication field ($I_{sc}$) | Set of Allocated subcarriers ($n_{sc}$) |
|---|---|
| 0-11 | $I_{sc}$ |
| 12-15 | 3($I_{sc}$ − 12) + {0, 1, 2} |
| 16-17 | 6($I_{sc}$ − 16) + {0, 1, 2, 3, 4, 5} |

TABLE 8-continued

| Subcarrier indication field ($I_{sc}$) | Set of Allocated subcarriers ($n_{sc}$) |
|---|---|
| 18 | {0, 1, 2, 3, 4, 5, 6, 7, 8, 9, 10, 11} |
| 19-63 | Reserved |

Table 9 represents an example of the number of resource units for NPUSCH.

TABLE 9

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 10 represents an example of the number of repetitions for NPUSCH.

TABLE 10

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Demodulation Reference Signal (DMRS)

The reference signal sequence $\vec{r}_u(n)$ for $N_{sc}^{RU}=1$ is defined by the following Equation 5.

$$\bar{r}_u(n) = \frac{1}{\sqrt{2}}(1+j)(1-2c(n))w(n \bmod 16),$$

$$0 \le n < M_{rep}^{NPUSCH} N_{RU} N_{slots}^{UL}$$

[Equation 5]

where the binary sequence c(n) is defined by clause 7.2 of TS 36.211 and shall be initialized with $c_{init}=35$ at the start of the NPUSCH transmission. The quantity w(n) is given by Table 11 where $u=N_{ID}^{Ncell} \bmod 16$ for NPUSCH format 2, and for NPUSCH format 1 if group hopping is not enabled, and by clause 10.1.4.1.3 of 3GPP TS 36.211 if group hopping is enabled for NPUSCH format 1.

Table 11 represents an example of w(n).

TABLE 11

| u | n(0), . . . , n(15) |
|---|---|
| 0 | 1 1 1 1 1 1 1 1 1 1 1 1 1 1 1 1 |
| 1 | 1 — 1 — 1 — 1 — 1 — 1 — 1 — 1 — |
| 2 | 1 1 — — 1 1 — — 1 1 — — 1 1 — — |
| 3 | 1 — — 1 1 — — 1 1 — — 1 1 — — 1 |
| 4 | 1 1 1 1 — — — — 1 1 1 1 — — — — |
| 5 | 1 — 1 — — 1 — 1 1 — 1 — — 1 — 1 |
| 6 | 1 1 — — — — 1 1 1 1 — — — — 1 1 |
| 7 | 1 — — 1 — 1 1 — 1 — — 1 — 1 1 — |
| 8 | 1 1 1 1 1 1 1 1 — — — — — — — — |
| 9 | 1 — 1 — 1 — 1 — — 1 — 1 — 1 — 1 |
| 10 | 1 1 — — 1 1 — — — — 1 1 — — 1 1 |
| 11 | 1 — — 1 1 — — 1 — 1 1 — — 1 1 — |
| 12 | 1 1 1 1 — — — — — — — — 1 1 1 1 |
| 13 | 1 — 1 — — 1 — 1 — 1 — 1 1 — 1 — |
| 14 | 1 1 — — — — 1 1 — — 1 1 1 1 — — |
| 15 | 1 — — 1 — 1 1 — — 1 1 — 1 — — 1 |

The reference signal sequence for NPUSCH format 1 is given by the following Equation 6.

$$r_u(n) = \bar{r}_u(n) \quad [\text{Equation 6}]$$

The reference signal sequence for NPUSCH format 2 is given by the following Equation 7.

$$r_u(3n+m) = \bar{w}(m)\bar{r}_u(n), \quad m=0,1,2 \quad [\text{Equation 7}]$$

where $\bar{w}(m)$ is defined in Table 5.5.2.2.1-2 of 3GPP TS 36.211 with the sequence index chosen according to $$\left(\sum_{i=0}^{7} c(8n_s + i)2^i\right)$$

mod 3 with $c_{init}=N_{ID}^{Ncell}$.

The reference signal sequences $r_u(n)$ for $N_{sc}^{RU}>1$ is defined by a cyclic shift a of a base sequence according to the following Equation 8.

$$r_u(n)=e^{j\alpha n}e^{j\phi(n)\pi/4}, 0\le n < N_{sc}^{RU} \quad \text{[Equation 8]}$$

where $\varphi(n)$ is given by Table 21 for $N_{sc}^{RU}=3$, and is given by Table 22 for $N_{sc}^{RU}=6$.

If group hopping is not enabled, the base sequence index u is given by higher layer parameters threeTone-BaseSequence, sixTone-BaseSequence, and twelveTone-BaseSequence for $N_{sc}^{RU}=3$, $N_{sc}^{RU}=6$, and $N_{sc}^{RU}=12$, respectively. If not signalled by higher layers, the base sequence is given by the following Equation 9.

$$u = \begin{cases} N_{ID}^{Ncell} \bmod 12 & \text{for } N_{sc}^{RU} = 3 \\ N_{ID}^{Ncell} \bmod 14 & \text{for } N_{sc}^{RU} = 6 \\ N_{ID}^{Ncell} \bmod 30 & \text{for } N_{sc}^{RU} = 12 \end{cases} \quad \text{[Equation 9]}$$

If group hopping is enabled, the base sequence index u is given by clause 10.1.4.1.3 of 3GPP TS 36.211.

The cyclic shift for $N_{sc}^{RU}=3$ and $N_{sc}^{RU}=6$ is derived from higher layer parameters threeTone-CyclicShift and sixTone-CyclicShift, respectively, as defined in Table 23. For $N_{sc}^{RU}=12$, $\alpha=0$.

Table 12 represents an example of $\varphi(n)$ for $N_{sc}^{RU}=3$

TABLE 12

| u | $\varphi(0), \varphi(1), \varphi(2)$ | | |
|---|---|---|---|
| 0 | 1 | −3 | −3 |
| 1 | 1 | −3 | −1 |
| 2 | 1 | −3 | 3 |
| 3 | 1 | −1 | −1 |
| 4 | 1 | −1 | 1 |
| 5 | 1 | −1 | 3 |
| 6 | 1 | 1 | −3 |
| 7 | 1 | 1 | −1 |
| 8 | 1 | 1 | 3 |
| 9 | 1 | 3 | −1 |
| 10 | 1 | 3 | 1 |
| 11 | 1 | 3 | 3 |

Table 13 represents another example of $\varphi(n)$ for $N_{sc}^{RU}=6$.

TABLE 13

| u | $\psi(0), \ldots, \psi(5)$ | | | | | |
|---|---|---|---|---|---|---|
| 0 | 1 | 1 | 1 | 1 | 3 | −3 |
| 1 | 1 | 1 | 3 | 1 | −3 | 3 |
| 2 | 1 | −1 | −1 | −1 | 1 | −3 |
| 3 | 1 | −1 | 3 | −3 | −1 | −1 |
| 4 | 1 | 3 | 1 | −1 | −1 | 3 |
| 5 | 1 | −3 | −3 | 1 | 3 | 1 |
| 6 | −1 | −1 | 1 | −3 | −3 | −1 |
| 7 | −1 | −1 | −1 | 3 | −3 | −1 |
| 8 | 3 | −1 | 1 | −3 | −3 | 3 |
| 9 | 3 | −1 | 3 | −3 | −1 | 1 |
| 10 | 3 | −3 | 3 | −1 | 3 | 3 |
| 11 | −3 | 1 | 3 | 1 | −3 | −1 |
| 12 | −3 | 1 | −3 | 3 | −3 | −1 |
| 13 | −3 | 3 | −3 | 1 | 1 | −3 |

Table 14 represents an example of $\alpha$.

TABLE 14

| $N_{sc}^{RU} = 3$ | | $N_{sc}^{RU} = 6$ | |
|---|---|---|---|
| threeTone-CyclicShift | $\alpha$ | sixTone-CyclicShift | $\alpha$ |
| 0 | 0 | 0 | 0 |
| 1 | $2\pi/3$ | 1 | $2\pi/6$ |
| 2 | $4\pi/3$ | 2 | $4\pi/6$ |
|   |   | 3 | $8\pi/6$ |

For the reference signal for NPUSCH format 1, sequence-group hopping can be enabled, where the sequence-group number u in slot $n_s$ is defined by a group hopping pattern $f_{gh}(n_s)$ and a sequence-shift pattern $f_{ss}$ according to the following Equation 10.

$$u=(f_{gh}(n_s)+f_{ss}) \bmod N_{seq}^{RU} \quad \text{[Equation 10]}$$

where the number of reference signal sequences available for each resource unit size, $N_{seq}^{RU}$ is given by the following Table 15.

TABLE 15

| $N_{sc}^{RU}$ | $N_{seq}^{RU}$ |
|---|---|
| 1 | 16 |
| 3 | 12 |
| 6 | 14 |
| 12 | 30 |

Sequence-group hopping can be enabled or disabled by means of the cell-specific parameter groupHoppingEnabled provided by higher layers. Sequence-group hopping for NPUSCH can be disabled for a certain UE through the higher-layer parameter groupHoppingDisabled despite being enabled on a cell basis unless the NPUSCH transmission corresponds to a random access response grant or a retransmission of the same transport block as part of the contention based random access procedure.

The group hopping pattern $f_{gh}(n_s)$ is given by the following Equation 11.

$$f_{gh}(n_s)=(\Sigma_{i=0}^{7} c(8n_s'+i)\cdot 2^i) \bmod N_{seq}^{RU} \quad \text{[Equation 11]}$$

where $n_s'=n_s$ for $N_{sc}^{RU}>1$ and $n_s'$ is the slot number of the first slot of the resource unit for $N_{sc}^{RU}>1$. The pseudo-random sequence c(i) is defined by clause 7.2. The pseudo-random sequence generator is initialized with $$c_{init} = \left\lfloor \frac{N_{ID}^{Ncell}}{N_{seq}^{RU}} \right\rfloor$$

at the beginning of the resource unit for $N_{sc}^{RU}=1$ and in every even slot for $N_{sc}^{RU}>1$.

The sequence-shift pattern $f_{ss}$ is given by the following Equation 12.

$$f_{ss}=(N_{ID}^{Ncell}+\Delta_{ss}) \bmod N_{seq}^{RU} \quad \text{[Equation 12]}$$

where $\Delta_{ss} \in \{0, 1, \ldots, 29\}$ is given by higher-layer parameter groupAssignmentNPUSCH. If no value is signalled, $\Delta_{ss}=0$.

The sequence r(•) shall be multiplied with the amplitude scaling factor $\beta_{NPUSCH}$ and mapped in sequence starting with r(0) to the sub-carriers.

The set of subcarriers used in the mapping process shall be identical to the corresponding NPUSCH transmission as defined in clause 10.1.3.6 in 3GPP 36.211.

The mapping to resource elements (k, l) shall be in increasing order of first k, then l, and finally the slot number. The values of the symbol index l in a slot are given in Table 25.

Table 16 represents an example of the demodulation reference signal location for NPUSCH.

TABLE 16

| NPUSCH format | Values for l | |
|---|---|---|
| | $\Delta f = 3.75$ kHz | $\Delta f = 15$ kHz |
| 1 | 4 | 3 |
| 2 | 0, 1, 2 | 2, 3, 4 |

SF-FDMA Baseband Signal Generation

For $N_{sc}^{RU}>1$, the time-continuous signal $s_l(t)$ in SC-FDMA symbol l in a slot is defined by clause 5.6 with the quantity $N_{RB}^{UL}N_{sc}^{RB}$ replaced by $N_{sc}^{UL}$.

For $N_{sc}^{RU}=1$, the time-continuous signal $s_{k,l}(t)$ for subcarrier index k in SC-FDMA symbol l in an uplink slot is defined by Equation 13.

$$s_{k,l}(t) = a_{k^{(-)},l} \cdot e^{j\varphi_{k,l}} \cdot e^{j2\pi(k+1/2)\Delta f(t-N_{CP,l}T_s)}$$

$$k^{(-)} = k + \lfloor N_{sc}^{UL}/2 \rfloor \qquad \text{[Equation 13]}$$

For $0 \leq t < (N_{CP,l}+N)T_s$, where parameters for $\Delta f=15$ kHz and $\Delta f=3.75$ kHz are given in Table 26, $a_{k^{(-)},l}$ is the modulation value of symbol l and the phase rotation $\varphi_{k,l}$ is defined by Equation 14.

$$\varphi_{k,l} = \rho(\tilde{l} \bmod 2) + \hat{\varphi}_l(\tilde{l}) \qquad \text{[Equation 14]}$$

$$\rho = \begin{cases} \frac{\pi}{2} & \text{for BPSK} \\ \frac{\pi}{4} & \text{for QPSK} \end{cases}$$

$$\hat{\varphi}_k(\tilde{l}) = \begin{cases} 0 & \tilde{l} = 0 \\ \hat{\varphi}_k(\tilde{l}-1) + 2\pi\Delta f(k+1/2)(N+N_{CP,l})T_s & \tilde{l} > 0 \end{cases}$$

$$\tilde{l} = 0, 1, \ldots, M_{rep}^{NPUSCH} N_{RU} N_{slots}^{UL} N_{symb}^{UL} - 1$$

$$l = \tilde{l} \bmod N_{symb}^{UL}$$

where $\tilde{l}$ is a symbol counter that is reset at the start of a transmission and incremented for each symbol during the transmission.

Table 17 represents an example of SC-FDMA parameters for $N_{sc}^{RU}=1$.

TABLE 17

| Parameter | $\Delta f = 3.75$ kHz | $\Delta f = 15$ kHz |
|---|---|---|
| N | 8192 | 2048 |
| Cyclic prefix length $N_{CP,l}$ | 256 | 160 for l = 0 |
| | | 144 for l = 1, 2, ... 6 |
| Set of values for k | −24, −23, ···, 23 | −6, −5, ···, 5 |

The SC-FDMA symbols in a slot shall be transmitted in increasing order of l, starting with l=0, where SC-FDMA symbol l>0 starts at time $\Sigma_{l'=0}^{l-1}(N_{CP,l'}+N)T_s$ within the slot. For $\Delta f=3.75$ kHz, the remaining $2304T_s$ in $T_{slot}$ is not transmitted and used for guard period.

Narrowband Physical Random Access Channel (NPRACH)

The physical layer random access preamble is based on single-subcarrier frequency-hopping symbol groups. A symbol group is a random access symbol group illustrated in FIG. 11, consisting of a cyclic prefix of length $T_{CP}$ and a sequence of 5 identical symbols with total length $T_{SEQ}$. The parameter values are random access preamble parameters listed in Table 27.

Figure 11:
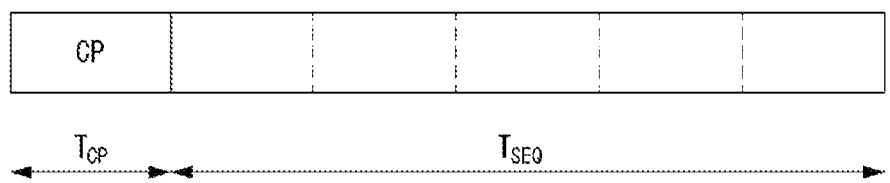
FIG. 11 illustrates an example of a random access symbol group.

FIG. 11 illustrates an example of the random access symbol group.

Table 18 represents an example of the random access preamble parameters.

TABLE 18

| Preamble format | $T_{CP}$ | $T_{SEQ}$ |
|---|---|---|
| 0 | $2048T_s$ | $5 \cdot 8192T_s$ |
| 1 | $8192T_s$ | $5 \cdot 8192T_s$ |

The preamble consisting of 4 symbol groups transmitted without gaps is transmitted $N_{rep}^{PRACH}$ times.

The transmission of a random access preamble, if triggered by the MAC layer, is restricted to certain time and frequency resources.

A NPRACH configuration provided by higher layers contains the following.

NPRACH resource periodicity $N_{period}^{NPRACH}$ (nprach-Periodicity),

Frequency location of the first subcarrier allocated to NPRACH $N_{scoffset}^{NPRACH}$ (nprach-SubcarrierOffset), The number of subcarriers allocated to NPRACH $N_{sc}^{NPRACH}$ (nprach-NumSubcarriers), The number of starting subcarriers allocated to contention based NPRACH random access $N_{sc\_cont}^{NPRACH}$ (nprach-NumCBRA-StartSubcarriers), The number of NPRACH repetitions per attempt $N_{rep}^{NPRACH}$ (numRepetitionsPerPreambleAttempt), NPRACH starting time $N_{start}^{NPRACH}$ (nprach-StartTime), Fraction for calculating starting subcarrier index for the range of NPRACH subcarriers reserved for indication of UE support for multi-tone msg3 transmission $N_{MSG3}^{NPRACH}$ (nprach-SubcarrierMSG3-RangeStart).

NPRACH transmission can start only $N_{start}^{NPRACH} \cdot 30720$ $T_s$ time units after the start of a radio frame fulfilling $n_f$ $\bmod(N_{period}^{NPRACH}/10)=0$. After transmissions of $4 \cdot 64$ $(T_{CP}+T_{SEQ})$ time units, a gap of $40 \cdot 30720 T_s$ time units is inserted.

NPRACH configurations where $N_{scoffset}^{NPRACH} + N_{sc}^{NPRACH} > N_{sc}^{UL}$ are invalid.

The NPRACH starting subcarriers allocated to contention based random access are split in two sets of subcarriers, $\{0, 1, \ldots, N_{sc\_cont}^{NPRACH} N_{MSG3}^{NPRACH}-1\}$ and $\{N_{sc\_cont}^{NPRACH} N_{MSG3}^{NPRACH}, \ldots, N_{sc\_cont}^{NPRACH}-1\}$, where the second set, if present, indicates UE support for multi-tone msg3 transmission.

The frequency location of the NPRACH transmission is constrained within $N_{sc}^{RA}=12$ subcarriers. Frequency hopping is used within the 12 subcarriers, where the frequency location of the $i^{th}$ symbol group is given by $n_{sc\_RA}(i)=n_{start}+\tilde{n}_{sc}^{RA}(i)$ where $n_{start}=N_{scoffset}^{NPRACH}+\lfloor n_{init}/N_{sc}^{RA} \rfloor \cdot N_{sc}^{RA}$, and $$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases} \quad \text{[Equation 15]}$$

$$f(t) = \left( f(t-1) + \left( \sum_{u=10t+1}^{10t+9} c(n) 2^{n-(1)(l+1)} \right) \bmod (N_{sc}^{RA} - 1) + 1 \right) \bmod N_{sc}^{RA}$$

$$f(-1) = 0$$

where $\tilde{n}_{SC}^{RA}(0) = n_{init} \bmod N_{sc}^{RA}$ with $n_{init}$ being the subcarrier selected by the MAC layer from $\{0, 1, \ldots, N_{sc}^{NPRACH}-1\}$, and the pseudo random sequence c(n) is given by clause 7.2 of 3GPP TS 36.211. The pseudo random sequence generator is initialized with $c_{init} = N_{ID}^{Ncell}$.

The time-continuous random access signal $s_i(t)$ for symbol group i is defined by the following Equation 16.

$$s_i(t) = \beta_{NPRACH} e^{j2\pi(n_{SC}^{RA}(i) + Kk_0 + 1/2)\Delta f_{RC}(t - T_{CP})} \quad \text{[Equation 16]}$$

Where $0 \leq t < T_{SEQ} + T_{CP}$, $\beta_{NPRACH}$ is an amplitude scaling factor in order to conform to the transmit power $P_{NPRACH}$ specified in clause 16.3.1 in 3GPP TS 36.213, $k_0 = -N_{sc}^{UL}/2$, $K = \Delta f/\Delta f_{RA}$ accounts for the difference in subcarrier spacing between the random access preamble and uplink data transmission, and the location in the frequency domain controlled by the parameter $n_{sc}(i)$ is derived from clause 10.1.6.1 of 3GPP TS 36.211. The variable $\Delta f_{RA}$ is given by Table 28.

Table 19 represents an example of random access baseband parameters.

TABLE 19

| Preamble format | $\Delta f_{RA}$ |
|---|---|
| 0, 1 | 3.75 kHz |

Downlink

A downlink narrowband physical channel corresponds to a set of resource elements carrying information originating from higher layers and is the interface defined between 3GPP TS 36.212 and 3GPP TS 36.211.

The following downlink physical channels are defined:
Narrowband Physical Downlink Shared Channel (NPDSCH)
Narrowband Physical Broadcast Channel (NPBCH)
Narrowband Physical Downlink Control Channel (NPDCCH)

A downlink narrowband physical signal corresponds to a set of resource elements used by the physical layer but does not carry information originating from higher layers.

A downlink narrowband physical signal corresponds to a set of resource elements used by the physical layer but does not carry information originating from higher layers. The following downlink physical signals are defined:
Narrowband reference signal (NRS)
Narrowband synchronization signal
Narrowband physical downlink shared channel (NPDSCH)

The scrambling sequence generator is initialized with $c_{init} = n_{RNTI} \cdot 2^{14} + n_f \bmod 2 \cdot 2^{13} + \lfloor n_s/2 \rfloor + N_{ID}^{Ncell}$, where $n_s$ is the first slot of the transmission of the codeword. In case of NPDSCH repetitions and the NPDSCH carrying the BCCH, the scrambling sequence generator is reinitialized according to the expression above for each repetition. In case of NPDSCH repetitions and the NPDSCH is not carrying the BCCH, the scrambling sequence generator is reinitialized according to the expression above after every min $(M_{rep}^{NPDSCH}, 4)$ transmission of the codeword with $n_s$ and $n_f$ set to the first slot and the frame, respectively, used for the transmission of the repetition.

Modulation is done using a QPSK modulation scheme.

NPDSCH can be mapped to one or more than one subframes, $N_{SF}$, as given by clause 16.4.1.5 of 3GPP TS 36.213, each of which shall be transmitted NPDSCH $M_{rep}^{NPDSCH}$ times.

For each of the antenna ports used for transmission of the physical channel, the block of complex-valued symbols $y^{(p)}(0), \ldots y^{(p)}(M_{symb}^{ap}-1)$ shall be mapped to resource elements (k, l) which meet all of the following criteria in the current subframe.

The subframe is not used for transmission of NPBCH, NPSS, or NSSS, and
they are assumed by the UE not to be used for NRS, and
they are not overlapping with resource elements used for CRS (if any), and
the index l in the first slot in a subframe fulfils $l \geq l_{DataStart}$ where $l_{DataStart}$ is given by clause 16.4.1.4 of 3GPP TS 36.213.

The mapping of $y^{(p)}(0), \ldots y^{(p)}(M_{symb}^{ap}-1)$ in sequence starting with $y^{(p)}(0)$ to resource elements (k, l) on antenna port p meeting the criteria above is increasing order of the first the index k and the index l, starting with the first slot and ending with the second slot in a subframe. For NPDSCH not carrying BCCH, after mapping to a subframe, the subframe is repeated for $M_{rep}^{PDSCH}-1$ additional subframes, before continuing the mapping of $y^{(p)}(\cdot)$ to the following subframe. The mapping of $y^{(p)}(0), \ldots y^{(p)}(M_{symb}^{ap}-1)$ is then repeated until $M_{rep}^{NPDSCH} N_{SF}$ subframes have been transmitted. For NPDSCH carrying BCCH, the $y^{(p)}(0), \ldots y^{(p)}(M_{symb}^{ap}-1)$ is mapped to $N_{SF}$ subframes in sequence and then repeated until $M_{rep}^{PDSCH} N_{SF}$ subframes have been transmitted.

The NPDSCH transmission can be configured by higher layers with transmission gaps where the NPSDCH transmission is postponed. There are no gaps in the NPDSCH transmission if $R_{max} < N_{gap,threshold}$ where $N_{gap,threshold}$ is given by the higher layer parameter dl-GapThreshold and $R_{max}$ is given by 3GPP TS 36.213. The gap starting frame and subframe are given by $(10n_f + \lfloor n_s/2 \rfloor) \bmod N_{gap,period} = 0$ where the gap periodicity, $N_{gap,period}$, is given by the higher layer parameter dl-GapPeriodicity. The gap duration in a plurality of subframes is given by $N_{gap,duration}=N_{gap,coeff} N_{gap,period}$, where $N_{gap,coeff}$ is given by the higher layer parameter dl-GapDurationCoeff. For NPDSCH carrying the BCCH there are no gaps in the transmission.

The UE does not expect NPDSCH in subframe i if it is not a NB-IoT downlink subframe, except for transmissions of NPDSCH carrying SystemInformationBlockType1-NB in subframe 4. In case of NPDSCH transmissions, in subframes that are not NB-IoT downlink subframes, the NPDSCH transmission is postponed until the next NB-IoT downlink subframe.

UE Procedure for Receiving the NPDSCH

A NB-IoT UE shall assume a subframe as a NB-IoT DL subframe in the following case.

If the UE determines that the subframe does not contain NPSS/NSSS/NPBCH/NB-SIB1 transmission, and for a NB-IoT carrier that a UE receives higher layer parameter operationModeInfo, the subframe is configured as NB-IoT DL subframe after the UE has obtained SystemInformationBlockType1-NB.

for a NB-IoT carrier that DL-CarrierConfigCommon-NB is present, the subframe is configured as NB-IoT DL subframe by the higher layer parameter downlinkBitmapNonAnchor.

For a NB-IoT UE that supports two HARQ-Processes-r14, there shall be a maximum of 2 downlink HARQ processes.

A UE shall upon detection on a given serving cell of a NPDCCH with DCI format N1, N2 ending in subframe n intended for the UE, decode, starting in n+5 DL subframe, the corresponding NPDSCH transmission in N consecutive NB-IoT DL subframe(s) $n_i$ with i=0, 1, ..., N−1 according to the NPDCCH information, where subframe n is the last subframe in which the NPDCCH is transmitted and is determined from the starting subframe of NPDCCH transmission and the DCI subframe repetition number field in the corresponding DCI.

subframe(s) $n_i$ with i=0, 1, ..., N−1 are N consecutive NB-IoT DL subframe(s) excluding subframes used for SI messages, where $n_0<n_1<..., n_{N-1}$, $N=N_{Rep}N_{SF}$, where the value of $N_{Rep}$ is determined by the repetition number field in the corresponding DCI, and the value of $N_{SF}$ is determined by the resource assignment field in the corresponding DCI, and $k_0$ is the number of NB-IoT DL subframe(s) starting in DL subframe n+5 until DL subframe $n_0$, where $k_0$ is determined by the scheduling delay field ($I_{Delay}$) for DCI format N1, and $k_0=0$ for DCI format N2. For DCI CRC scrambled by G-RNTI, $k_0$ is determined by the scheduling delay field ($I_{Delay}$) according to Table 30, otherwise $k_0$ is determined by the scheduling delay field ($I_{Delay}$) according to Table 29. The value of $R_{max}$ is according to subclause 16.6 in 3GPP 36.213 for the corresponding DCI format N1.

Table 20 represents an example of $k_0$ for DCI format N1.

TABLE 20

| $I_{Delay}$ | $k_0$ | |
|---|---|---|
| | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |

TABLE 20-continued

| $I_{Delay}$ | $k_0$ | |
|---|---|---|
| | $R_{max} < 128$ | $R_{max} \geq 128$ |
| 6 | 64 | 512 |
| 7 | 128 | 1024 |

Table 21 represents an example of $k_0$ for DCI format N1 with DCI CRC scrambled by G-RNTI.

TABLE 21

| $I_{Delay}$ | $k_0$ |
|---|---|
| 0 | 0 |
| 1 | 4 |
| 2 | 8 |
| 3 | 12 |
| 4 | 16 |
| 5 | 32 |
| 6 | 64 |
| 7 | 128 |

A UE is not expected to receive transmissions in 3 DL subframes following the end of a NPUSCH transmission by the UE.

The resource allocation information in DCI format N1, N2 (paging) for NPSICH indicates the following information to a scheduled UE.

a number of subframes ($N_{SF}$) determined by the resource assignment field ($I_{SF}$) in the corresponding DCI according to Table 22, a repetition number ($N_{Rep}$) determined by the repetition number field ($I_{Rep}$) in the corresponding DCI according to Table 23.

TABLE 22

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

TABLE 23

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

The number of repetitions for the NPDSCH carrying SystemInformationBlockType1-NB is determined based on the parameter schedulingInfoSIB1 configured by higher-layers and according to Table 33.

Table 24 represents an example of number of repetitions for SIB1-NB.

TABLE 24

| Value of schedulingInfoSIB1 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

The starting radio frame for the first transmission of the NPDSCH carrying SystemInformationBlockType1-NB is determined according to Table 25.

Table 25 represents an example of the starting radio frame for the first transmission of the NPDSCH carrying SIB1-NB.

TABLE 25

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell}$ mod 4 = 0 | 0 |
|   | $N_{ID}^{Ncell}$ mod 4 = 1 | 16 |
|   | $N_{ID}^{Ncell}$ mod 4 = 2 | 32 |
|   | $N_{ID}^{Ncell}$ mod 4 = 3 | 48 |
| 8 | $N_{ID}^{Ncell}$ mod 2 = 0 | 0 |
|   | $N_{ID}^{Ncell}$ mod 2 = 1 | 16 |
| 16 | $N_{ID}^{Ncell}$ mod 2 = 0 | 0 |
|   | $N_{ID}^{Ncell}$ mod 2 = 1 | 1 |

The starting OFDM symbol for NPDSCH is given by index $l_{DataStrart}$ in the first slot in a subframe k and is determined as follows.

If subframe k is a subframe used for receiving SIB1-NB,
$l_{DataStrart}$=3 if the value of the high layer parameter operationModeInfo is set to '00' or '01',
$l_{DataStrart}$=0 otherwise
else,
$l_{DataStrart}$ is given by the higher layer parameter eutra-ControlRegionSize if the value of the higher layer parameter eutraControlRegionSize is present
$l_{DataStrart}$=0 otherwise.

UE Procedure for Reporting ACK/NACK

The UE shall upon detection of a NPDSCH transmission ending in NB-IoT subframe n intended for the UE and for which an ACK/NACK shall be provided, start, at the end of n+k₀−1 DL subframe transmission of the NPUSCH carrying ACK/NACK response using NPUSCH format 2 in N consecutive NB-IoT UL slots, where N=$N_{Rep}^{AN} N_{slots}^{UL}$, where the value of $N_{Rep}^{AN}$ N is given by the higher layer parameter ack-NACK-NumRepetitions-Msg4 configured for the associated NPRACH resource for Msg4 NPDSCH transmission, and higher layer parameter ack-NACK-NumRepetitions otherwise, and the value of $N_{slots}^{UL}$ is the number of slots of the resource unit, allocated subcarrier for ACK/NACK and value of k0 is determined by the ACK/NACK resource field in the DCI format of the corresponding NPDCCH according to Table 16.4.2-1, and Table 16.4.2-2 in 3GPP TS 36.213.

Narrowband Physical Broadcast Channel (NPBCH)

The processing structure for the BCH transport channel is according to section 5.3.1 of 3GPP TS 36.212, with the following differences.

The transmission time interval (TTI) is 640 ms.

The size of the BCH transport block is set to 34 bits.

The CRC mask for NPBCH is selected according to 1 or 2 transmit antenna ports at eNodeB according to Table 5.3.1.1-1 of 3GPP TS 36.212, where the transmit antenna ports are defined in section 10.2.6 of 3GPP TS 36.211.

The number of rate matched bits is defined in section 10.2.4.1 of 3GPP TS 36.211.

Scrambling is done according to clause 6.6.1 of 3GPP TS 36.211 with $M_{bit}$ denoting the number of bits to be transmitted on the NPBCH. $M_{bit}$ equals 1600 for normal cyclic prefix. The scrambling sequence is initialized with $c_{init}=N_{ID}^{Ncell}$ in radio frames fulfilling $n_f$ mod 64=0.

Modulation is done using the QPSK modulation scheme for each antenna port and is transmitted in subframe 0 during 64 consecutive radio frames starting in each radio frame fulfilling $n_f$ mod 64=0.

Layer mapping and precoding are done according to clause 6.6.3 of 3GPP TS 36.211 with P∈{1,2}. The UE assumes antenna ports $R_{2000}$ and $R_{2001}$ are used for the transmission of the narrowband physical broadcast channel.

The block of complex-valued symbols $y^{(p)}(0), \ldots y^{(p)}(M_{symb}-1)$ for each antenna port is transmitted in subframe 0 during 64 consecutive radio frames starting in each radio frame fulfilling $n_f$ mod 64=0 and shall be mapped in sequence starting consecutive radio frames starting with y(0) to resource elements (k, l) not reserved for transmission of reference signals shall be in increasing order of the first the index k, then the index l. After mapping to a subframe, the subframe is repeated in subframe 0 in the 7 following radio frames, before continuing the mapping of $y^{(p)}(-)$ to subframe 0 in the following radio frame. The first three OFDM symbols in a subframe are not used in the mapping process. For the purpose of the mapping, the UE assumes cell-specific reference signals for antenna ports 0-3 and narrowband reference signals for antenna ports 2000 and 2001 being present irrespective of the actual configuration. The frequency shift of the cell-specific reference signals is calculated by replacing cell $N_{ID}^{cell}$ with $N_{ID}^{Ncell}$ in the calculation of $v_{shift}$ in clause 6.10.1.2 of 3GPP TS 36.211.

Narrowband Physical Downlink Control Channel (NPDCCH)

The narrowband physical downlink control channel carries control information. A narrowband physical control channel is transmitted on an aggregation of one or two consecutive narrowband control channel elements (NCCEs), where a narrowband control channel element corresponds to 6 consecutive subcarriers in a subframe where NCCE 0 occupies subcarriers 0 through 5 and NCCE 1 occupies subcarriers 6 through 11. The NPDCCH supports multiple formats as listed in Table 35. For NPDCCH format 1, all NCCEs belong to the same subframe. One or two NPDCCHs can be transmitted in a subframe.

Table 26 represents an example of supported NPDCCH formats.

TABLE 26

| NPDCCH Format | Number of NCCEs |
| --- | --- |
| 0 | 1 |
| 1 | 2 |

Scrambling shall be done according to clause 6.8.2 of TS 36.211. The scrambling sequence shall be initialized at the start of subframe $k_0$ according to section 16.6 of TS 36.213 after every 4th NPDCCH subframe with $c_{init} = \lfloor n_s/2 \rfloor 2^9 + N_{ID}^{Ncell}$, where $n_s$ is the first slot of the NPDCCH subframe in which scrambling is (re-)initialized.

Modulation is done according to clause 6.8.3 of TS 36.211 using the QPSK modulation scheme.

Layer mapping and precoding are done according to clause 6.6.3 of TS 36.211 using the same antenna ports as the NPBCH.

The block of complex-valued symbols $y(0), \ldots y(M_{symb}-1)$ is mapped in sequence starting with $y(0)$ to resource elements (k, l) on the associated antenna port which meets all of the following criteria.

They are part of the NCCE(s) assigned for the NPDCCH transmission, and they are assumed not to be used for transmission of NPBCH, NPSS, or NSSS, and they are assumed by the UE not to be used for NRS, and they are not overlapping with resource elements used for PBCH, PSS, SSS, or CRS as defined in clause 6 of TS 36.211 (if any), and the index l in the first slot in a subframe fulfils $l \geq l_{NPDCCHStart}$, where $l_{NPDCCHStart}$ is given by clause 16.6.1 of 3GPP TS 36.213.

The mapping to resource elements (k, l) on antenna port p meeting the criteria above is in increasing order of first the index k and then the index l, starting with the first slot and ending with the second slot in a subframe.

The NPDCCH transmission can be configured by higher layers with transmissions gaps where the NPDCCH transmission is postponed. The configuration is the same as described for NPDSCH in clause 10.2.3.4 of TS 36.211.

The UE does not expect NPDCCH in subframe i if it is not a NB-IoT downlink subframe. In case of NPDCCH transmissions, in subframes that are not NB-IoT downlink subframes, the NPDCCH transmissions are postponed until the next NB-IoT downlink subframe.

DCI Format

DCI Format N0

DCI format N0 is used for the scheduling of NPUSCH in one UL cell. The following information is transmitted by means of the DCI format N0.

Flag for format N0/format N1 differentiation (1 bit), subcarrier indication (6 bits), resource assignment (3 bits), scheduling delay (2 bits), modulation and coding scheme (4 bits), redundancy version (1 bit), repetition number (3 bits), new data indicator (1 bit), DCI subframe repetition number (2 bits)

DCI Format N1

DCI format N1 is used for the scheduling of one NPDSCH codeword in one cell and random access procedure initiated by a NPDCCH order. The DCI corresponding to a NPDCCH order is carried by NPDCCH. The following information is transmitted by means of the DCI format N1:

Flag for format N0/format N1 differentiation (1 bit), NPDCCH order indicator (1 bit)

Format N1 is used for random access procedure initiated by a NPDCCH order only if NPDCCH order indicator is set to "1", format N1 CRC is scrambled with C-RNTI, and all the remaining fields are set as follows:

Starting number of NPRACH repetitions (2 bits), subcarrier indication of NPRACH (6 bits), all the remaining bits in format N1 are set to one.

Otherwise,

Scheduling delay (3 bits), resource assignment (3 bits), modulation and coding scheme (4 bits), repetition number (4 bits), new data indicator (1 bit), HARQ-ACK resource (4 bits), DCI subframe repetition number (2 bits)

When the format N1 CRC is scrambled with a RA-RNTI, then the following fields among the fields above are reserved.

New data indicator, HARQ-ACK resource

If the number of information bits in format N1 is less than the number of information bits in format N0, zeros are appended to format N1 until the payload size equals that of format N0.

DCI Format N2

DCI format N2 is used for paging and direct indication. The following information is transmitted by means of the DCI format N2.

Flag for paging/direct indication differentiation (1 bit)

If Flag=0:

Direct indication information (8 bits), reserved information bits are added until the size is equal to the size of format N2 with Flag=1

If Flag=1:

Resource assignment (3 bits), modulation and coding scheme (4 bits), repetition number (4 bits), DCI subframe repetition number (3 bits)

NPDCCH Related Procedure

A UE shall monitor a set of NPDCCH candidates as configured by higher layer signalling for control information, where monitoring implies attempting to decode each of the NPDCCHs in the set according to all the monitored DCI formats.

An NPDCCH search space $NS_k^{(L',R)}$ at aggregation level $L' \in \{1,2\}$ and repetition level $R \in \{1,2,4,8,16,32,64,128,256, 512,1024,2048\}$ is defined by a set of NPDCCH candidates, where each candidate is repeated in a set of R consecutive NB-IoT downlink subframes excluding subframes used for transmission of SI messages starting with subframe k.

The locations of starting subframe k are given by $k=k_b$ where $k_b$ is the bth consecutive NB-IoT DL subframe from subframe k0, excluding subframes used for transmission of SI messages, and $b=u \cdot R$, and $u=0, 1, \ldots,$ $$\frac{R_{max}}{R} - 1,$$

and where subframe k0 is a subframe satisfying the condition $(10n_f + \lfloor n_s/2 \rfloor) \mod T = \lfloor \alpha_{offset} \cdot T \rfloor$, where $T = R_{max} \cdot G$, $T \geq 4$. G and $\alpha_{offset}$ are given by the higher layer parameters.

For Type1-NPDCCH common search space, k=k0 and is determined from locations of NB-IoT paging opportunity subframes.

If the UE is configured by higher layers with a NB-IoT carrier for monitoring of NPDCCH UE-specific search space, the UE monitors the NPDCCH UE-specific search space on the higher layer configured NB-IoT carrier, the UE is not expected to receive NPSS, NSSS, NPBCH on the higher layer configured NB-IoT carrier.

otherwise,
the UE monitors the NPDCCH UE-specific search space on the same NB-IoT carrier on which NPSS/NSSS/NPBCH are detected.

The starting OFDM symbol for NPDCCH given by index $l_{NPDCCHStart}$ in the first slot in a subframe k and is determined as follows.

If higher layer parameter eutraControlRegionSize is present $l_{NPDCCHStart}$ is given by the higher layer parameter eutraControlRegionSize.

otherwise, $l_{NPDCCHStart}=0$

Narrowband Reference Signal (NRS)

Before a UE obtains operationModeInfo, the UE may assume narrowband reference signals are transmitted in subframes #0 and #4 and in subframes #9 not containing NSSS.

When the UE receives higher-layer parameter operationModeInfo indicating guardband or standalone, Before the UE obtains SystemInformationBlockType1-NB, the UE may assume narrowband reference signals are transmitted in subframes #0, #1, #3, #4 and in subframes #9 not containing NSSS.

After the UE obtains SystemInformationBlockType1-NB, the UE may assume narrowband reference signals are transmitted in subframes #0, #1, #3, #4, subframes #9 not containing NSSS, and in NB-IoT downlink subframes and does not expect narrowband reference signals in other downlink subframes.

When the UE receives higher-layer parameter operationModeInfo indicating inband-SamePCI or inband-DifferentPCI, Before the UE obtains SysteminformationBlockType1-NB, the UE may assume narrowband reference signals are transmitted in subframes #0, #4 and in subframes #9 not containing NSSS.

After the UE obtains SystemInformationBlockType1-NB, the UE may assume narrowband reference signals are transmitted in subframes #0, #4, subframes #9 not containing NSSS, and in NB-IoT downlink subframes and does not expect narrowband reference signals in other downlink subframes.

Narrowband Primary Synchronization Signal (NPSS)

The sequence $d_l(n)$ used for the narrowband primary synchronization signal is generated from a frequency-domain Zadoff-Chu sequence according to the following Equation 17.

$$d_l(n) = S(l) \cdot e^{-j\frac{\pi un(n+1)}{11}}, n = 0, 1, \cdots, 10 \quad \text{[Equation 17]}$$

where the Zadoff-Chu root sequence index u=5 and S(l) for different symbol indices l is given by Table 27.

Table 27 represents an example of S(l).

TABLE 27

| Cyclic prefix length | S(3), . . . ,S(13) |
| --- | --- |
| Normal | 1 1 1 1 −1 −1 1 1 1 −1 1 |

The same antenna port shall be used for all symbols of the narrowband primary synchronization signal within a subframe.

The UE shall not assume that the narrowband primary synchronization signal is transmitted on the same antenna port as any of the downlink reference signals. The UE shall not assume that the transmissions of the narrowband primary synchronization signal in a given subframe use the same antenna port, or ports, as the narrowband primary synchronization signal in any other subframe.

The sequences $d_l(n)$ shall be mapped to resource elements (k, l) in increasing order of the first index k=0, 1, . . . , $N_{sc}^{RB}-2$ and then the index l=3, 4, . . . , $2N_{symb}^{DL}-1$ in subframe 5 in every radio frame. For resource elements (k, l) overlapping with resource elements where cell-specific reference signals are transmitted, the corresponding sequence element d(n) is not used for the NPSS but counted in the mapping process.

Narrowband Secondary Synchronization Signal (NSSS)

The sequence d(n) used for the narrowband secondary synchronization signal is generated from a frequency-domain Zadoff-Chu sequence according to the following Equation 18.

$$d(n) = b_q(n) \cdot e^{-j2\pi\theta_f n} \cdot e^{-j\frac{\pi un'(n'+1)}{131}} \quad \text{[Equation 18]}$$

Where $n = 0, 1, \cdots, 131$ $n' = n \mod 131$ $m = n \mod 128$ $u = N_{ID}^{cell} \mod 126 + 3$ $q = \left\lfloor \frac{N_{ID}^{Ncell}}{126} \right\rfloor$ The binary sequence $b_q(n)$ is given by Table 35. The cyclic shift of in frame number $n_f$ is given by $$\theta_f = \frac{33}{132}(n_f/2) \mod 4.$$

Table 28 represents an example of $b_q$ (n)

TABLE 28

| q | $b_q(0), \ldots, b_q(127)$ |
| --- | --- |
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 1 −1 −1 1 1 −1 1 −1 1 −1 1 1 1 −1 −1 1 1 1 −1 1 1 −1 1 −1 1 1 −1 —<br>1 1 1 −1 −1 1 1 1 −1 1 −1 −1 1 1 −1 1 −1 −1 1<br>1 1 −1 −1 1 1 −1 1 −1 1 −1 1 1 −1 1 1 −1 1 −1<br>1 −1 1 −1 −1 1 1 −1 1 1 −1 1 1 −1 1 1 —<br>1 1 1 −1 1 1 −1 1 1 1 −1 1 1 −1 1 −1<br>1 −1 1 1 1 −1 1 −1 1 1 1 −1 1 1 −1 1 1 −1]|
| 2 | [1 −1 −1 1 −1 1 1 1 −1 1 1 1 −1 1 −1 1 −1 1 1<br>1 −1 1 −1 −1 1 1 1 −1 −1 1 1 −1 1 −1 1 1 1 −1 1 1<br>−1 −1 1 1 1 −1 1 1 −1 1 1 −1 1 −1 1 1 1 —<br>1 −1 1 1 −1 1 −1 1 1 1 −1 1 1 −1 1 1 1 −1 1<br>1 −1 1 −1 −1 1 1 −1 1 1 −1 1 1 −1 1 1 —<br>1 1 1 −1 1 1 −1 1 −1 1 1 1 −1 1 −1 1 1 1<br>−1 1 −1 1 1 1 1 1 1 1 −1 1 1 −1 −1 1 1] |
| 3 | [1 −1 −1 1 −1 1 1 1 −1 1 1 1 −1 1 −1 1 −1 1 1<br>1 −1 1 −1 −1 1 1 1 −1 1 −1 −1 1 1 1 −1 1 1 1 −1 1 1<br>−1 −1 1 1 1 −1 1 1 −1 1 −1 1 1 1 −1 1 1 1 −1 —<br>1 −1 1 1 1 −1 1 −1 1 1 1 −1 1 1 −1 1 1 1 −1<br>−1 1 1 −1 1 1 −1 1 −1 1 1 1 −1 1 1 1 −1 1 1 |

TABLE 28-continued

| q | $b_q(0), \ldots, b_q(127)$ |
|---|---|
| | −1 −1 1 1 −1 −1 1 −1 1 1 −1 −1 1 1 −1 1 −1 −1 −1<br>1 −1 1 1 −1 1 −1 −1 1 1 −1 −1 1 1 −1 1 1 −1] |

The same antenna port shall be used for all symbols of the narrowband secondary synchronization signal within a subframe.

The UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe.

The sequence d(n) shall be mapped to resource elements (k, l) in sequence starting with d(0) in increasing order of the first index k over the 12 assigned subcarriers and then the index l over the assigned last $N_{symb}^{NSSS}$ symbols in radio frames fulfilling $n_f$ mod 2=0, where $N_{symb}^{NSSS}$ is given by Table 29.

Table 29 represents an example of the number of NSSS symbols.

TABLE 29

| Cyclic prefix length | $N_{symb}^{NSSS}$ |
|---|---|
| Normal | 11 |

OFDM Baseband Signal Generation

If higher-layer parameter operationModeInfo does not indicate 'inband-SamePCI', and samePCI-Indicator does not indicate 'samePCI', time-consecutive signal $s_l^{(p)}(t)$ on antenna port p of OFDM symbol l on a downlink slot is defined by the following Equation 19.

$$s_l^{(p)}(t) = \sum_{k=-\lfloor N_{sc}^{RB}/2 \rfloor}^{\lfloor N_{sc}^{RB}/2 \rfloor - 1} a_{k^{(-)},l}^{(p)} \cdot e^{j2\pi(k+\frac{1}{2})\Delta f(t-N_{CP,l}T_s)}$$ [Equation 19]

For $0 \leq t < (N_{CP,l}+N) \times T_s$, where $k^{(-)}=k+\lfloor N_{sc}^{RB}/2 \rfloor$, N=2048, Δf=15 kHz, and $a_{k,l}^{(p)}$ is the content of resource element (k, l) on the antenna port.

If higher-layer parameter operationModeInfo indicates 'inband-SamePCI' or samePCI-Indicator indicates 'samePCI', time-consecutive signal $s_l^{(p)}(t)$, where l'=l+$N_{symb}^{DL}(n_s$ mod 4)∈{0, . . . , 27}, on the antenna port p of OFDM symbol l' is an OFDM symbol index at the start of the last even-numbered subframe and is defined by the following Equation 20.

$$s_l^{(p)}(t) = \sum_{k=-\lfloor N_{RB}^{DL}N_{sc}^{RB}/2 \rfloor}^{-1} e^{\theta_k^{(-)}} a_{k^{(-)},l}^{(p)} \cdot e^{j2\pi k \Delta f(t-N_{CP,l'}\text{ mod }N_{symb}^{DL}T_s)} +$$

$$\sum_{k=1}^{\lfloor N_{RB}^{DL}N_{sc}^{RB}/2 \rfloor} e^{\theta_k^{(+)}} a_{k^{(+)},l}^{(p)} \cdot e^{j2\pi k \Delta f(t-N_{CP,l'}\text{ mod }N_{symb}^{DL}T_s)}$$ [Equation 20]

For $0 \leq t < (N_{CP,l}+N) \times T_s$, where $k^{(-)}=k+\lfloor N_{RB}^{DL}N_{sc}^{RB}/2 \rfloor$ and $k^{(+)}=k+\lfloor N_{RB}^{DL}N_{sc}^{RB}/2 \rfloor-1$, $\theta_{k,l}=j2\pi f_{NB-IoT}T_s(N+\Sigma_{l=0}^{l'}N_{CP,i\text{ mod }7})$ if resource element (k, l') is used for Narrowband IoT, and 0 otherwise, and $f_{NB-IoT}$ is the frequency location of the carrier of the narrowband IoT PRB minus the frequency location of the center of the LTE signal.

Only normal CP is supported for narrowband IoT downlink in this release of the 3GPP specification.

Initial Access Procedure for NB-IoT

The procedure in which the NB-IoT UE initially accesses the base station is briefly described in the section "General Signal Transmission and Reception Procedure in NB-IoT". Specifically, the procedure in which the NB-IoT UE initially accesses the base station may consist of a procedure in which the NB-IoT UE searches for an initial cell and a procedure in which the NB-IoT UE acquires system information.

Figure 12:
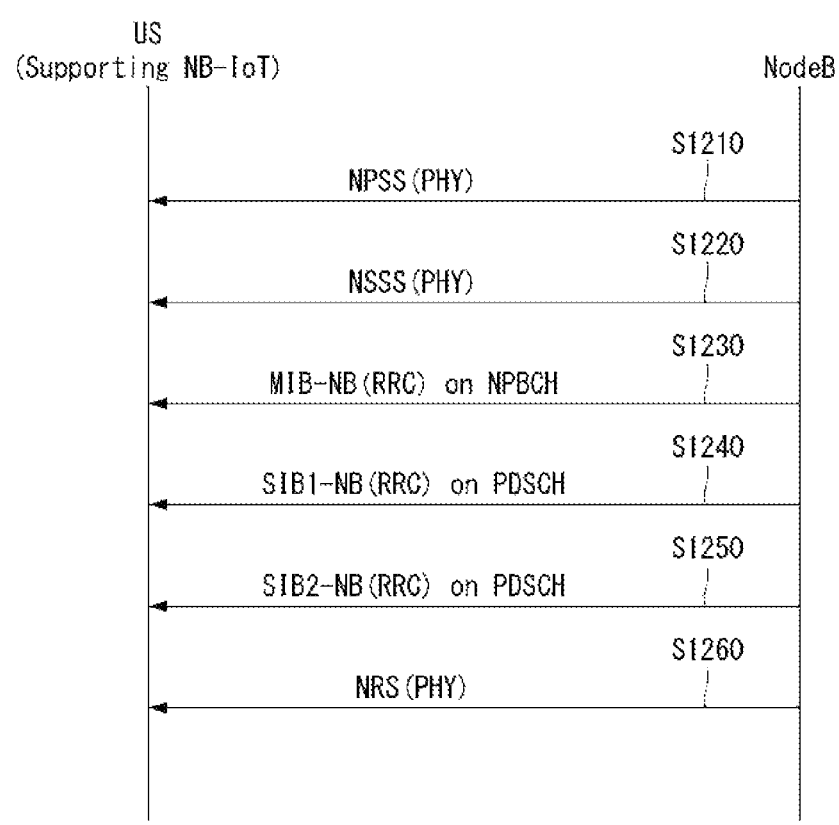
FIG. 12 is a flow chart illustrating an initial access procedure in relation to a radio system supporting a narrowband internet of things system.

In this regard, FIG. 12 illustrates a particular procedure for signaling between a UE and a base station (e.g., NodeB, eNodeB, eNB, gNB, etc.) for initial access in the NB-IoT. In the following, a normal initial access procedure for NB-IoT, an NPSS/NSSS configuration, and acquisition of system information (e.g., MIB, SIB, etc.) in the NB-IoT will be described with reference to FIG. 12.

FIG. 12 is a flow chart illustrating an initial access procedure in relation to a radio system supporting a NB-IoT system.

In FIG. 12 is a flow chart illustrating an example of an initial access procedure for NB-IoT, the name of each physical channel and/or physical signal may be differently configured or designated depending on the wireless communication system to which the NB-IoT is applied. For example, although FIG. 12 illustrates the procedure considering the NB-IoT based on the LTE system, this is merely an example for convenience of explanation. For example, the contents thereof can be extended and applied to the NB-IoT based on the NR system.

As illustrated in FIG. 12, the NB-IoT is based on following signals transmitted in the downlink: the primary and secondary narrowband synchronization signals (NPSS and NSSS). The NPSS is transmitted over 11 sub-carriers from the first subcarrier to the eleventh subcarrier in the sixth subframe of each frame (S1110), and the NSSS is transmitted over 12 sub-carriers in the NB-IoT carrier in the tenth subframe for FDD and the first subframe for TDD of every other frame (S1120).

The NB-IoT UE may receive MIB-NB (MasterInformationBlock-NB) on NB physical broadcast channel (NPBCH) (S1130).

The MIB-NB uses a fixed schedule with a periodicity of 640 ms and repetitions made within 640 ms. The first transmission of the MIB-NB is scheduled in subframe #0 of radio frames for which the SFN mod 64=0, and repetitions are scheduled in subframe #0 of all other radio frames. The transmissions are arranged in 8 independently decodable blocks of 80 ms duration.

Then, the NB-IoT UE may receive SIB1-NB (SystemInformationBlockType1-NB) on PDSCH (S1140).

The SIB1-NB uses a fixed schedule with a periodicity of 2560 ms. SIB1-NB transmission occurs in subframe #4 of every other frame in 16 continuous frames. The starting frame for the first transmission of the SIB1-NB is derived from the cell PCID and the number of repetitions within the 2560 ms period. The repetitions are made, equally spaced, within the 2560 ms period. TBS for SystemInformationBlockType1-NB and the repetitions made within the 2560 ms are indicated by scheduleInfoSIB1 field in the MIB-NB.

The SI messages are transmitted within periodically occurring time domain windows (referred to as SI-windows) using scheduling information provided in SystemInformationBlockType1-NB. Each SI message is associated with a SI-window, and the SI-windows of different SI messages do not overlap. That is, within one SI-window only the corresponding SI is transmitted. The length of the SI-window is common for all SI messages, and is configurable.

Within the SI-window, the corresponding SI message can be transmitted a number of times over 2 or 8 consecutive NB-IoT downlink subframes depending on TBS. The UE acquires the detailed time/frequency domain scheduling information and other information. Examples of other information may include a transport format for the SI messages from schedulingInfoList field in SystemInformationBlockType1-NB. The UE is not required to accumulate several SI messages in parallel but may need to accumulate a SI message across multiple SI windows, depending on coverage condition.

SystemInformationBlockType1-NB configures the SI-window length and the transmission periodicity for all SI messages.

Further, the NB-IoT UE may receive SIB2-NB (SystemInformationBlockType2-NB) on PDSCH for additional information (S1150).

As illustrated in FIG. 12, NRS refers to a narrowband reference signal.

Random Access Procedure for NB-IoT

The procedure in which the NB-IoT UE randomly accesses the base station is briefly described in the section "General Signal Transmission and Reception Procedure in NB-IoT". Specifically, the procedure in which the NB-IoT UE randomly accesses the base station may be performed through a procedure in which the NB-IoT UE transmits a preamble and receives a response to the preamble, and the like.

Figure 13:
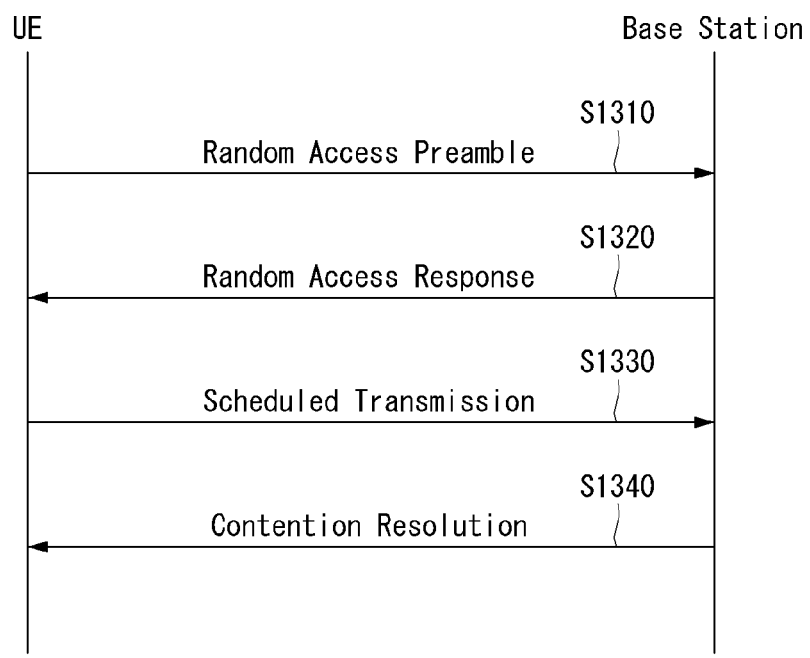
FIG. 13 is a flow chart illustrating a random access procedure in relation to a radio system supporting a narrowband internet of things system.

In this regard, FIG. 13 illustrates a particular procedure for signaling between a UE and a base station (e.g., NodeB, eNodeB, eNB, gNB, etc.) for random access in the NB-IoT. In the following, a random access procedure based on messages (e.g., msg1, msg2, msg3, msg4) used in a normal random access procedure for NB-IoT will be described with reference to FIG. 13.

FIG. 13 is a flow chart illustrating a random access procedure in relation to a radio system supporting a NB-IoT system.

In FIG. 13 is a flow chart illustrating an example of a random access procedure for NB-IoT, the name of each physical channel, physical signal and/or message may be differently configured or designated depending on the wireless communication system to which the NB-IoT is applied. For example, although FIG. 13 illustrates the procedure considering the NB-IoT based on the LTE system, this is merely an example for convenience of explanation. For example, the contents thereof can be extended and applied to the NB-IoT based on the NR system.

As illustrated in FIG. 13, in case of NB-IoT, an RACH procedure has the same message flow as LTE with different parameters.

Regarding a random access procedure for NB-IoT, NPRACH that the NB-IoT UE transmits to the base station is described in detail below.

Figure 14:
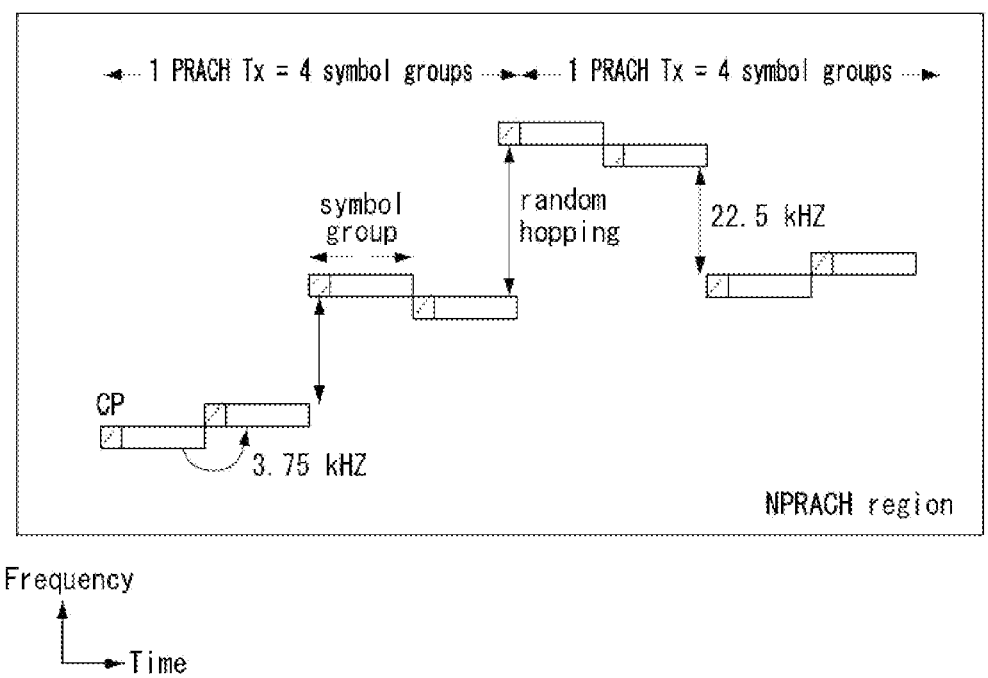
FIG. 14 illustrates a narrowband physical random access channel (NPRACH) region in relation to a radio system supporting a narrowband internet of things system.

FIG. 14 illustrates a narrowband physical random access channel (NPRACH) region in relation to a radio system supporting a NB-IoT system.

As illustrated in FIG. 14, a random access symbol group consists of a cyclic prefix of length and a sequence of identical symbols with total length. The total number of symbol groups in a preamble repetition unit is denoted by P. The number of time-contiguous symbol groups is denoted by G.

Parameter values of frame structures 1 and 2 are shown in Tables 30 and 31, respectively.

TABLE 30

| Preamble format | G | P | N | $T_{CP}$ | $T_{SEQ}$ |
| --- | --- | --- | --- | --- | --- |
| 0 | 4 | 4 | 5 | $2048T_s$ | $5 \cdot 8192T_s$ |
| 1 | 4 | 4 | 5 | $8192T_s$ | $5 \cdot 8192T_s$ |
| 2 | 6 | 6 | 3 | $24576T_s$ | $3 \cdot 24576T_s$ |

TABLE 31

| Preamble format | Supported uplink-downlink configurations | G | P | N | $T_{CP}$ | $T_{SEQ}$ |
| --- | --- | --- | --- | --- | --- | --- |
| 0 | 1, 2, 3, 4, 5 | 2 | 4 | 1 | $4778T_s$ | $1 \cdot 8192T_s$ |
| 1 | 1, 4 | 2 | 4 | 2 | $8192T_s$ | $2 \cdot 8192T_s$ |
| 2 | 3 | 2 | 4 | 4 | $8192T_s$ | $4 \cdot 8192T_s$ |
| 0-a | 1, 2, 3, 4, 5 | 3 | 6 | 1 | $1536T_s$ | $1 \cdot 8192T_s$ |
| 1-a | 1, 4 | 3 | 6 | 2 | $3072T_s$ | $2 \cdot 8192T_s$ |

Due to a specific uplink transmission scheme in NB-IoT, tone information is further included in an RAR message, and the formula for deriving a random access radio network temporary identifier (RA-RNTI) is newly defined. To support the transmission repetitions, the corresponding parameters including an RAR window size and a medium access control (MAC) contention resolution timer are extended.

Referring to FIG. 14, a physical layer random access preamble (i.e., PRACH) is based on single subcarrier/tone transmission with frequency hopping for a single user. The PRACH uses subcarrier spacing of 3.75 kHz (i.e., symbol length of 266.7 us), and two cyclic prefix lengths are provided to support different cell sizes. Frequency hopping is performed between random access symbol groups, where each symbol group includes five symbols and the cyclic prefix, with pseudo-random hopping between repetitions of symbol groups.

NPRACH configuration provided by higher layers (e.g., RRC) may include the following.

NPRACH resource periodicity $N_{Period}^{NPRACH}$ (nprach-Periodicity)

Frequency location of the first subcarrier allocated to NPRACH $N_{scoffset}^{NPRACH}$ (nprach-SubcarrierOffset)

The number of subcarriers allocated to NPRACH $N_{sc}^{NPRACH}$ (nprach-NumSubcarriers)

The number of starting sub-carriers allocated to contention based NPRACH random access $N_{sc\_cont}^{NPRACH}$ (nprach-NumCBRA-StartSubcarriers)

The number of NPRACH repetitions per attempt $N_{rep}^{NPRACH}$ (numRepetitionsPerPreambleAttempt)

NPRACH starting time start $N_{start}^{NPRACH}$ (nprach-StartTime),

Fraction for calculating starting subcarrier index for the range of NPRACH subcarriers reserved for indication of UE support for multi-tone msg3 transmission $N_{MSG3}^{NPRACH}$ (nprach-SubcarrierMSG3-RangeStart)

NPRACH transmission can start only $N_{start}^{NPRACH} \cdot 30720 T_s$ time units after the start of a radio frame fulfilling $n_f \mod(N_{period}^{NPRACH}/10)=0$. After transmissions of $4 \cdot 64 (T_{CP}+T_{SEQ})$ time units, a gap of $40 \cdot 30720 T_s$ time units shall be inserted.

NPRACH configurations where $N_{sc_{offset}}^{NPRACH}+N_{sc}^{NPRACH} > N_{sc}^{UL}$ are invalid.

The NPRACH starting subcarriers allocated to contention based random access are split in two sets of subcarriers, $\{0, 1, \ldots, N_{sc\_cont}^{NPRACH}N_{MSG3}^{NPRACH}-1\}$ and $\{N_{sc\_cont}^{NPRACH}N_{MSG3}^{NPRACH}, \ldots, N_{sc_{cont}}^{NPRACH}-1\}$, where the second set, if present, indicates UE support for multi-tone msg3 transmission.

The frequency location of the NPRACH transmission is constrained within $N_{sc}^{RA}=12$ subcarriers. Frequency hopping shall be used within the 12 subcarriers, where the frequency location of the $i^{th}$ symbol group is given by $n_{sc}^{RA}(i)=n_{start}+\tilde{n}_{sc}^{RA}(i)$, where $n_{start}=N_{sc_{offset}}^{NPRACH}+\lfloor n_{init}/N_{sc}^{RA}\rfloor \cdot N_{sc}^{RA}$, and $$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1)+1 & i \bmod 4 = 1, 3 \text{ and } \tilde{n}_{sc}^{RA}(i-1) \bmod 2 = 0 \\ \tilde{n}_{sc}^{RA}(i-1)-1 & i \bmod 4 = 1, 3 \text{ and } \tilde{n}_{sc}^{RA}(i-1) \bmod 2 = 1 \\ \tilde{n}_{sc}^{RA}(i-1)+6 & i \bmod 4 = 2 \text{ and } \tilde{n}_{sc}^{RA}(i-1) < 6 \\ \tilde{n}_{sc}^{RA}(i-1)-6 & i \bmod 4 = 2 \text{ and } \tilde{n}_{sc}^{RA}(i-1) \geq 6 \end{cases}$$

$$f(t) = \left( f(t-1) + \left( \sum_{u=10t+1}^{10t+9} c(n)2^{n-(1)(l+1)} \right) \bmod (N_{sc}^{RA}-1) + 1 \right) \bmod N_{sc}^{RA}$$

$$f(-1) = 0$$

where $\tilde{n}_{sc}^{RA}(0)=n_{init} \bmod N_{sc}^{RA}$ with $n_{init}$ being the subcarrier selected by the MAC layer from $\{0, 1, \ldots, N_{sc}^{NPRACH}-1\}$, and the pseudo random sequence c(n) is given by $$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

Where $N_C=1600$ and the first m-sequence shall be initialized with $x_1(0)=1, x_1(n)=0, n=1, 2, \ldots, 30$. The initialization of the second m-sequence may be denoted by $c_{init}=\sum_{i=0}^{30}x_2(i) \cdot 2^i$. For NPRACH, the pseudo random sequence generator shall be initialized with $c_{init}=N_{ID}^{Ncell}$.

In each NPRACH occurrence, $\{12, 24, 36, 48\}$ subcarriers may be supported. Further, the random access preamble transmission (i.e., PRACH) may be repeated up to $\{1, 2, 4, 8, 16, 32, 64, 128\}$ times to enhance coverage.

A physical layer process for narrowband physical broadcast channel (NPBCH) is described in detail below.

Scrambling

Scrambling is done according to clause 6.6.1 of 3GPP TS 36.211 with $M_{bit}$ denoting the number of bits to be transmitted on the NPBCH. $M_{bit}$ equals 1600 for normal cyclic prefix. The scrambling sequence is initialized with $c_{init}=N_{ID}^{Ncell}$ in radio frames fulfilling $n_f \bmod 64=0$.

Modulation

Modulation is done according to clause 6.6.2 of TS 36.211 using the modulation scheme in Table 10.2.4.2-1.

Table 32 represents an example of a modulation scheme for NPBCH.

TABLE 32

| Physical channel | Modulation scheme |
| --- | --- |
| NPBCH | QPSK |

Layer Mapping and Precoding

Layer mapping and precoding are done according to clause 6.6.3 of 3GPP TS 36.211 with $P \in \{1,2\}$. The UE assumes antenna ports $R_{2000}$ and $R_{2001}$ are used for the transmission of the narrowband physical broadcast channel.

Mapping to Resource Elements

The block of complex-valued symbols $y^{(p)}(0), \ldots, y^{(p)}(M_{symb}-1)$ for each antenna port is transmitted in subframe 0 during 64 consecutive radio frames starting in each radio frame fulfilling $n_f \bmod 64=0$ and shall be mapped in sequence starting with y(0) to resource elements (k, l). The mapping to resource elements (k, l) not reserved for transmission of reference signals shall be in increasing order of first the index k, then the index l. After mapping to a subframe, the subframe is repeated in subframe 0 in the 7 following radio frames, before continuing the mapping of $y^{(p)}(\bullet)$ to subframe 0 in the following radio frame. The first three OFDM symbols in a subframe are not be used in the mapping process.

For the purpose of the mapping, the UE assumes cell-specific reference signals for antenna ports 0-3 and narrowband reference signals for antenna ports 2000 and 2001 being present irrespective of the actual configuration. The frequency shift of the cell-specific reference signals shall be calculated by replacing $N_{ID}^{cell}$ with $N_{ID}^{Ncell}$ in the calculation of $v_{shift}$ in clause 6.10.1.2 of 3GPP TS 36.211.

Next, information related to MIB-NB and SIBN1-NB is described in detail.

MasterInformationBlock-NB

The MasterInformationBlock-NB includes system information transmitted on BCH.

Signalling radio bearer: N/A
RLC-SAP: TM
Logical channel: BCCH
Direction: E-UTRAN to UE Table 33 below represents an example of MasterInformationBlock-NB format.

TABLE 33

| | |
| --- | --- |
| -- ASN1START | |
| MasterInformationBlock-NB ::= | SEQUENCE { |
|     systemFrameNumber-MSB-r13 | BIT STRING (SIZE (4)), |
|     hyperSFN-LSB-r13 | BIT STRING (SIZE (2)), |
|     schedulingInfoSIB1-r13 | INTEGER (0..15), |
|     systemInfoValueTag-r13 | INTEGER (0..31), |
|     ab-Enabled-r13 | BOOLEAN, |
|     operationModeInfo-r13 | CHOICE { |
|         Inband-SamePCI-r13 | Inband-SamePCI-NB-r13, |
|         Inband-DifferentPCI-r13 | Inband-DifferentPCI-NB-r13, |

TABLE 33-continued

```
    guardband-r13                    Guardband-NB-r13,
    standalone-r13                   Standalone-NB-r13
  },
  spare                              BIT STRING (SIZE (11))
}
ChannelRasterOffset-NB-r13 : := ENUMERATED {khz-7dot5, khz-3dot5, khz2dot5, khz7dot5}
Guardband-NB-r13 : :=          SEQUENCE {
  rasterOffset-r13                   ChannelRasterOffset-NB-r13,
  spare                              BIT STRING (SIZE (3))
}
Inband-SamePCI-NB-r13 : :=     SEQUENCE {
  eutra-CRS-SequenceInfo-r13         INTEGER (0..31)
}
Inband-DifferentPCI-NB-r13 : := SEQUENCE {
  eutra-NumCRS-Ports-r13             ENUMERATED (same, four),
  rasterOffset-r13                   ChannelRasterOffset-NB-r13,
  spare                              BIT STRING (SIZE (2))
}
Standalone-NB-r13 : : =        SEQUENCE {
  spare                              BIT STRING (SIZE (5))
}
-- ASN1STOP
```

Table 34 below represents description of MasterInformationBlock-NB field.

TABLE 34

MasterInformationBlock-NB Field Descriptions ab-Enabled
Value TRUE indicates that access barring is enabled and that the UE shall acquire SystemInformationBlockType14-NB before initiating RRC connection establishment or resume.
eutra-CRS-SequenceInfo
Information of the carrier containing NPSS/NSSS/NPBCH.
Each value is associated with an E-UTRA PRB index as an offset from the
middle of the LTE system sorted out by channel raster offset.
eutra-NumCRS-Ports
Number of E-UTRA CRS antenna ports, either the same number of ports as NRS or 4 antenna ports.
hyperSFN-LSB
Indicates the 2 least significant bits of hyper SFN. The remaining bits are present in SystemInformationBlockType1-NB.
operationModeInfo
Deployment scenario (in-band/guard-band/standalone) and related information. See TS 36.211 [21] and TS 36.213 [23].
Inband-SamePCI indicates an in-band deployment and that the NB-IoT and LTE cell share the same physical cell id and have the same number of NRS and CRS ports.
Inband-DifferentPCI indicates an in-band deployment and that the NB-IoT and LTE cell have different physical cell ID.
guardband indicates a guard-band deployment.
standalone indicates a standalone deployment.

TABLE 34-continued

MasterInformationBlock-NB Field Descriptions rasterOffset
NB-IoT offset from LTE channel raster. Unit in kHz in set {−7.5, −2.5, 2.5, 7.5}.
schedulingInfoSIB1
This field contains an index to a table specified in TS 36.213 [23, Table 16.4.1.3-3] that defines SystemInformationBlockType1-NB scheduling information.
systemFrameNumber-MSB
Defines the 4 most significant bits of the SFN. As indicated in TS 36.211 [21], the 6 least significant bits of the SFN are acquired implicitly by decoding the NPBCH.
systemInfoValueTag
Common for all SIBs other than MIB-NB, SIB14-NB and SIB16-NB.

SystemInformationBlockType1-NB

The SystemInformationBlockType1-NB message contains information relevant when evaluating if a UE is allowed to access a cell and defines the scheduling of other system information.

Signalling radio bearer: N/A

RLC-SAP: TM

Logical channel: BCCH

Direction: E-UTRAN to UE

Table 35 represents an example of SystemInformationBlockType1 (SIB1)-NB message.

TABLE 35

```
-- ASN1START
SystemInformationBlockType1-NB ::= SEQUENCE {
  hyperSFN-MSB-r13              BIT STRING (SIZE (8)),
  cellAccessRelatedInfo-r13     SEQUENCE {
    plmn-IdentityList-r13           PLMN-IdentityList-NB-r13,
    trackingAreaCode-r13            TrackingAreaCode,
    cellIdentity-r13                CellIdentity,
    cellBarred-r13                  ENUMERATED {barred, notBarred},
    intraFreqReselection-r13        ENUMERATED {allowed, notAllowed}
  },
  cellSelectionInfo-r13         SEQUENCE {
    q-RxLevMin-r13                  Q-RxLevMin,
    q-QualMin-r13                   Q-QualMin-r9
  },
```

TABLE 35-continued

```
  p-Max-r13                     P-Max               OPTIONAL,    --Need OP
  freqBandIndicator-r13         FreqBandIndicator-NB-r13,
  freqBandInfo-r13              NS-PmaxList-NB-r13            OPTIONAL,   --
Need OR
  multiBandInfoList-r13         MultiBandInfoList-NB-r13   OPTIONAL,     --
Need OR
  downlinkBitmap-r13            DL-Bitmap-NB-r13              OPTIONAL,
  -- Need OP,
  eutraControlRegionSize-r13    ENUMERATED {n1, n2, n3}
  OPTIONAL,   -- Cond inband
  nrs-CRS-PowerOffset-r13              ENUMERATED {dB-6,     dB-4dot77, dB-3,
                                        dB-1dot77, dB0,         dB1,
                                        dB1dot23,  dB2,         dB3,
                                        dB4,         dB4dot23, dB5,
                                        dB6,         dB7,       dB8,
                                        dB9}        OPTIONAL,  --   Cond
inband-SamePCI
  schedulingInfoList-r13        SchedulingInfoList-NB-r13,
  si-WindowLength-r13             ENUMERATED {ms160,  ms320,  ms480,
  ms640,
                                      ms960, ms1280, ms1600, spare1},
  si-RadioFrameOffset-r13       INTEGER (1..15)      OPTIONAL,   --  Need
OP
  systemInfoValueTagList-r13    SystemInfoValueTagList-NB-r13   OPTIONAL,
  -- Need OR
  lateNonCriticalExtension      OCTET STRING                 OPTIONAL,
  nonCriticalExtension          SEQUENCE { }                  OPTIONAL
}
PLMN-IdentityList-NB-r13 ::=    SEQUENCE (SIZE (1..maxPLMN-r11)) OF PLMN-
IdentityInfo-NB-r13
PLMN-IdentityInfo-NB-r13 ::=    SEQUENCE {
  plmn-Identity-r13             PLMN-Identity,
  cellReservedForOperatorUse-r13    ENUMERATED {reserved, notReserved},
  attachWithoutPDN-Connectivity-r13  ENUMERATED {true}    OPTIONAL   --
Need OP
}
SchedulingInfoList-NB-r13  ::=  SEQUENCE (SIZE  (1..maxSI-Message-NB-r13))  OF
SchedulingInfo-NB-r13
SchedulingInfo-NB-r13::=       SEQUENCE {
  si-Periodicity-r13            ENUMERATED {rf64, rf128, rf256, rf512,
                                      rf1024, rf2048, rf4096, spare},
  si-RepetitionPattern-r13        ENUMERATED {every2ndRF, every4thRF,
                                        every8thRF,  every16thRF},
  sib-MappingInfo-r13           SIB-MappingInfo-NB-r13,
  si-TB-r13       ENUMERATED {b56, b120, b208, b256, b328, b440, b552, b680}
}
SystemInfoValueTagList-NB-r13 ::=  SEQUENCE (SIZE (1.. maxSI-Message-NB-r13))
OF
                                SystemInfoValueTagSI-r13
SIB-MappingInfo-NB-r13 ::=      SEQUENCE (SIZE (0..maxSIB-1)) OF SIB-Type-
NB-r13
SIB-Type-NB-r13 ::=             ENUMERATED {
                                sibType3-NB-r13, sibType4-NB-r13, sibType5-NB-
r13,
                                sibType14-NB-r13, sibType16-NB-r13, spare3,
spare2, spare1}
-- ASN1STOP
```

Table 36 represents description of SystemInformation-BlockType1-NB filed.

TABLE 36

SystemInformationBlockType1-NB Field Descriptions attachWithoutPDN-Connectivity
If present, the field indicates that attach without PDN connectivity as specified in TS 24.301
[35] is supported for this PLMN.
CellBarred
Barred means the cell is barred, as defined in TS 36.304 [4].
cellIdentity
Indicates the cell identity.
cellReservedForOperatorUse
As defined in TS 36.304 [4].
cellSelectionInfo
Cell selection information as specified in TS 36.304 [4].

TABLE 36-continued

SystemInformationBlockType1-NB Field Descriptions downlinkBitmap
NB-IoT downlink subframe configuration for downlink transmission.
If the bitmap is not present, the UE shall assume that all subframes are valid (except for
subframes carrying NPSS/NSSS/NPBCH/SIB1-NB) as specified in TS 36.213 [23].
eutraControlRegionSize
Indicates the control region size of the E-UTRA cell for the in-band operation mode. Unit is in
number of OFDM symbols.
freqBandIndicator
A list of as defined in TS 36.101 [42, Table 6.2.4-1] for the frequency band in
freqBandIndicator.
freqBandInfo
A list of additionalPmax and additionalSpectrumEmission values as defined in TS 36.101 [42,
Table 6.2.4-1] for the frequency band in freqBandInfofreqBandIndicator.
hyperSFN-MSB
Indicates the 8 most significant bits of hyper-SFN. Together with hyperSFN-LSB in MIB-NB,
the complete hyper-SFN is built up. hyper-SFN is incremented by one when the SFN wraps
around.
intraFreqReselection
Used to control cell reselection to intra-frequency cells when the highest ranked cell is barred,
or treated as barred by the UE, as specified in TS 36.304 [4].
multiBandInfoList
A list of additional frequency band indicators, additionalPmax and
additionalSpectrumEmission values, as defined in TS 36.101 [42, Table 5.5-1]. If the UE
supports the frequency band in the freqBandIndicator IE it shall apply that frequency band.
Otherwise, the UE shall apply the first listed band which it supports in the multiBandInfoList
IE.
nrs-CRS-PowerOffset
NRS power offset between NRS and E-UTRA CRS. Unit in dB. Default value of 0.
plmn-IdentityList
List of PLMN identities. The first listed PLMN-Identity is the primary PLMN.
p-Max
Value applicable for the cell. If absent, the UE applies the maximum power according to the
UE capability.
q-QualMin
Parameter "$Q_{qualmin}$" in TS 36.304 [4].
q-RxLevMin
Parameter $Q_{rxlevmin}$ in TS 36.304 [4]. Actual value $Q_{rxlevmin}$ = IE value * 2 [dB].
schedulingInfoList
Indicates additional scheduling information of SI messages.
si-Periodicity
Periodicity of the SI-message in radio frames, such that rf256 denotes 256 radio frames, rf512
denotes 512 radio frames, and so on.
si-RadioFrameOffset
Offset in number of radio frames to calculate the start of the SI window.
If the field is absent, no offset is applied.
si-RepetitionPattern
Indicates the starting radio frames within the SI window used for SI message transmission.
Value every2ndRF corresponds to every second radio frame, value every4thRF corresponds to
every fourth radio frame and so on starting from the first radio frame of the SI window used
for SI transmission.
si-TB
This field indicates the transport block size in number of bits used to broadcast the SI message.
si-WindowLength
Common SI scheduling window for all SIs. Unit in milliseconds, where ms160 denotes 160
milliseconds, ms320 denotes 320 milliseconds, and so on.
sib-MappingInfo
List of the SIBs mapped to this SystemInformation message. There is no mapping
information of SIB2; it is always present in the first SystemInformation message listed in the
schedulingInfoList list.
systemInfoValueTagList
Indicates SI message specific value tags. It includes the same number of entries, and listed in
the same order, as in SchedulingInfoList.
systemInfoValueTagSI
SI message specific value tag as specified in Clause 5.2.1.3. Common for all SIBs within the
SI message other than SIB14.
trackingAreaCode
A trackingAreaCode that is common for all the PLMNs listed.

TABLE 37

| Conditional presence | Explanation |
|---|---|
| inband | The field is mandatory present if IE operationModeInfo in MIB-NB is set to inband-SamePCI or inband-DifferentPCI. Otherwise the field is not present. |
| inband-SamePCI | The field is mandatory present, if IE operationModeInfo in MIB-NB is set to inband-SamePCI. Otherwise the field is not present. |

Machine Type Communication (MTC)

MTC has been mainly designed to use LTE for machine-to-machine (M2M) or Internet of things (IoT). In general, such an application requires not that much throughput (in most case it needs very low throughput). The key requirements of M2M communications include cost reduction, reduced power consumption, enhanced coverage, etc.

To facilitate MTC, long-term evolution (LTE) Release 12 has introduced some initial features, such as new low-cost user equipment (UE) category, power saving mode (PSM), and UE assistance information for evolved NodeB (eNB) parameter tuning. The new low-cost UE category introduced in LTE Release 12 is called as Category 0. In order to reduce the baseband and RF complexity of the UE, the Category 0 defines reduced peak data rate (e.g., 1 Mbps), half duplex operation with relaxed radio frequency (RF) requirements, and a single receive antenna. The PSM allows the UE to greatly reduce power consumption for applications with delay-tolerant mobile-originated (MO) traffic in order to achieve years of battery lifetime.

It is obvious to those skilled in the art that the operations of the UE/base station described in the present disclosure can be applied to the LTE MTC.

Before describing a method for transmitting and receiving SIB1-NB in the TDD NB-IoT system proposed in the present disclosure, abbreviations and definition of terms to be described later are summarized.

Abbreviation

MIB-NB: masterinformationblock-narrowband
SIB1-NB: systeminformationblock1-narrowband
CRS: cell specific reference signal or common reference signal
ARFCN: absolute radio-frequency channel number
PRB: physical resource block
PRG: precoding resource block group
PCI: physical cell identifier
N/A: non-applicable
EARFCN: E-UTRA absolute radio frequency channel number
RRM: radio resource management
RSRP: reference signal received power
RSRQ: reference signal received quality
TBS: transport block size
TDD/FDD: time division duplex/frequency division duplex Definition NB-IoT: NB-IoT enables access to a network service through an E-UTRA using a channel bandwidth limited to 200 kHz.

NB-IoT inband operation: NB-IoT operates as inband when using resource block(s) within a normal E-UTRA carrier.

NB-IoT guard band operation: NB-IoT operates as a guard band when using resource block(s) that is not used within a guard band of an E-UTRA carrier.

NB-IoT standalone operation: NB-IoT operates as stand-alone when using its own spectrum. For example, a spectrum used by a current GERAN system instead of one or more GSM carriers and a scattered spectrum for potential IoT deployment.

Anchor carrier: In NB-IoT, a carrier on which a UE assumes that NPSS/NSSS/NPBCH/SIB-NB is transmitted for FDD, or NPSS/NSSS/NPBCH is transmitted for TDD.

Non-anchor carrier: In NB-IoT, a carrier on which a UE does not assume that NPSS/NSSS/NPBCH/SIB-NB is transmitted for FDD, or NPSS/NSSS/NPBCH is transmitted for TDD.

Channel raster: a minimum unit by which a UE reads a resource. In case of the LTE system, a channel raster has a value of 100 kHz.

Further, "/" described in the present disclosure may be interpreted as "and/or", and "A and/or B" may be interpreted as the same meaning as "including at least one of A or (and/or) B".

MTC physical downlink control channel (MPDCCH) is a MTC physical downlink control channel based on EPDCCH. Thus, in the same manner as the EPDCCH, the MPDCCH estimates a channel based on a demodulation reference signal (DMRS) and performs MPDCCH demodulation using the estimated channel.

An LTE-MTC UE can perform time/frequency interpolation in the same manner as the LTE UE, in order to enhance channel estimation capability. However, there may occur the case where it is impossible to perform the time/frequency interpolation on a reference signal for MPDCCH demodulation in terms of the channel estimation capability due to the following signal characteristics.

Characteristics of MPDCCH Affecting MPDCCH Channel Estimation

A DMRS of MPDCCH is transmitted only for a physical resource block (PRB) used for a transmission of MPDCCH.

Supporting MPDCCH formats supporting various enhanced control channel element (ECCE) aggregation levels.

A MPDCCH format supported in LTE-MTC occupies 1/2/4 PRB: four ECCEs may exist within one PRB. Thus, if a MPDCCH format where AL≤4 performs localized transmission, the corresponding MPDCCH is transmitted in one PRB, and a DMRS for MPDCCH is transmitted only in the corresponding PRB. That is, a DMRS for the UE is not transmitted in PRBs other than the corresponding PRB.

Supporting multiplexing of MPDCCH and PDSCH between the same or different UEs within the same subframe (MPDCCH subframe)

The UE performs blind decoding (BD) for various MPDCCH formats supported.

Due to the signal characteristics of the MPDCCH, PRB bundling is not supported within an MPDCCH subframe. The PRB bundling refers to a method for allowing frequency interpolation to be performed between PRBs when the UE estimates channel, by applying the same precoding to different PRBs.

In this instance, a group of PRBs to which the same precoding is applied is called a precoding RB group (PRG).

Semi-Persistent Scheduling (SPS)

Semi-persistent scheduling (SPS) is a scheduling scheme in which resources are allocated to a specific UE so as to be continuously maintained for a specific time duration.

When a predetermined amount of data is transmitted for a specific time like Voice over Internet Protocol (VoIP), it is not necessary to transmit control information every data transmission interval for resource allocation, so the waste of control information can be reduced by using the SPS scheme. In the so-called SPS method, a time resource domain in which resources can be allocated to the UE is preferentially allocated.

In this instance, in the semi-persistent allocation method, the time resource domain region allocated to the specific UE may be configured to have periodicity. Then, the allocation of time-frequency resources is completed by allocating a frequency resource domain, if necessary or desired. The allocation of the frequency resource domain as above may be referred to as so-called activation. If the semi-persistent allocation method is used, repeated resource allocation need not be performed since the resource allocation is maintained during a predetermined period by one signaling, thereby reducing signaling overhead.

Thereafter, if resource allocation for the UE is no longer needed, signaling for releasing frequency resource allocation may be transmitted from the base station to the UE. Releasing the allocation of the frequency resource domain as above may be referred to as deactivation.

In the current LTE, for the SPS for uplink and/or downlink, the UE is preferentially informed in which subframes the SPS is to be transmitted/received via radio resource control (RRC) signaling. That is, the time resources are first designated among the time-frequency resources allocated for the SPS via RRC signaling. In order to notify the subframe which can be used, for example, a periodicity and an offset of the subframe may be notified. However, since the UE is allocated only the time resource domain via RRC signaling, even if the UE has received the RRC signaling, the UE does not immediately perform transmission/reception by the SPS, and completes the allocation of time-frequency resources by allocating the frequency resource domain, if necessary. The allocation of the frequency resource domain as above may be referred to as activation, and releasing the allocation of the frequency resource domain as above may be referred to as deactivation.

Thus, after receiving PDCCH indicating activation, the UE allocates the frequency resources according to RB allocation information included in the received PDCCH, and applies modulation and a code rate depending on Modulation and Coding Scheme (MCS) information to start transmission/reception according to the subframe periodicity and offset allocated via the RRC signaling.

Then, the UE stops transmission/reception when receiving the PDCCH indicating the deactivation from the base station. If the UE receives a PDCCH indicating activation or reactivation after stopping transmission and reception, the UE resumes again the transmission and reception with the subframe periodicity and offset allocated via RRC signaling using RB allocation or MCS designated by the PDCCH. That is, the allocation of time resources is performed via RRC signaling, but the transmission and reception of the actual signal may be performed after receiving the PDCCH indicating the activation and reactivation of SPS, and the interruption of the signal transmission/reception is performed after receiving the PDCCH indicating the deactivation of SPS.

Specifically, when SPS is enabled by RRC, the following information may be provided:
 SPS C-RNTI
 uplink SPS interval semiPersistSchedIntervalUL and the number of empty transmissions before implicit release, if SPS is enabled for the uplink
 whether twoIntervalsConfig is enabled or disabled for uplink, only for TDD
 downlink SPS interval semiPersistSchedIntervalDL and the number of configured HARQ processes for SPS, if SPS is enabled for the downlink,
 Unlike this, if SPS is disabled by the RRC, the corresponding configured grant or configured assignment shall be discarded.

Further, the SPS is supported on the SpCell only and is not supported for RN communication with the E-UTRAN in combination with an RN subframe configuration.

In relation to the downlink SPS, after a semi-persistent downlink assignment is configured, the MAC entity shall consider sequentially that the N-th assignment occurs in the subframe, as the following Equation 21.

In relation to the downlink SPS, after a semi-persistent downlink assignment is configured, the MAC entity shall consider sequentially that the N-th assignment occurs in the subframe, as the following Equation 21.

$$(10*SFN+subframe)=[(10*SFN\text{start time}+subframe\text{start time})+N*semiPersistSchedIntervalDL] \text{ modulo } 10240 \quad \text{[Equation 21]}$$

In Equation 21, SFNstart time and subframestart time denote a SFN and a subframe, respectively, at the time the configured downlink assignment was (re-)initialized. For BL UEs or UEs in enhanced coverage, the SFNstart time and the subframestart time may refer to a SFN and a subframe of the first transmission of PDSCH where configured downlink assignment was (re-)initialized.

In contrast, in relation to the uplink SPS, after the semi-persistent uplink assignment is configured, the MAC entity shall consider sequentially that the N-th grant occurs in a subframe, as the following Equation 22.

$$(10*SFN+subframe)=[(10*SFN\text{start time}+subframe\text{start time})+N*semiPersistSchedIntervalUL+ \text{Subframe\_Offset}*(N \text{ modulo } 2)] \text{ modulo } 10240 \quad \text{[Equation 22]}$$

In Equation 22, SFNstart time and subframestart time denote a SFN and a subframe, respectively, at the time the configured uplink grant was (re-)initialized. For BL UEs or UEs in enhanced coverage, the SFNstart time and the subframestart time may refer to a SFN and a subframe of the first transmission of PDSCH where configured uplink grant was (re-)initialized.

Table 38 below represents an example of an RRC message (SPS-Config) for specifying the above-described SPS configuration.

TABLE 38

```
-- ASN1START
MasterInformationBlock-NB ::=    SEQUENCE {
    systemFrameNumber-MSB-r13       BIT STRING (SIZE (4)),
    hyperSFN-LSB-r13                BIT STRING (SIZE (2)),
```

TABLE 38-continued

```
schedulingInfoSIB1-r13          INTEGER (0..15),
systemInfoValueTag-r13          INTEGER (0..31),
ab-Enabled-r13                  BOOLEAN,
operationModeInfo-r13           CHOICE {
   Inband-SamePCI-r13              Inband-SamePCI-NB-r13,
   Inband-DifferentPCI-r13         Inband-DifferentPCI-NB-r13,
   guardband-r13                   Guardband-NB-r13,
   standalone-r13                  Standalone-NB-r13
},
spare                           BIT STRING (SIZE (11))
ChannelRasterOffset-NB-r13 : := ENUMERATED {khz-7dot5, khz-2dot6, khz2dot6, khz7dot5}
Guardband-NB-r13 : :=           SEQUENCE {
   rasterOffset-r13                ChannelRasterOffset-NB-r13,
   spare                           BIT STRING (SIZE (3))
}
Inband-SamePCI-NB-r13 : :=      SEQUENCE {
   eutra-CRS-SequenceInfo-r13      INTEGER (0..31)
}
Inband-DifferentPCI-NB-r13 : := SEQUENCE {
   eutra-NumCRS-Ports-r13          ENUMERATED (same, four),
   rasterOffset-r13                ChannelRasterOffset-NB-r13,
   spare                           BIT STRING (SIZE (2))
}
Standalone-NB-r13 : :=          SEQUENCE {
   spare                           BIT STRING (SIZE (5))
}
--ASN1STOP
```

PDCCH/EPDCCH/MPDCCH Validation for Semi-Persistent Scheduling

A UE may validate PDCCH including an SPS indication if all the following conditions are met. First, CRC parity bits added for a PDCCH payload should be scrambled with SPS C-RNTI, and second, a new data indicator (NDI) field should be set to zero. In case of DCI formats 2, 2A, 2B, 2C and 2D, the new data indicator field refers to the one for the enabled transport block.

Further, the UE may validate EPDCCH including the SPS indication if all the following conditions are met. First, CRC parity bits added for an EPDCCH payload should be scrambled with SPS C-RNTI, and second, the new data indicator (NDI) field should be set to zero. In case of DCI formats 2, 2A, 2B, 2C, and 2D, the new data indicator field refers to the one for the enabled transport block.

Further, the UE may validate MPDCCH including the SPS indication if all the following conditions are met. First, CRC parity bits added for an MPDCCH payload should be scrambled with SPS C-RNTI, and second, the new data indicator (NDI) field should be set to zero.

When each field used for a DCI format is configured according to Table 39 or Tables 40, 41 42 below, the validation is completed. If the validation is completed, the UE recognizes the received DCI information as valid SPS activation or deactivation (or release). On the other hand, if the validation is not completed, the UE recognizes that non-matching CRC is included in the received DCI format.

Table 39 represents fields for PDCCH/EPDCCH validation indicating SPS activation.

TABLE 39

|  | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to '000' | N/A | N/A |

TABLE 39-continued

|  | DCI format 0 | DCI format 1/1A | DCI format 2/2A/2B/2C/2D |
|---|---|---|---|
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 40 represents fields for PDCCH/EPDCCH validation indicating SPS deactivation (or release).

TABLE 40

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |

Table 41 represents fields for MPDCCH validation indicating SPS activation.

TABLE 41

| | DCI format 6-0A | DCI format 6-1A |
|---|---|---|
| HARQ process number | set to '000' | FDD: set to '000' TDD: set to '0000' |
| Redundancy version | set to '00' | set to '00' |
| TPC command for scheduled PUSCH | set to '00' | N/A |
| TPC command for scheduled PUCCH | N/A | set to '00' |

Table 42 represents fields for MPDCCH validation indicating SPS deactivation (or release).

TABLE 42

| | DCI format 6-0A | DCI format 6-1A |
|---|---|---|
| HARQ process number | set to '000' | FDD: set to '000' TDD: set to '0000' |
| Redundancy version | set to '00' | set to '00' |
| Repetition number | set to '00' | set to '00' |
| Modulation and coding scheme | set to '1111' | set to '1111' |
| TPC command for scheduled PUSCH | set to '00' | N/A |
| Resource block assignment | Set to all '1's | Set to all '1's |

If the DCI format indicates SPS downlink scheduling activation, values of TPC command for the PUCCH field may be used as indexes representing four PUCCH resource values configured by higher layers.

Table 43 represents PUCCH resource values for downlink SPS.

TABLE 43

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

Downlink Control Channel Related Procedure in NB-IoT

A procedure related to narrowband physical downlink control channel (NPDCCH) used for NB-IoT will be described.

A UE shall monitor NPDCCH candidates (i.e., a set of NPDCCH candidates) as configured by higher layer signalling for control information, where monitoring may imply attempting to decode each of the NPDCCHs in the set according to all the monitored DCI formats. The set of NPDCCH candidates to monitor are defined in terms of NPDCCH search spaces. In this case, the UE may perform monitoring using identifiers (e.g., C-RNTI, P-RNTI, SC-RNTI, G-RNTI) corresponding to the respective NPDCCH search spaces.

In this case, the UE shall monitor one or more of a) Type1-NPDCCH common search space, b) Type2-NPDCCH common search space, and c) NPDCCH UE-specific search space. In this instance, a UE is not required to simultaneously monitor a NPDCCH UE-specific search space and a Type1-NPDCCH common search space. A UE is not required to simultaneously monitor a NPDCCH UE-specific search space and a Type2-NPDCCH common search space. A UE is not required to simultaneously monitor a Type-1-NPDCCH common search space and a Type2-NPDCCH common search space.

An NPDCCH search space at an aggregation level and a repetition level is defined by a set of NPDCCH candidates, where each NPDCCH candidate is repeated in a set of R consecutive NB-IoT downlink subframes excluding subframes used for transmission of system information (SI) messages starting with subframe k.

For the NPDCCH UE-specific search space, the aggregation and repetition levels defining the corresponding search spaces and the corresponding NPDCCH candidates being monitored are listed in Table 44 by substituting the value of $R_{max}$ with the higher layer configured parameter al-Repetition-USS.

TABLE 44

| | | NCCE indices of monitored NPDCCH candidates | |
|---|---|---|---|
| $R_{max}$ | R | L' = 1 | L' = 2 |
| 1 | 1 | {0}, {1} | {0, 1} |
| 2 | 1 | {0}, {1} | {0, 1} |
| | 2 | — | {0, 1} |
| 4 | 1 | — | {0, 1} |
| | 2 | — | {0, 1} |
| | 4 | — | {0, 1} |
| >=8 | $R_{max}/8$ | — | {0, 1} |
| | $R_{max}/4$ | — | {0, 1} |
| | $R_{max}/2$ | — | {0, 1} |
| | $R_{max}$ | — | {0, 1} |

Note 1:
{x}, {y} denote NPDCCH Format 0 candidate with NCCE index 'x' and NPDCCH Format 0 candidate with NCCE index 'y'.
Note 2:
{x, y} denotes NPDCCH Format 1 candidate corresponding to NCCE indexes 'x' and 'y'.

For the Type1-NPDCCH common search space, the aggregation and repetition levels defining the corresponding search spaces and the corresponding NPDCCH candidates being monitored are listed in Table 45 by substituting the value of $R_{max}$ with the higher layer configured parameter al-Repetition-CSS-Paging.

TABLE 45

| | | NCCE indices of monitored NPDCCH candidates | |
|---|---|---|---|
| $R_{max}$ | R | L' = 1 | L' = 2 |
| 1 | 1 | — | {0, 1} |
| 2 | 1, 2 | — | {0, 1} |
| 4 | 1, 2, 4 | — | {0, 1} |
| 4 | 1, 2, 4, 8 | — | {0, 1} |
| 16 | 1, 2, 4, 8, 16 | — | {0, 1} |
| 32 | 1, 2, 4, 8, 16, 32 | — | {0, 1} |
| 64 | 1, 2, 4, 8, 16, 32, 64 | — | {0, 1} |
| 128 | 1, 2, 4, 8, 16, 32, 64, 128 | — | {0, 1} |
| 256 | 1, 4, 8, 16, 32, 64, 128, 256 | — | {0, 1} |
| 512 | 1, 4, 16, 32, 64, 128, 256, 512 | — | {0, 1} |
| 1024 | 1, 8, 32, 64, 128, 256, 512, 1024 | — | {0, 1} |
| 2048 | 1, 8, 64, 128, 256, 512, 1024, 2048 | — | {0, 1} |

Note 1:
{x}, {y} denote NPDCCH Format 0 candidate with NCCE index 'x' and NPDCCH Format 0 candidate with NCCE index 'y'.
Note 2:
{x, y} denotes NPDCCH Format 1 candidate corresponding to NCCE indexes 'x' and 'y'.

For the Type2-NPDCCH common search space, the aggregation and repetition levels defining the corresponding search spaces and the corresponding NPDCCH candidates being monitored are listed in Table 46 by substituting the value of $R_{max}$ with the higher layer configured parameter npdcch-MaxNumRepetitions-RA.

TABLE 46

| $R_{max}$ | R | NCCE indices of monitored NPDCCH candidates | |
|---|---|---|---|
| | | L' = 1 | L' = 2 |
| 1 | 1 | — | {0, 1} |
| 2 | 1 | — | {0, 1} |
|   | 2 | — | {0, 1} |
| 4 | 1 | — | {0, 1} |
|   | 2 | — | {0, 1} |
|   | 4 | — | {0, 1} |
| >=8 | $R_{max}/8$ | — | {0, 1} |
|   | $R_{max}/4$ | — | {0, 1} |
|   | $R_{max}/2$ | — | {0, 1} |
|   | $R_{max}$ | — | {0, 1} |

Note 1:
{x}, {y} denote NPDCCH Format 0 candidate with NCCE index 'x' and NPDCCH Format 0 candidate with NCCE index 'y'.
Note 2:
{x, y} denotes NPDCCH Format 1 candidate corresponding to NCCE indexes 'x' and 'y'.

The locations of starting subframe k are given by k=kb, where kb is the b-th consecutive NB-IoT downlink subframe from subframe k0, b=u*R, and u=0, 1, . . . , ($R_{max}$/R)−1. Further, the subframe k0 refers to a subframe satisfying the following Equation 23.

$$(10n_s - \lfloor n_s/2 \rfloor) \bmod T - \alpha_{offset} \cdot T, \text{ where } T = R_{max} \cdot G \quad [\text{Equation 23}]$$

For NPDCCH UE-specific search space, G in Equation 23 is given by the higher layer parameter nPDCCH-startSF-UESS, and $\alpha_{offset}$ is given by the higher layer parameter nPDCCH-startSFoffset-UESS. For NPDCCH Type2-NPDCCH common search space, G in Equation 23 is given by the higher layer parameter nPDCCH-startSF-Type2CSS, and $\alpha_{offset}$ is given by the higher layer parameter nPDCCH-startSFoffset-Type2CSS. For Type1-NPDCCH common search space, k=k0 and is determined from locations of NB-IoT paging opportunity subframes.

If the UE is configured by high layers with a PRB for monitoring of NPDCCH UE-specific search space, the UE shall monitor the NPDCCH UE-specific search space on the higher layer configured PRB. In this case, the UE is not expected to receive NPSS, NSSS and NPBCH on the higher layer configured PRB. On the other hand, if the PRB is not configured by high layers, the UE shall monitor the NPDCCH UE-specific search space on the same PRB on which NPSS/NSSS/NPBCH are detected.

If a NB-IoT UE detects NPDCCH with DCI Format N0 ending in subframe n, and if the corresponding NPUSCH format 1 transmission starts from subframe n+k, the UE is not required to monitor NPDCCH in any subframe starting from subframe n+1 to subframe n+k−1.

If a NB-IoT UE detects NPDCCH with DCI Format N1 or DCI format N2 ending in subframe n, and if the corresponding NPDSCH transmission starts from subframe n+k, the UE is not required to monitor NPDCCH in any subframe starting from subframe n+1 to subframe n+k−1.

If a NB-IoT UE detects NPDCCH with DCI Format N1 ending in subframe n, and if the corresponding NPUSCH format 2 transmission starts from subframe n+k, the UE is not required to monitor NPDCCH in any subframe starting from subframe n+1 to subframe n+k−1.

If a NB-IoT UE detects NPDCCH with DCI Format N1 for "PDCCH order" ending in subframe n, and if the corresponding NPRACH transmission starts from subframe n+k, the UE is not required to monitor NPDCCH in any subframe starting from subframe n+1 to subframe n+k−1.

If a NB-IoT UE has a NPUSCH transmission ending in subframe n, the UE is not required to monitor NPDCCH in any subframe starting from subframe n+1 to subframe n+3.

A NB-IoT UE is not required to monitor NPDCCH candidates of an NPDCCH search space, if an NPDCCH candidate of the NPDCCH search space ends in subframe n, and if the UE is configured to monitor NPDCCH candidates of another NPDCCH search space starting before subframe n+5.

Regarding NPDCCH starting position, the starting OFDM symbol for NPDCCH is given by index $l_{NPDCCHStart}$ in the first slot in a subframe k. In this instance, if higher layer parameter operarionModeinfo indicates '00', or '01', the index $l_{NPDCCHStart}$ is given by the higher layer parameter eutaControlRegionSize. Alternatively, if higher layer parameter operarionModeInfo indicates '10', or '11', $l_{NPDCCHStart}=0$.

NPDCCH Validation for Semi-Persistent Scheduling (SPS)

A UE may decide a semi-persistent scheduling assignment NPDCCH is valid only if all the following conditions are met.
  the CRC parity bits obtained for the NPDCCH payload shall be scrambled with the semi-persistent scheduling C-RNTI.
  the new data indicator field shall be set to '0'.

If all the fields for DCI format N0 used are configured according to the following Table 48 or 49, the validity of NPDCCH can be validated.

TABLE 48

| | DCI format N0 |
|---|---|
| HARQ process number (present if UE is configured with 2 uplink HARQ processes) | set to '0' |
| Redundancy version | set to '0' |
| Modulation and coding scheme | set to '0000' |
| Resource assignment | set to '000' |

TABLE 49

| | DCI format N0 |
|---|---|
| HARQ process number (present if UE is configured with 2 uplink HARQ processes) | set to '0' |
| Redundancy version | set to '0' |
| Repetition number | set to '000' |
| Modulation and coding scheme | set to '1111' |
| Subcarrier indication | Set to all '1's |

If the validity of NPDCCH is validated, the UE shall consider the NPDCCH as a valid semi-persistent activation or release based on the received DCI information.

If the validity of NPDCCH is not validated, the UE shall consider the received DCI information as having been received with a non-matching CRC.

Downlink Control Information (DCI) Format

DCI transmits downlink or uplink scheduling information for one cell and one RNTI. The RNTI is implicitly encoded in the CRC.

As a DCI format related to NB-IoT, DCI format N0, DCI format N1, and DCI format N2 may be considered.

First, DCI format N0 is used for the scheduling of NPUSCH in one UL cell and may transmit the following information.

Flag for differentiation of format N0 and format N1 (e.g., 1 bit), where value 0 may indicate format N0, and value 1 may indicate format N1

Subcarrier indication (e.g., 6 bits)
Resource assignment (e.g., 3 bits)
Scheduling delay (e.g., 2 bits)
Modulation and coding Scheme (e.g., 4 bits)
Redundancy version (e.g., 1 bit)
Repetition number (e.g., 3 bits)
New data indicator (e.g., 1 bit)
DCI subframe repetition number (e.g., 2 bits)

Next, DCI format N1 is used for the scheduling of one NPDSCH codeword in one cell and a random access procedure initiated by a NPDCCH order. The DCI corresponding to the NPDCCH order is carried by NPDCCH.

The DCI format N1 may transmit the following information.

Flag for differentiation of format N0 and format N1 (e.g., 1 bit), where value 0 may indicate format N0, and value 1 may indicate format N1.

Format N1 is used for a random access procedure initiated by a NPDCCH order, only if NPDCCH order indicator is set to '1', format N1 cyclic redundancy check (CRC) is scrambled with C-RNTI, and all the remaining fields are set as follows.

Starting number of NPRACH repetitions (e.g., 2 bits)
Subcarrier indication of NPRACH (e.g., 6 bits)
All the remaining bits in format N1 are set to '1'
Otherwise, the following remaining information is transmitted.

Scheduling delay (e.g., 3 bits)
Resource assignment (e.g., 3 bits)
Modulation and coding scheme (e.g., 4 bits)
Repetition number (e.g., 4 bits)
New data indicator (e.g., 1 bit)
HARQ-ACK resource (e.g., 4 bits)
DCI subframe repetition number (e.g., 2 bits)

When the format N1 CRC is scrambled with a RA-RNTI, the following information (i.e., fields) among the above information (i.e., fields) are reserved.

New data indicator
HARQ-ACK resource

If the number of information bits in format N1 is less than the number of information bits in format N0, zeros shall be appended to format N1 until the payload size in format N1 is equal to the payload size in format N0.

Next, DCI format N2 is used for paging and direct indication and may transmit the following information.

Flag for differentiation of paging and direct indication (e.g., 1 bit), where value 0 may indicate direct indication, and value 1 may indicate paging.

If the value of flag is zero (Flag=0), DCI format N2 includes (or transmits) direct indication information (e.g., 8 bits) and reserved information bits that are configured so that the size is equal to the size of format N2 with Flag=1.

On the other hand, if the value of flag is 1 (Flag=1), DCI format N2 includes (or transmits) resource assignment (e.g., 3 bits), modulation and coding scheme (e.g., 4 bits), repetition number (e.g., 4 bits), and DCI subframe repetition number (e.g., 3 bits).

Resource Allocation for Uplink Transmission with Configured Grant

When PUSCH resource allocation is semi-statically configured by higher layer parameter ConfiguredGrantConfig in BWP information element, and PUSCH transmission corresponding to a configured grant is triggered, the following higher layer parameters are applied in the PUSCH transmission:

For Type 1 PUSCH transmission with a configured grant, the following parameters are given in ConfiguredGrantConfig.

The higher layer parameter timeDomainAllocation value m provides a row index m+1 pointing to an allocated table, and the allocated table indicates a start symbol, a length, and a combination of PUSCH mapping types. The table selection follows rules for the UE-specific search space defined in clause 6.1.2.1.1 of TS 38.214.

Frequency domain resource allocation is determined, for a given resource allocation type indicated by resourceAllocation, by the higher layer parameter frequencyDomainAllocation according to the procedure of clause 6.1.2.2 of TS 38.214.

IMcs is provided by higher layer parameter mcsAndTBS.

Number of DM-RS CDM groups, DM-RS ports, SRS resource indication, and DM-RS sequence initialization are determined as in Clause 7.3.1.1 of TS 38.212. The antenna port value, the bit value for DM-RS sequence initialization, precoding information and number of layers, the SRS resource indicator are provided by antennaPort, dmrs-SeqInitialization, precodingAndNumberOfLayers and srs-ResourceIndicator, respectively.

When frequency hopping is enabled, the frequency offset between two frequency hops can be configured by higher layer parameter frequencyHoppingOffset.

For Type 2 PUSCH transmission with a configured grant: the resource allocation follows the higher layer configuration according to [10, TS 38.321], and UL grant received on the downlink control information (DCI).

The UE does not transmit anything on the resources configured by ConfiguredGrantConfig, if the higher layers do not deliver a transport block to transmit on the resources allocated for uplink transmission without grant.

A set of allowed periodicities P are defined in [12, TS 38.331].

Transport Block Repetition for Uplink Transmission with a Configured Grant

The higher layer configuration parameters repK and repK-RV define K repetitions to be applied to a transmitted transport block and a redundancy version (RV) pattern to be applied to the repetition. For an n-th transmission occasion among K repetitions, where n=1, 2, . . . , K, the corresponding transmission is associated with (mod(n−1,4)+1)th value in the configured RV sequence. The initial transmission of a transport block may start in the following cases.

the first transmission occasion of the K repetitions if the configured RV sequence is {0,2,3,1}, any one of the transmission occasions of the K repetitions that are associated with RV=0 if the configured RV sequence is {0,3,0,3}, any one of the transmission occasions of the K repetitions if the configured RV sequence is {0,0,0,0} (except the last transmission occasion when K=8).

For any RV sequence, the repetitions shall be terminated when transmitting K repetitions, or at the last transmission occasion among the K repetitions within the period P, or when the UL grant for scheduling the same TB is received within the period P, whichever is reached first.

The UE is not expected to be configured with the time duration for the transmission of K repetitions larger than the time duration derived by the periodicity P.

For both Type 1 and Type 2 PUSCH transmissions, when the UE is configured with repK>1, the UE shall repeat the TB across the repK consecutive slots applying the same symbol allocation in each slot. If a UE procedure for determining the slot configuration defined in clause 11.1 of TS 38.213 determines a symbol of a slot allocated for PUSCH as a downlink symbol, a transmission in the corresponding slot is omitted for a multi-slot PUSCH transmission.

Uplink Power Control in NB-IoT

The uplink power control controls the transmit power of another uplink physical channel.

UE Behaviour for Uplink Power Control

The setting of the UE transmit power for a narrowband physical uplink shared channel (NPUSCH) transmission is defined as follows. For FDD, the UE is capable of enhanced random access power control [12], and it is configured by higher layers, and for TDD, enhanced random access power control shall be applied for a UE which started the random access procedure in the first or second configured NPRACH repetition level.

The UE transmit power $P_{NPUSCH,c}(i)$ for NPUSCH transmission in NB-IoT UL slot i for the serving cell c is given as follows:

For NPUSCH (re)transmissions corresponding to the random access response grant if enhanced random access power control is not applied, and for all other NPUSCH transmissions in which the number of repetitions of the allocated NPUSCH RUs is greater than 2:

$$P_{NPUSCH,c}(i) = P_{CMAX,c}(i) \text{ [dBm]} \quad \text{[Equation 24]}$$

Otherwise, $$P_{NPUSCH,c}(i) = \min \begin{Bmatrix} P_{CMAX,c}(i), \\ 10\log_{10}(M_{PUSCH,c}(i)) + P_{O\_NPUSCH,c}(j) + \alpha_c(j) \cdot PL_c \end{Bmatrix}$$
[dBm] [Equation 25]

where, for the serving cell c $P_{CMAX,c}(i)$ is the configured UE transmit power defined in [6] in NB-IoT UL slot i for the serving cell c.

$P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided from higher layers for j=1 and for the serving cell c, where j∈{1,2}. For NPUSCH (re)transmissions corresponding to a dynamic scheduled grant, then j=1, for NPUSCH (re)transmissions corresponding to a random access response grant, then j=2, $P_{O\_UE\_NPUSCH,c}(2)$=0. If enhanced random access power control is not applied, $P_{O\_NORMINAL\_NPUSCH,c}(2)$=$P_{O\_PRE}$+$\Delta_{PREAMBLE\_Msg3}$, where the parameter preambleInitialReceivedTargetPower [8] ($P_{O\_PRE}$) and $\Delta_{PREAMBLE\_Msg3}$ are signalled from higher layers for serving cell c. If enhanced random access power control is applied, $$P_{O\_NORMINAL\_NPUSCH,c}(2) = MSG3\_RECEIVED\_TARGET\_POWER + \Delta_{PREAMBLE\_Msg3} \quad \text{[Equation 26]}$$

For j=1, for NPUSCH format 2, $\alpha_c(j)$=1; for NPUSCH format 1, $\alpha_c(j)$ is provided by higher layers for serving cell c. For j=2, $\alpha_c(j)$=1.

$PL_c$ is the downlink path loss estimate calculated in the UE for serving cell c and $PL_c$=nrs-Power+nrs-PowerOffsetNonAnchor−NRSRP, where nrs-Power is provided by higher layers and subclause 16.2.2.2, and nrs-power-offsetNonAnchor is set to zero if it is not provided by higher layers.

Power Headroom

If the UE transmits NPUSCH in NB-IoT UL slot i for serving cell c, power headroom is computed using the following.

$$PH_c(i) = P_{CMAX,c}(i) - \{P_{O\_NPUSCH,c}(1) + \alpha_c(1) \cdot PL_c\}$$
[dB] [Equation 27]

Where, $P_{CMAX,c}(i)$, $P_{O\_NPUSCH,c}(1)$, $\alpha_c(1)$, and $PL_c$ are defined in subclause 16.2.1.1.1.

The power headroom shall be rounded down to the closest value in the set [PH1, PH2, PH3, PH4] dB as defined in [10], and the power headroom shall be delivered by the physical layer to higher layers.

EMBODIMENTS OF THE PRESENT DISCLOSURE

The contents (3GPP system, frame structure, NB-IoT system, etc.) described above can be applied in combination to methods according to the present disclosure to be described below, or can be supplemented to clarify technical features of methods described in the present disclosure.

Narrowband (NB)-LTE is a system for supporting low complexity and low power consumption with a system BW corresponding to 1 PRB of the LTE system. This may be mainly used as a communication method for implementing internet of things (IoT) by supporting devices such as machine-type communication (MTC) in a cellular system. By using, as OFDM parameters such as subcarrier spacing of the existing LTE, the same parameters as LTE, there is an advantage in that 1 PRB is allocated to the legacy LTE band for NB-LTE without additional band allocation, thereby enabling the frequency to be used efficiently. In case of downlink, a physical channel of NB-LTE is defined as NPSS/NSSS, NPBCH, NPDCCH/NEPDCCH, NPDSCH, etc., and N is added to distinguish from LTE.

In Legacy LTE and LTE eMTC, semi-persistent scheduling (SPS) has been introduced and used. First, the UE receives SPS configuration setup information via RRC signaling. Subsequently, if the UE receives SPS activation DCI (with SPS-C-RNTI), the SPS operates using SPS configuration information received via RRC signaling, resource scheduling information included in corresponding DCI, MCS information, etc. If the UE receives SPS release DCI (with SPS-C-RNTI), the SPS is released. Thereafter, if the UE receives again the SPS activation DCI (with SPS-C-RNTI), the SPS operates as described above. If the UE receives the SPS release DCI (with SPS-C-RNTI) and then receives SPS configuration release information via RRC signaling, the corresponding UE cannot detect the SPS activation DCI until receiving the SPS configuration setup information again (because the UE does not know the SPS-C-RNTI value).

The phrase 'monitoring a search space' used in the present disclosure means a process of decoding an NPDCCH for a specific area according to a DCI format to be received through the search space and then scrambling the corresponding CRC with a preset specific RNTI value to check whether a desired value is correct. In addition, since each UE in the NB-LTE system recognizes a single PRB as a respective carrier, it can be said that a PRB mentioned in the present disclosure has the same meaning as a carrier. DCI formats N0, N1, and N2 mentioned in the present disclosure refer to DCI formats N0, N1, and N2 in the 3GPP TS 36.212[2] standard.

In addition, the above contents (3GPP system, frame structure, NB-IoT system, etc.) may be applied in combination with methods according to the present disclosure described below, or may be supplemented to clarify technical features of methods described in the present disclosure.

Figure 15:
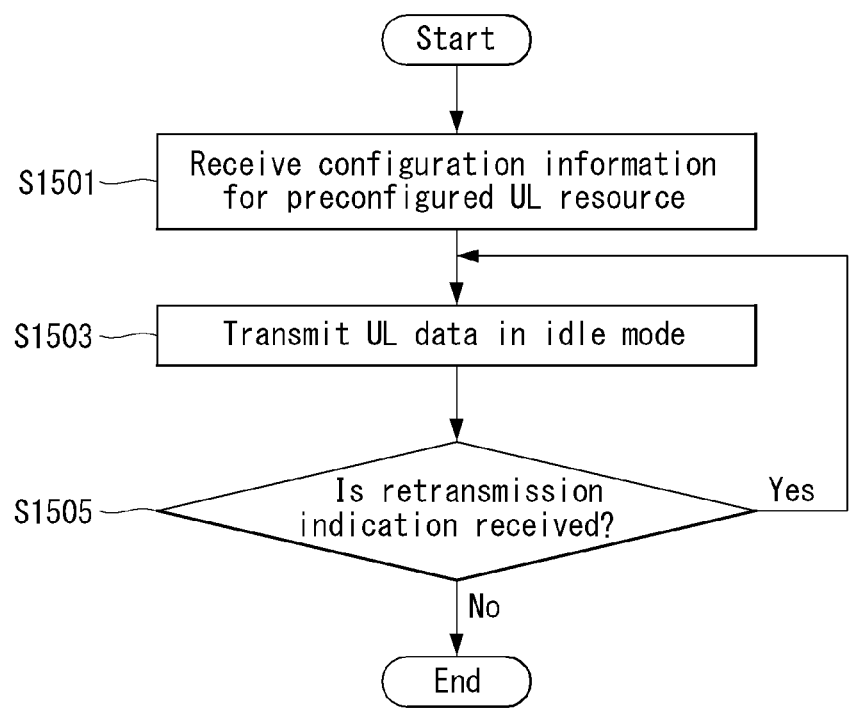
FIG. 15 illustrates an example of an operation flow chart of a UE performing an idle mode preconfigured UL resource transmission of one or more physical channels/signals to which a method described in the present disclosure is applicable.

FIG. 15 illustrates an example of an operation flow chart of a UE performing an idle mode preconfigured UL resource transmission of one or more physical channels/signals to which a method described in the present disclosure is applicable.

FIG. 15 illustrates merely an example for convenience of explanation, and does not limit the scope of the present disclosure.

Figure 16:
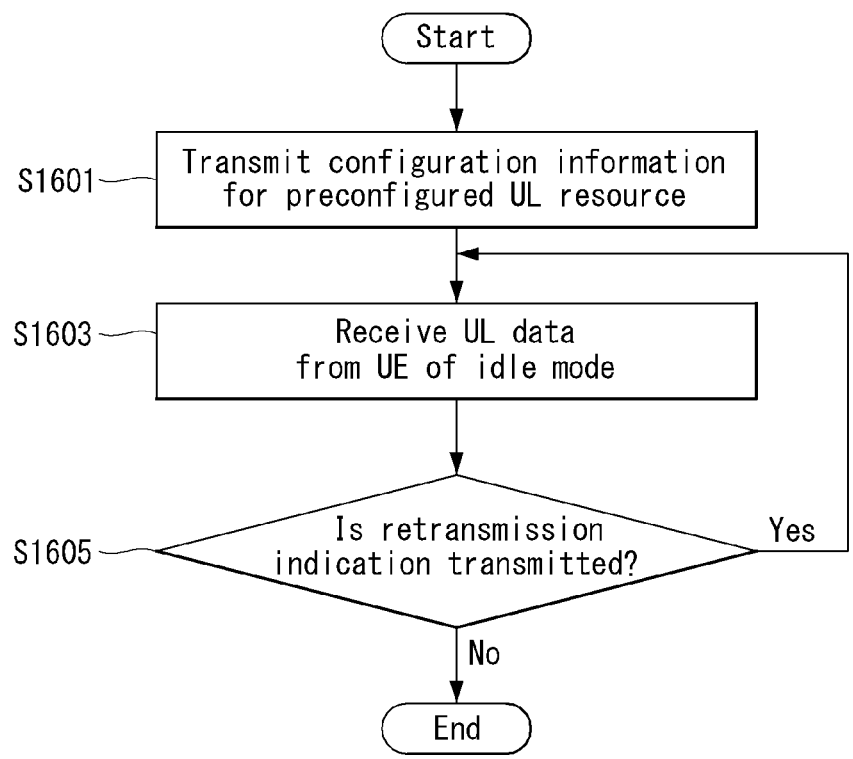
FIG. 16 illustrates an example of an operation flow chart of a base station performing an idle mode preconfigured UL resource transmission of one or more physical channels/signals to which a method described in the present disclosure is applicable.

FIG. 16 illustrates an example of an operation flow chart of a base station performing an idle mode preconfigured UL resource transmission of one or more physical channels/signals to which a method described in the present disclosure is applicable.

FIG. 16 illustrates merely an example for convenience of explanation, and does not limit the scope of the present disclosure.

Figure 17:
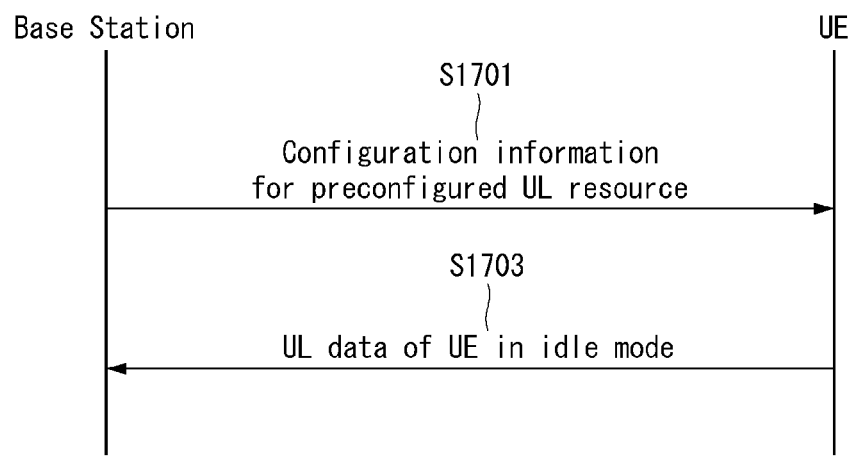
FIG. 17 illustrates an example of signalling between a UE and a base station performing idle mode preconfigured UL resource transmission/reception of one or more physical channels/signals to which a method described in the present disclosure is applicable.

FIG. 17 illustrates an example of signalling between a UE and a base station performing an idle mode preconfigured UL resource transmission/reception of one or more physical channels/signals to which a method described in the present disclosure is applicable.

FIG. 17 illustrates merely an example for convenience of explanation, and does not limit the scope of the present disclosure.

Figure 18:
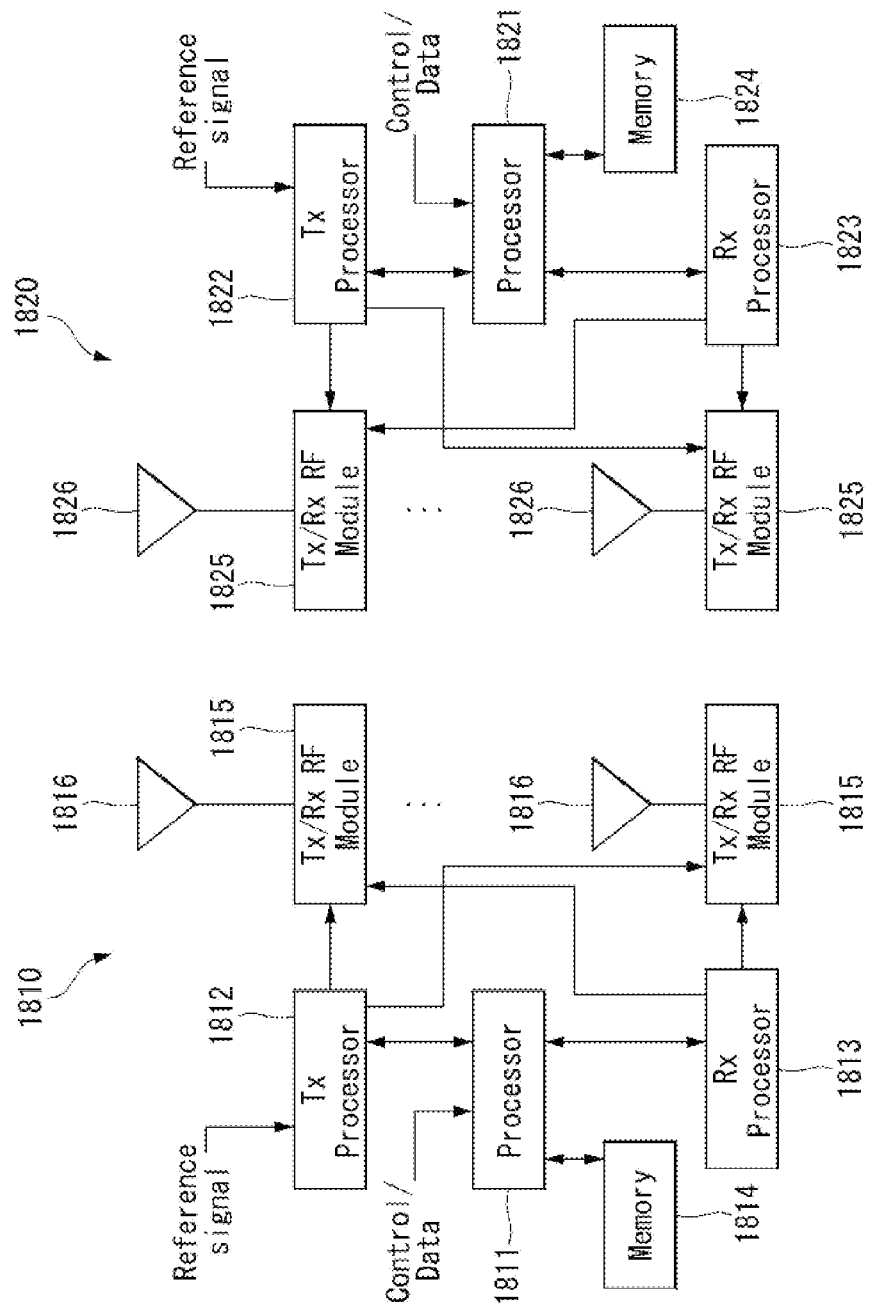
FIG. 18 illustrates a block configuration diagram of a wireless communication device to which methods described in the present disclosure are applicable.

FIG. 18 illustrates a block configuration diagram of a wireless communication device to which methods described in the present disclosure are applicable.

For example, an operation of the base station and the UE in FIGS. 15 to 17 and methods according to the present disclosure described below can be performed by a base station 910 and a UE 920 described below.

Referring to FIG. 18, a wireless communication system includes a base station 1810 and multiple UEs 1820 located in an area of the base station. The base station 1810 may be represented by a transmitter, and the UE 1820 may be represented by a receiver, or vice versa. The base station 1810 and the UE 1 820 respectively include processors 1811 and 1821, memories 1814 and 1824, one or more Tx/Rx RF modules 1815 and 1825, Tx processors 1812 and 1822, Rx processors 1813 and 1823, and antennas 1816 and 1826. The processors implement functions, processes, and/or methods mentioned above. More specifically, in DL (communication from the base station to the UE), an upper layer packet from a core network is provided to the processor 1811. The processor implements functionality of the L2 layer. In the DL, the processor provides multiplexing between a logical channel and a transport channel and radio resource allocation to the UE 1820 and is also responsible for signaling to the UE 1820. The transmit (Tx) processor 1812 implements various signal processing functions for the L1 layer (i.e., physical layer). The signal processing functions include coding and interleaving to facilitate forward error correction (FEC) at the UE. The coded and modulated symbols are split into parallel streams, and each stream is mapped to an OFDM subcarrier, multiplexed with a reference signal (RS) in time and/or frequency domain, and combined together using an Inverse Fast Fourier Transform (IFFT) to produce a physical channel carrying a time domain OFDMA symbol stream. The OFDMA stream is spatially precoded to produce multiple spatial streams. Each spatial stream may be provided to the different antenna 1816 via a separate Tx/Rx module (or transceiver 1815). Each Tx/Rx module may modulate an RF carrier with a respective spatial stream for transmission. At the UE, each Tx/Rx module (or transceiver 1825) receives a signal through the respective antenna 1826 of each Tx/Rx module. Each Tx/Rx module recovers information modulated onto an RF carrier and provides the information to the receive (Rx) processor 1823. The RX processor implements various signal processing functions of the Layer 1. The Rx processor may perform spatial processing on the information to recover any spatial stream destined for the UE. If multiple spatial streams are destined for the UE, they may be combined into a single OFDMA symbol stream by the multiple Rx processors. The Rx processor converts the OFDMA symbol stream from the time domain to the frequency domain using a Fast Fourier Transform (FFT). The frequency domain signal includes a separate OFDMA symbol stream for each subcarrier of the OFDM signal. The symbols on each subcarrier and the reference signal are recovered and demodulated by determining the most likely signal constellation points transmitted by the base station. These soft decisions may be based on channel estimation values. The soft decisions are decoded and de-interleaved to recover data and control signals that were originally transmitted by the base station on the physical channel. The corresponding data and control signals are provided to the processor 1821.

UL (communication from the UE to the base station) is processed at the base station 1810 in a manner similar to the description associated with a receiver function at the UE 1820. Each Tx/Rx module 1825 receives a signal through the respective antenna 1826. Each Tx/Rx module provides an RF carrier and information to the Rx processor 1823. The processor 1821 may be associated with the memory 1824 that stores a program code and data. The memory may be referred to as a computer readable medium.

First Embodiment: Feedback Channel Design for Preconfigured UL Resource (PUR)

The contents (3GPP system, frame structure, NB-IoT system, etc.) described above can be applied in combination to methods according to the present disclosure to be described below, or can be supplemented to clarify technical features of methods described in the present disclosure.

In Rel.16 NB-IoT, the concept of a UE transmitting UL data to a preconfigured UL resource in an idle mode is discussed. To this end, a base station may indicate a preconfigured UL resource, to which the UE transmits UL data, via SIB or RRC signaling when the UE is in the idle mode in which an Uplink TA is valid.

In this instance, the base station may configure the preconfigured UL resource to each UE in a dedicated resource type, or may configure the preconfigured UL resource to a plurality of UEs in a shared resource type. In general, the dedicated resource type may define UL data that can make it possible to predict which UE, what time point, or how much information to transmit. That is, the dedicated resource type has a disadvantage in that the UE shall always occupy UL resources from a resource utilization perspective, but it has an advantage of being able to transmit UL data without contention (e.g., contention free) because the UE has its own dedicated resource. On the other hand, the shared resource type may define UL data which cannot make it possible to predict which UE, what time point, and how much information. That is, the shared resource type may have a disadvantage in that the UE shall perform contention-based operation, but it is free from the resource utilization perspective compared to the dedicated resource type. For example, it is because a longer period can be made or because there is no need to prepare all resources for a plurality of UEs that wish PUR).

1-1 Embodiment: Different Resources+ACK/NACK Multiplexing

First, a method for a base station to multiplex ACK/NACK of UEs transmitted from different PURs and transmit the same at once is described. This method is described in detail below.

The base station may configure the PUR to the UE UE-specifically or CE level-specifically or cell-specifically via higher layer signaling. In the following, a CE mode may also be included in the CE level, where the CE mode may be a value selected by the CE level or a value set by the base station in the RRC connected mode. In this instance, if the base station UE-specifically configures the PUR to the UEs, the PUR may become a dedicated resource type of PUR, and if the base station configures the PUR to the UEs CE level-specifically or cell-specifically, the PUR may become a shared resource type of PUR. Additionally, the base station may also transmit search space (e.g., legacy CSS type or new CSS for PUR) information, to which feedback information (e.g., ACK/NACK) of respective PURs is transmitted, via higher layer signaling. Characteristically, since the base station considers multiplexing the ACK/NACK of respective PURs, the search space information to which the corresponding ACKs/NACKs are transmitted may be configured CE level-specifically or cell-specifically.

Thereafter, the UE receives/acquires PUR information configured by the base station via higher layer signaling received from the base station, and the UE transmits uplink data to the corresponding PUR if uplink data to be transmitted is generated. In this instance, characteristically, if the dedicated resource type of PUR is considered, time/frequency/code/spatial resource for PUR transmission may be differently configured for each UE.

A method for a base station to multiplex ACK/NACK for the transmitted UL data can be considered in various ways below.

As a first method for the base station to multiplex ACK/NACK, a method for the base station to transmit ACK/NACK information for a plurality of UL data to one search space may be considered. More specifically, the base station may be configured to indicate ACK/NACK by transmitting DCIs, that are different UE information and are distinguishable, to a plurality of (N)PDCCH candidates existing in a preconfigured search space. In this instance, a value that can be used as different UE information may be configured to use an RNTI value calculated based on a time/frequency/code/spatial resource location of a PUR transmitted by each UE and/or a unique UE ID.

Further, a UE that has entered a connected mode in a corresponding cell may be configured to use a C-RNTI value used in a previous connected mode. Characteristically, in a PUR of the shared resource type, if RNTI is generated only with the time/frequency/code/spatial resource location of a PUR, RNTI may all be calculated the same, so UE-specific information such as a unique UE ID may be considered essentially. In this instance, DCI indicating the corresponding ACK/NACK may not need to schedule the NPDSCH, and hence, a corresponding payload size may not be larger than a payload size of the legacy DCI (e.g., DCI format N0). Thus, the base station can send DCI, which is more than the existing search space, to the search space for the purpose of PUR feedback.

As another method for the base station to multiplex ACK/NACK, it may be configured such that an ACK/NACK mapping order is determined depending on a UL data transmission time/frequency/code/spatial resource location of a PUR configured by the base station (i.e., a relative location between resources within the PUR or a location of a PRB/base station transmit antenna port resource within absolute time/system BW). Characteristically, in a PUR of the dedicated resource type, the base station can configure a period of the corresponding PUR or a PUR window, starting subframe offset, a PRB index, a maximum TBS, etc., and can inform a UE in advance of information that ACK/NACK will be multiplexed with other UEs using the same or similar period, and the corresponding ACK/NACK multiplexing may exist in the form of a bitmap in the DCI field. In this instance, it may be configured such that the order in which ACK/NACK of a specific UE is transmitted is determined using a period of a corresponding PUR, a starting subframe offset, a PRB index, and a maximum TBS. Characteristically, in this case, UEs that expect the corresponding ACK/NACK multiplexing may be configured to use the same RNTI value.

Additionally, if the base station indicates NACK for UL data to the UE, it may be configured to indicate related adaptive retransmission information to a corresponding DCI field or NPDSCH payload scheduled by the corresponding DCI.

The method described above is illustrated in FIG. 19.

Figure 19:
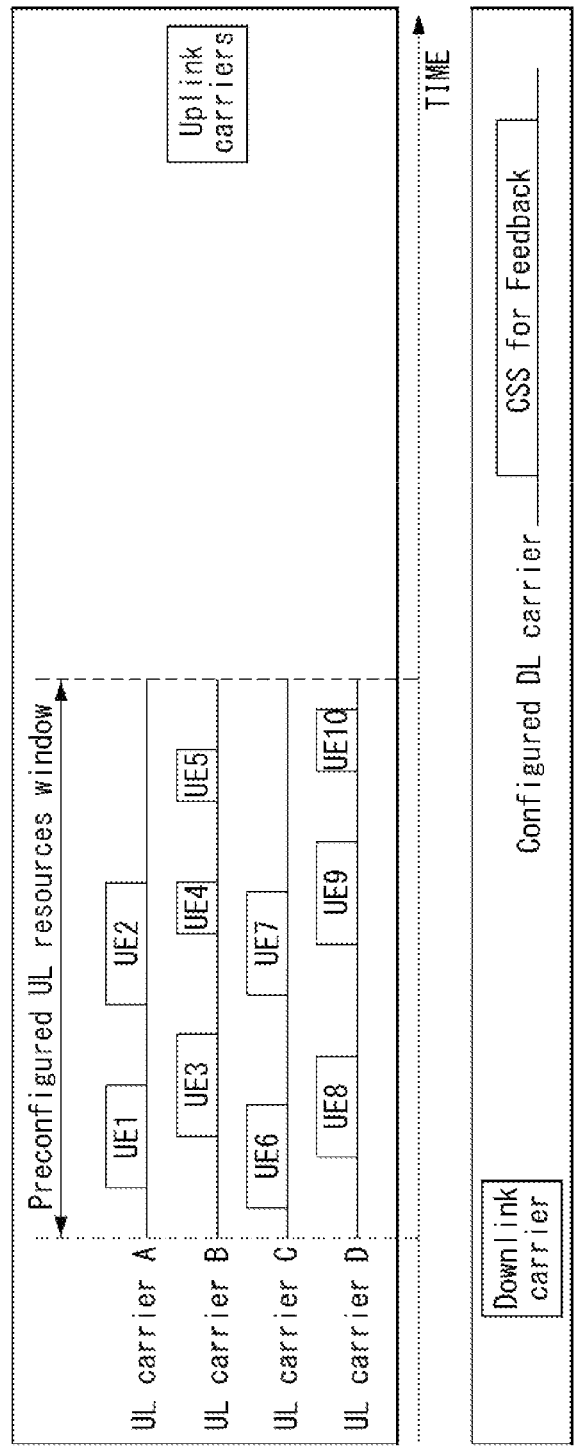
FIG. 19 illustrates a method of multiplexing different PURs and ACK/NACK.

FIG. 19 illustrates a method of multiplexing different PURs and ACK/NACK.

As illustrated in FIG. 19, it can be seen that ten UEs with different starting subframes transmit UL data on four different UL carriers. Characteristically, there may be one or multiple PURs given to each UE in the corresponding PUR window, and the base station may be configured to indicate ACK/NACK by reflecting the corresponding information. In this instance, the ACK/NACK is transmitted by being multiplexed to a DL configured carrier indicated in advance by the base station. This configuration has an advantage in terms of network overhead in that ACK/NACK of multiple UEs can be collected and transmitted at once.

Here, a feedback channel may also be determined as a specific window, and a UE needs to receive a feedback channel during a corresponding duration. This is because if resources used by UEs in the idle mode overlap a resource for a connected mode UE, the resource of the connected mode UE can be transmitted with a higher priority. Further, an actual duration of the corresponding window may vary depending on an operation mode in NB-IoT and/or whether a NB-IoT DL carrier is an anchor carrier or a non-anchor carrier. In case of MTC, it may vary depending on a system bandwidth and/or a duplex mode and/or frequency hopping.

As another method for the base station to multiplex ACK/NACK, it may be considered a method that configures such that the UE transmits UL data to a PUR and monitors an UL grant in a predetermined number of subframes or during a predetermined time duration. That is, if subframes locations for CSS are equally configured and the monitoring is required at the same place, the above-described method may be a method that configures such that the UE transmits UL data to a PUR and monitors an UL grant in a predetermined number of subframes or during a predetermined time duration. This method is characterized in that different UEs monitor UL grants at different locations, but the base station designates the corresponding predetermined number of subframes or predetermined time duration.

Further, when there is no more UL grant (e.g., retransmission UL grant) within the predetermined number of subframes or the predetermined time duration, the UE may be configured to delete a buffer containing the UL data that has been transmitted to the PUR. Alternatively, the base station may be configured to indicate to the UE the content that retransmission is no longer required using a specific field of the above UL grant or a combination of specific field values (e.g., NDI toggle+specific TBS value or specific RA value). If the base station supports the corresponding method, a battery saving effect of the UE can be improved.

Additionally, it may be configured to naturally transmit an additional TB and extend a time duration for viewing the search space when receiving the NDI toggled UL grant within the predetermined number of subframes or the predetermined time duration. Characteristically, this operation can be applied when an SR/BSR has been transmitted to a previous PUR.

1-2 Embodiment: Retransmission Resource Selection Details

Next, there is proposed a detailed method that selects/configures a retransmission resource when initial transmission transmitted by a UE becomes NACK so a base station requests retransmission.

Most simply, the base station may indicate to the UE that the UE performs adaptive retransmission through a specific field of DCI indicating ACK/NACK. The UE receiving this indication may be configured to perform retransmission of UL data to a location scheduled by the corresponding DCI field. However, it may be preferable to apply this method when UE contention is ongoing in the shared resource type of PUR. In this case, depending on whether the UE monitors the feedback for the initial transmission or monitors the feedback for the retransmission even though the UE transmits the same data, the search space may be different or the DCI configuration may be different.

On the other hand, in the dedicated resource type of PUR, the base station may be configured to indicate non-adaptive retransmission. Characteristically, the base station may also indicate non-adaptive retransmission to a next PUR that exists immediately after receiving corresponding ACK/NACK. This configuration has an advantage that the base station does not need to allocate an additional UL resource for PUR retransmission. However, there is also a disadvantage that the initial transmission of other data intended to be sent to the next PUR may be delayed due to retransmission of the previous data.

The base station may indicate the non-adaptive retransmission to pre-configured additional UL resources via higher layer signaling. In this method, it may be configured that the PUR is a concept that is used entirely for the initial transmission, and a UL resource dedicated for the retransmission is additionally configured to the UE. This method has an advantage that resources for the initial transmission are always secured, and also has an advantage that it is not necessary to allocate an additional UL resource when much retransmission does not occur. In this case, depending on whether the UE monitors the feedback for the initial transmission or the feedback for the retransmission even though the UE transmits the same data, the search space may be different or the DCI configuration may be different.

Among the above-described methods, in methods which define feedback for PUR and consider that the base station transmits ACK/NACK to the corresponding feedback channel, if, at this point, a UE does not receive DCI indicating the ACK/NACK, the UE may be configured to operate as follows.

Since it is explicitly configured to transmit ACK/NACK through DCI, if the UE does not receive the DCI indicating ACK/NACK, the UE may decide that a problem has occurred in the corresponding PUR transmission (i.e., NACK) and may perform retransmission to a resource for retransmission or to a PUR that exists thereafter. If resources for retransmission are configured as described above, there is an advantage in that reliability of data transmission of the UE is increased, but there may be a disadvantage from the battery life perspective of the UE because the retransmission shall be continuously performed until the DCI indicating ACK/NACK is received from the base station. On the other hand, in order to address the disadvantage, if the UE fails to receive the DCI indicating ACK/NACK, the UE decides that there is no problem in transmission of the corresponding PUR (i.e., ACK) and does not perform retransmission but performs initial transmission of other data to a PUR that exists thereafter. There may be an advantage from the battery life perspective of the UE, but there may be a disadvantage from the data reliability perspective. It may be configured to designate what to operate among the two methods when the base station allocates a first PUR to the UEs, or it may be configured to define one of the two methods in the disclosure. If the base station designates when allocating the first PUR, the base station may be configured to indicate it UE-specifically or resource-specifically (or cell/CE level-specifically) according to a service type. This method may also be applied to the method using the above group ACK/NACK.

In addition, if feedback for the PUR is defined and if a UE supposed to receive ACK/NACK on a corresponding feedback channel does not receive any feedback (e.g., ACK/NACK) a specific number of times (in this case, the specific number of times may be defined in base station configuration or speciation), the corresponding UE may be configured to release the corresponding PUR. In other words, the UE is supposed to receive feedback, and if the UE has performed the PUR transmission but there is no feedback therefor, the UE may determines that there is a problem with the corresponding PUR transmission because the base station may not know that the corresponding UE is performing the transmission. Therefore, it may be configured that the PUR can be released.

As another method, it may be configured such that the base station transmits to the UE ACK/NACK and a retransmission grant through DCI. That is, it may be configured that a 1-bit field indicating ACK/NACK always exists, and it may be configured that if the base station indicates NACK through a corresponding field, the UE performs retransmission by interpreting subsequent DCI fields (e.g., MCS, RU, repetition number, scheduling delay, etc.), and if the base station indicates ACK through the corresponding field, the subsequent DCI fields are reserved. However, in this case, there is a disadvantage that there are many reserved fields in the DCI in which ACK is indicated. Therefore, if NACK is indicated, it may be considered a method in which the consecutive DCI fields are other than configuration such as a legacy UL grant. That is, a retransmission-dedicated resource is already indicated along with a PUR configuration, and an MCS/TBS, repetition number, etc. may be configured to have the same value as a value used for initial PUR transmission or to have a short field indicating only delta. In other words, it can be seen as a method of using compact DCI as a whole. In this case, it is possible to solve the problem that many reserved fields remain if when ACK is indicated.

Additionally, PUR UEs receiving ACK/NACK or a retransmission grant through DCI in a NPDCCH search space for feedback may be configured to match the payload size of the DCI used for the corresponding feedback to the legacy DCI format N0/N1, and if so, the UEs can receive a DL grant in the NPDCCH search space for corresponding feedback. This means that if a UE transmits MSG3 or the like through a PUR, then an NPDSCH can be subsequently scheduled, and the UE can receive an RRC connection message such as connection (re-)establishment through the corresponding NPDSCH. To this end, the base station may be configured to scramble the DCI for the DL grant by using the same RNTI as an RNTI value configured to scramble the feedback DCI, and if the UE is also configured to expect to use the same RNTI value, the UE can receive the feedback DCI and the DL grant without increasing the number of DCI BDs in one search space.

In this instance, when the UE that has transmitted the PUR receives explicit ACK through the DCI on the feedback channel of the corresponding PUR as in the above method, if a DL grant rather than neither explicit ACK nor retransmission UL grant is transmitted to the corresponding DCI, the UE may be configured to determine that the previously transmitted PUR is implicitly ACK. That is, in order to transmit explicit ACK and transmit a DL grant, a field indicating ACK/NACK and fields capable of indicating a DL/UL grant shall be present together in one DCI field, but there is a disadvantage in that it is increased further than the legacy DCI size by 1 bit. Therefore, it may be configured that if the UE receives the DL grant from the base station as feedback for PUR transmission, the PUR is determined as implicitly ACK and an operation indicated by the corresponding DL grant (e.g., (N)PDCCH order or (N)PDSCH reception) is performed.

As another method, if a DL grant (neither explicit ACK nor a retransmission UL grant) is transmitted to DCI of a feedback channel of a PUR transmitted by a UE, and if the content indicated by the corresponding DL grant represents scheduling information of subsequent (N)PDSCH, it may be determined that the PUR transmitted by the UE is implicitly ACK. It may be configured that if the content indicated by the corresponding DL grant has been a (N)PDCCH ordered RACH procedure indication, it is determined that the PUR transmitted by the UE is implicitly NACK and the RACH procedure is performed (without retransmission for PUR).

Characteristically, it can be set that if a DL grant is transmitted to a PUR feedback channel and the corresponding DL grant indicates an (N)PDCCH order, the base station may be configured to indicate a (N)PRACH preamble for a legacy RACH procedure and may also be configured to indicate (N)PRACH preamble for a legacy EDT procedure. For example, if the corresponding DL grant indicates the (N)PDCCH order and if a corresponding cell and the UE support EDT, the UE/base station may be configured to explicitly indicate to a DCI format for the (N)PDCCH order (e.g., DCI format N1, DCI format 6-1A, B), by using 1 bit of reserved field, whether it is the (N)PRACH preamble for the RACH procedure or the (N)PRACH preamble for the EDT procedure. Since there are many reserved fields in the DCI for the (N)PDCCH order, the total DCI length does not increase so there is no big problem even if explicitly indicated.

As another method, if EDT is possible for both the UE and the base station and if both an EDT resource and an RACH resource exist in a carrier index and a CE level (i.e., repetition number) indicated by the (N)PDCCH order, the base station may configure that the UE selects and transmits the EDT. In this method, since the UE performs a PUR in the idle mode and performs the (N)PDCCH order in response to a request from the base station, it may be preferable to operate with the EDT rather than a legacy RACH. As such, if the base station can indicate the EDT in the (N)PDCCH order, the UE may be configured to transmit retransmission of the previous PUR through the EDT. Further, the UE may receive from the base station reconfiguration of the PUR through the EDT.

Among the proposed methods, if explicit ACK/NACK of the base station is transmitted to the UE on a PUR feedback channel, the following method may be considered instead of a method for the base station to add and use an independent field for indicating an actual explicit ACK/NACK. It may be configured that the base station use a field, that is not necessary when indicating PUR retransmission in the existing UL grant, to transmit explicit ACK/NACK. Table 53 shows DCI format N0 indicating an NB-IoT UL grant. That is, a field that is not necessary when used as a UL grant for PUR retransmission is flag for format N0/format N1 differentiation (i.e., it is not necessary when a DL grant is not received and only a UL grant is received), and redundancy version (i.e., it is not necessary when it is configured that the initial transmission UL grant for PUR is not provided). Therefore, the base station may configure that the UE reinterprets the corresponding field (e.g., Flag for format N0/format N1 differentiation or redundancy version or new data indicator, etc. and all types of fields that is not necessary when used as UL grant for PUR retransmission) as a field indicating explicit ACK/NACK. It may be configured that if it is configured that the DL grant along with the UL grant is transmitted to the PUR feedback channel, the redundancy version field is reinterpreted as a field indicating explicit ACK/NACK (in this instance, NACK may mean a UL grant that indicates retransmission).

TABLE 47

| Field | Number of Bits | Description |
| --- | --- | --- |
| Flag for format N0/format N1 differentiation | 1 | 0-N0. 1-N1 |
| Subcarrier indication | 6 | When Subcarrier Spacing = 15 Khz See 36.213 Table 16.5.1.1-1 When Subcarrier Spacing = 3.75 Khz nsc = Isc |
| Resource assignment | 3 | See 36.213 Table 16.5.1.1-2 |
| Scheduling delay | 2 | See 36.213 Table 16.5.1-1 |
| Modulation and coding scheme | 4 | See 36.213 Table 16.5.1.2-1 |
| Redundancy version | 1 | |
| Repetition number | 3 | See 36.213 Table 16.5.1.1-3 |
| New data indicator | 1 | |
| DCI subframe repetition number | 2 | |
| Total Number of Bits | 23 | |

As another method, explicit ACK may be defined similarly to the method applied to eMTC. The following explicit ACK has been discussed in Rel. 15 eMTC, and in 36.212 clause 5.3.3.1.10 and 5.3.3.1.11, it is introduced as follows.

If the Resource block assignment in format 6-0A is set to all ones, format 6-0A is used for the indication of ACK feedback, and all the remaining bits except Flag format 6-0A/format 6-1A differentiation and DCI subframe repetition number are set to zero.
<Omitted>

If the Modulation and coding scheme in format 6-0B is 4 bits and set to all ones, format 6-0B is used for the indication of ACK feedback, and all the remaining bits except Flag for format 6-0B/format 6-1 B differentiation and DCI subframe repetition number are set to zero.

In order to apply a similar method, a state not used for a UL grant in DCI format N0 is the same as the following Tables 50 and 51.

TABLE 50

| Subcarrier indication field ($I_{sc}$) | Set of Allocated subcarriers ($n_{sc}$) |
|---|---|
| 0-11 | $I_{sc}$ |
| 12-15 | $3(I_{sc} - 12) + \{0, 1, 2\}$ |
| 16-17 | $6(I_{sc} - 16) + \{0, 1, 2, 3, 4, 5\}$ |
| 18 | $\{0, 1, 2, 3, 4, 5, 6, 7, 8, 9, 10, 11\}$ |
| 19-63 | Reserved |

TABLE 51

| $I_{ITBS}$ | \multicolumn{8}{c}{$I_{RU}$} | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | 1224 |
| 8 | 120 | 256 | 392 | 536 | 680 | 808 | 1096 | 1384 |
| 9 | 136 | 296 | 456 | 616 | 776 | 936 | 1256 | 1544 |
| 10 | 144 | 328 | 504 | 680 | 872 | 1000 | 1384 | 1736 |
| 11 | 176 | 376 | 564 | 776 | 1000 | 1192 | 1608 | 2024 |
| 12 | 208 | 440 | 680 | 1000 | 1128 | 1352 | 1800 | 2280 |
| 13 | 224 | 488 | 744 | 1032 | 1256 | 1544 | 2024 | 2536 |

Therefore, as a method of indicating a UL grant using an unused state of DCI format N0, there may be a method for a UE/base station to configure subcarrier indication fields to all ones and set the remaining bits (except for the Flag for format N0/format N1 differentiation field when it is configured that a DL grant is transmitted along with a UL grant on the PUR feedback channel) to zero. As another method, there may be a method for a UE/base station to configure modulation and coding scheme fields to all ones and set the remaining bits (except for the Flag for format N0/format N1 differentiation field when it is configured that the DL grant is transmitted along with the UL grant on the PUR feedback channel) to zero. In this instance, since the modulation and coding scheme field has only 2 states (i.e., 14, 15) as reserved states and can be used for enhancement later, it may be more preferable to use the subcarrier indication field, which has a relatively large margin of reserved states (i.e., 48-63) and which is not easy to enhance later.

Additionally, the following method may be considered as a method for a UE/base station to indicate explicit NACK through a UL grant. Similar to the above proposal, a method for a UE/base station to configure a specific field (e.g., the subcarrier indication field) with a reserved state to all one and set the remaining bits to zero may be configured as explicit NACK. However, when explicit ACK is indicated by a method of configuring a specific field (e.g., subcarrier indication field) with the reserved state to all one and setting the remaining bits to zero, a method for a UE/base station to set the least bit value of the specific field (e.g., subcarrier indication field) with the reserved state (e.g., subcarrier) to 0 for explicit NACK and set the remaining bits to 1 (e.g., 111110) may be employed, and the remaining fields may be set to zero. That is, if this example is described in a different expression, it is a method for a UE/base station to use 63 of the reserved states of the subcarrier indication field as explicit ACK and use 62 of the reserved states as explicit NACK while all other bits are zero. Using this method has an advantage that an additional 1-bit field for ACK/NACK is not required. However, if explicit NACK is configured to use a reserved state as proposed above, there is a disadvantage in that the base station cannot indicate, to a UE, a UL resource for retransmission. If this method is used, the UE may be configured to receive explicit NACK and to select and perform either the RACH/EDT procedure or transmission to the next PUR.

In addition, as a method for the base station to more clearly indicate an operation of the UE, it may be configured to use a plurality of reserved states of a specific field (e.g., subcarrier indication field) with reserved states for explicit NACK. That is, for example, the base station may configure that 63 of the reserved states of the subcarrier indication field indicates explicit ACK while all other bits are zero, configure that 62 of the reserved states of the subcarrier indication field indicates explicit NACK, indicate that the UE performs the (CB) RACH procedure, configure that the reserved state 61 of the subcarrier indication field indicates an explicit NACK, indicate that the UE performs the (CB) EDT procedure, configure that reserved state 60 of the subcarrier indication field indicates explicit NACK, and indicate that the UE performs retransmission to the next PUR occasion (or a PUR occasion pre-configured by the base station). This method may be said to be a desirable operation in that the base station can accurately indicate a subsequent operation of the UE.

The proposed method of indicating explicit NACK through a UL grant can also be applied to eMTC. That is, in the case of CE mode A using format 6-0A, it may be configured to indicate explicit NACK by additionally using a reserved state of a resource block assignment field, and in the case of CE mode B using format 6-0B, it may be configured to indicate explicit NACK by additionally using a reserved state of the modulation and coding scheme.

In the above proposal, the reason why a specific state of the UL grant (where, the UL grant means a case where a downlink feedback channel (e.g., DCI) for PUR transmission is interpreted as a purpose for indicating uplink scheduling) is used to notify "data that the UE transmits to the PUR has failed to be detected by the base station" may be to indicate a fallback (e.g., entering a data transmission procedure through an EDT or a random access process) through a legacy operation, not to allocate a new resource for retransmission through the corresponding UL. That is, when it is determined that new resources to be allocated for retransmission by the UE are insufficient or that the reason for the failure to detect data previously received from the PUR is a transmission timing of the UE or that it is determined that there is a problem with the transmit power, the base station may fallback to a legacy operation so that transmission timing and power can be readjusted rather than allocating new uplink resources. Such an operation may be indicated by fixing the resource of the UL grant to a specific state (not indicating an actual uplink transmission resource) while indicating explicit NACK in a downlink feedback channel, and explicit NACK may be implicitly indicated by indicating a specific state other than a state which exists as a field independent of the UL grant or is used to indicate an actual uplink transmission resource within the UL grant, and combinations of the above-described specific fields may be examples therefor. In addition, a state not used in the UL grant may be used to indicate the release.

Additionally, when ACK/NACK for PUR is transmitted on (N)PDSCH(s), if the UE decodes DCI(s) for scheduling a corresponding (N)PDSCH(s) but fails to decode the corresponding (N)PDSCH(s), the base station may configure that the UE may regard the corresponding PUR as NACK, and the feedback (ACK/NACK) for the corresponding (N)PDSCH(s) does not need to be sent. That is, if the UE does not receive it although ACK/NACK is transmitted to DCI, the UE may regard the PUR as NACK, and even if the UE receives DCI but fails to decode the (N)PDSCH(s), the UE may regard a corresponding PUR as NACK. In this instance, since it is not necessary to use the HARQ-ACK resource field (4 bits) of DCI format N1 if it is configured that a feedback for the (N)PDSCH(s) is not required, it may be configured to reverse the corresponding field or to reduce a DCI size without using the field. In this instance, it is preferable to match a DCI payload size to perform BD on the DL grant and the UL grant as one RNTI. In addition, even if the UE succeeds to decode the corresponding (N)PDSCH (s), when the corresponding (N)PDSCH(s) is used to indicate ACK/NACK for PUR transmission, the ACK/NACK therefor may not be reported to an uplink. In such a case, a field used to indicate an ACK/NACK resource in DCI that schedules the corresponding (N)PDSCH(s) may be used for a different purpose or may be set to a random value or may not exist. Exceptionally, when the UE indicates the PUR release on the (N)PDSCH(s), the UE may report ACK (or NACK) therefor or transmit a response thereto on the (N)PUSCH. However, in the case of using the (N)PUSCH, information for configuring a UL resource such as a UL grant may be included in the (N)PDSCH. As described above, if an operation to be performed by the UE after interpretation of the (N)PDSCH information and/or detection of the corresponding (N)PDSCH may vary, the DCI that schedules the corresponding (N)PDSCH may include a method for interpretation information of the corresponding (N)PDSCH and indication information related to a subsequent operation of the UE.

In addition, if the payload size of DCI used for the feedback purpose is not matched to the legacy DCI format N0/N1 and a shorter compact DCI is used, a slightly different method may be applied. That is, if the UE transmits something such as MSG3 through a PUR, it may be configured to receive a DL grant in a legacy common search space (e.g., Type 1/2, 1A/2A NPDCCH CSS) that exists after a transmission time point. In this instance, the UE may configure that which legacy common search space the UE should monitor, and this is summarized as follows. Even in this case, a RNTI value that scrambles DCI for the corresponding DL grant may be configured to use the same value as the RNTI value that scrambles the feedback DCI of the PUR.

1) In the simplest way, it may be configured that the base station indicates to the UE which legacy common search space the base station shall monitor to receive the DL grant along with PUR configuration. In the case of a contention-free PUR, it may be configured to be designated UE-specifically, and in the case of contention-based PUR, it may be configured to be designated cell/resource (e.g., PUR)-specifically. Characteristically, it may be configured that a carrier index, a CE level, a period, $R_{max}$, etc. are included as legacy common search space information.

2) In another method, a legacy common search space associated with a PUR resource may be implicitly designated. For example, it may be configured to monitor a legacy common search space that exists after X subframe has passed from an end time of the PUR transmission among the legacy common search spaces that exist in the DL carrier corresponding to a UL carrier transmitting the PUR resource, and if the common search space does not exist in the corresponding carrier, it may be configured to monitor a legacy common search space that exists after X subframe has passed from a time when PUR transmission ends in an anchor carrier. The aforementioned legacy common search spaces may be Type 1/2, 1A/2A NPDCCH CSS, etc.

3) In a third method, a special search space is defined separately from an NPDCCH search space used for the feedback purpose, and thus it may be configured to receive the DL grant through a special search space that is indicated separately if the UE transmits MSG3, etc. to the PUR. Characteristically, a period of the special search space may be defined to be N times a period of the PUR resource, and the UE may be configured to transmit MSG3, etc. to the PUR immediately before a timing in which the corresponding special search space exists, where N may be a value less than 1. This may be the purpose of receiving indication of ACK/NACK, etc. when data, to which the retransmission is indicated, is retransmitted in a new uplink resource after the PUR that has transmitted the corresponding data, not after the next PUR. That is, when N is less than 1, if ACK for the PUR transmission is indicated, a special search space between a time of reception of the ACK and a next PUR may be allowed so that the UE cannot perform the monitoring. In addition, an NRS that the UE can always expect may be limited to a specific duration regardless of whether downlink feedback information is actually transmitted in the corresponding special search space.

Characteristically, when it is configured that the base station can explicitly configure a downlink carrier index in which a feedback channel is transmitted along with PUR configuration and when the downlink carrier index is actually explicitly configured, the UE may receive the feedback channel in the configured downlink carrier. If the base station does not specifically configure the downlink carrier in which the corresponding feedback channel (e.g., search space, etc.) can be transmitted, it may be configured to be basically delivered to an anchor carrier or it may be configured that the feedback channel is delivered to a DL carrier corresponding to a UL carrier in which PUR is configured.

In addition, when the base station indicates the UL grant to the feedback channel of the PUR, the UE may be configured to always regard it as indicating retransmission for the previously transmitted PUR and to perform retransmission for the same TB.

In addition, considering that the feedback channel of PUR is designed similarly to a legacy NPDCCH search space, a starting SF of the legacy search space is determined by an equation using $R_{max}$, npdcch-StartSF, and npdcch-Offset that the base station indicates as higher layer parameters. However, it may be undesirable that the search space in which the PUR feedback channel is transmitted is not related to PUR transmission, and it may be desirable to have a search space for the corresponding feedback channel after the PUR transmission proceeds. Therefore, in a (NB-IoT) DL subframe after X ms or X (NB-IoT) DL subframe (e.g., X=4) has passed from a PUR transmission start UL subframe or a PUR transmission end UL subframe, the (NB-IoT) DL subframe obtained by adding a value calculated using $R_{max}$, npdcch-StartSF, and npdcch-Offset of the corresponding search space that the base station indicates as higher layer parameters may become the starting subframe of the corresponding search space. Characteristically, a corresponding DL/UL subframe may be configured based on a valid subframe. In addition, if the UE receives HARQ feedback in the form of DCI from the base station, the base station may indicate a specific multiple of the period (i.e., NPDCCH Period) of the corresponding search space as a feedback window or may be defined and configured in the present disclosure. That is, if the base station has set N number of times of the search space period in which feedback DCI can be transmitted as the feedback window, the UE may transmit PUR and shall monitor whether feedback DCI is transmitted for a time corresponding to N times the search space period. If the feedback DCI has been received in a search space (or search space candidate) of a specific location while the UE is monitoring as much as the corresponding feedback window, it may be configured that other search spaces (or other search space candidates) in the next feedback window do not need to be monitored. In this configuration, there is an advantage in terms of the battery life of the UE because the UE does not need to perform additional monitoring.

In a search space that a UE monitors after transmitting data to the PUR (the corresponding search space may be a channel for scheduling retransmission or HARQ feedback for data transmitted to the PUR or may be configured to the UE for (a-)periodically transmitted channel for TA and/or TPC adjustment), it may be configured that the UE can expect a reference signal (e.g., NRS) regardless of whether or not the feedback channel is transmitted in the corresponding search space. This may be the purpose of an automatic gain control (AGC) of the UE, time/frequency sync., early blind detection termination, etc. Here, a subframe in which the NRS can be transmitted may be limited to Y subframe after the start of the search space from a location preceding a subframe configured such that the search space is transmitted (e.g., a subframe preceding the X subframe, where X is a positive integer), where Y may vary depending on a length of the corresponding search space (e.g., maximum length/number of repeated transmissions).

For the above purposes (e.g., the UE's AGC, time/frequency sync., etc.) and for UL power control through TA validation and DL path loss measurement, a subframe in which the UE can always expect an NRS may be additionally configured at a time point that is earlier than the PUR by Z subframe (where Z is a positive integer). That is, a downlink subframe for this purpose may be configured in a positional relationship relative to the PUR, and a transmission period may also be indirectly derived from a parameter related to a PUR period. However, the corresponding downlink subframe may not exist for each PUR, and for example, a subframe for this purpose (which means that the UE can expect an NRS) may be configured before the Z subframe every K PURs (i.e., every K-th PUR).

The downlink carrier, in which the search space monitored by the UE after transmission of data to a PUR considered in the method proposed above can be transmitted, includes not only an anchor carrier but also a non-anchor carrier.

Additionally, when retransmission is performed on a PUR, a method for distinguishing whether UL data transmitted to the corresponding PUR is initial transmission or retransmission may be required for the base station. Characteristically, in a contention-free PUR (e.g., dedicated PUR, contention free shared PUR), the base station may UE-specifically indicate a DMRS sequence for the initial transmission and a DMRS sequence for the retransmission. Alternatively, for the DMRS sequence for the retransmission, a sequence having a specific relationship from the DMRS sequence may be indicated by the base station or may be defined in the present disclosure. In this instance, the specific relationship means that an index for the initial transmission among indexes for selecting a base sequence of DMRS sequences may be indicated by the base station (e.g., k), that an index for the retransmission may be defined as (k+m) mod N (where N is the total number of base sequences for each length, and mod is a modular operation), and that a value of m may be defined UE-specifically or cell-specifically. For the contention-based shared PUR, the base station may configure cell/CE mode-specifically or resource (e.g., PUR)-specifically the DMRS sequence set for the initial transmission and the DMRS sequence set for the retransmission. Alternatively, the above-proposed relationship between the DMRS sequence for the initial transmission and the DMRS sequence for the retransmission is also applied here, and when the UE selects the DMRS sequence for the initial transmission, the DMRS sequence for the retransmission may be configured to be determined according to the corresponding rule. In this configuration, there is an advantage that the base station can determine, through DMRS detection, whether the UL data to be transmitted to a specific PUR is initially transmitted or retransmitted. Characteristically, the DMRS sequence may be applied by substituting a specific sequence known to each other between the base station and the terminal.

Next, even though the base station sets an RNTI value that the PUR UE can use, if the number of idle mode UEs to perform PUR increases, overlapping with a C-RNTI value for a connected mode UE may be inevitable. In addition, the base station may configure search spaces smartly and independently not to cause a collision, but since there is no guarantee for the UE that the base station always configures the search spaces smartly, there may be some cases where a search space dedicated to PUR feedback and a UE-specific search space of another connected mode UE partially overlap. Therefore, in order to solve this problem, the following method may be considered.

Method 1:

If a DCI payload size for delivering PUR feedback is made the same as a payload size of any one of legacy DCI formats N0/N1/N2, the DCI payload size may be configured to be different all the time by adding an arbitrary bit(s) (e.g., 1 bit zero padding) to DCI that delivers a PUR feedback. If this is applied to eMTC, it may be configured by applying it to legacy DCI formats 6-0A/6-1A/6-0B/6-1B/6-2. As such, if the DCI payload size is always different, there is an advantage that ambiguity does not occur between UEs even if a plurality of RNTI values is overlapped.

Method 2:

As another method, the number of bits of RNTI used to scrambling DCI for delivering PUR feedback may be set to be more than the number of bits of RNTI used in the connected mode, and it may be configured that one of RNTI values not overlapping with the RNTI values used in the connected state is assigned to a PUR UE. For example, when the number of RNTI bits is increased by n bits, one of values from 216 to 216+n−1 may be selected and allocated, except for values from 0 to 216−1 which legacy 16 bits RNTI can have.

Method 3:

In another method, a method may be considered, which allows initialization of a scrambling sequence used for DCI for delivering PUR feedback to be different from initialization of a legacy NPDCCH scrambling sequence. As such, if the initialization of the scrambling sequence is configured differently as described above, there is an advantage that ambiguity does not occur in decoding DCI between UEs with overlapping RNIT values.

Method 4: In another method, a method may be considered, which removes ambiguity between UEs, differently from a legacy DCI mapping method, in a DCI RE mapping step for the purpose of delivering PUR feedback. Currently, the legacy DCI mapping is being performed as follows.

"The mapping to resource elements (k, l) on antenna port p meeting the criteria above shall be in increasing order of first the index k and then the index l, starting with the first slot and ending with the second slot in a subframe". Therefore, "decreasing order of first index k and then the index l, starting with the first slot and ending with the second slot in a subframe" may be configured to be applied by setting the mapping order to the decreasing order not the increasing order in the DCI RE mapping step for the purpose of delivering feedback of PUR, "increasing order of first the index l and then the index k, starting with the first slot and ending with the second slot in a subframe" may be configured to be applied by reordering the index k and the index l, and "increasing order of first the index k and then the index l, starting with the second slot and ending with the first slot in a subframe." may be configured to be applied by applying the mapping method starting with the second slot and ending with the first slot.

Second Embodiment: Transmit Power Control for Preconfigured UL Resource (PUR)

A transmit power control method for PUR is described in detail below.

2-1 Embodiment: PUR Transmit Power Ramping Depending on Number of Transmissions and/or Number of Feedback Receptions First, a method of TX power ramping for PUR depending on the number of transmissions and/or the number of feedback receptions may be considered. Characteristically, the power ramping method may be mainly applied to PUR of a shared resource type that requires contention between UEs.

The base station may be configured to indicate initial TX power that can be used when transmitting UL data in the PUR. Alternatively, it may be configured that the corresponding TX power value is determined in the present disclosure. Thereafter, the UE may be configured to transmit UL data to the PUR using the corresponding initial TX power value. In this instance, the base station may be configured to give feedback for the corresponding UL data, and the base station may be configured to indicate, to the UE, a location at which the corresponding feedback is given.

Here, the initial TX power may be different from TPC for transmission of an existing (N)PRACH preamble, and one or more TPC settings may exist according to resources that the UE can select from shared resources (e.g., (N)PUSCH resource or TBS, etc.).

After the UE transmits UL data to a PUR using an initial TX power value, if the feedback has not been received although there was an opportunity that a feedback could be transmitted from the base station as many times as a specific number of times (e.g., N number of times, where N is a positive integer greater than or equal to 1) which is preset or is indicated by the base station, it may be configured to ramp the TX power in the next PUR transmission. Characteristically, a power ramping interval may also be configured as indicated by the base station, and the number of times that the power can be ramped at maximum may also be configured as indicated by the base station. If the UE receives NACK is received after transmitting UL data to a PUR, the UE transmits the UL data while maintaining the existing TX power as many times as a specific number of times (e.g., M number of times, where M is a positive integer greater than or equal to 1) which is preset or is indicated by the base station. If NACK is continuously received even after the UL data has been transmitted M number of times, it may be configured to perform power ramping when next UL data is transmitted.

Thereafter, if the UE transmits UL data using MAX power that can be transmitted through the power ramping by repeating the aforementioned power ramping, the UE may be configured to change a resource type or to change a period of a PUR if the feedback has not been received although there was an opportunity that a feedback could be transmitted by the base station as many times as a specific number of times (e.g., L number of times, where L is a positive integer greater than or equal to 1) which is preset or is indicated by the base station. Alternatively, it may be configured that the UE requests the base station to change the resource type. Characteristically, in order to configure this way, the base station shall configure a plurality of PURs in a corresponding cell, and the resource type need to be configured with both the dedicated resource type and the shared resource type. If the UE transmits a request to change the resource type from the shared resource to the dedicated resource and the base station wishes to respond to the request, the base station may newly configure a UE-specific PUR to the corresponding UE. In this instance, the base station may be configured to change the resource type as requested by the UE and also newly indicate TX power. Alternatively, if the UE receives an indication of the base station that the resource type can be changed, it may be configured to be reset to the initial TX power value used for a previous PUR.

On the other hand, after the UE transmits UL data to a PUR using a specific TX power value, if the UE has received ACK within a preset specific time as many times as a specific number of times (e.g., C number of times, where C is a positive integer greater than or equal to 1) which is preset or is indicated by the base station, the UE may be configured to reduce the TX power in the next PUR transmission. Characteristically, an interval for reducing power may be set as indicated by the base station, and the smallest TX power value may also be set as indicated by the base station.

In addition, if the UE fails to transmit PUR more than a preset specific number of times (e.g., N number of times) using MAX power that can be transmitted through the power ramping by repeating the aforementioned power ramping, it may be configured to self-release the corresponding PUR and perform a fallback operation. Here, the fallback operation may include attempting to transmit data through an EDT procedure, performing a RACH procedure for entering an RRC connected mode, or performing a predefined operation for TA update. If a PUR is shared with other users, after a transmission failure in the PUR at a specific location, data transmission is not immediately performed at a subsequent PUR and it may be configured that data transmission is performed in a PUR at a preset location.

Thereafter, if the UE transmits UL data using MAX power that can be transmitted through the power ramping by repeating the aforementioned power ramping, the UE may be configured to change a resource type or to change a period of a PUR if the feedback has not been received although there was an opportunity that a feedback could be transmitted by the base station as many times as a specific number of times (e.g., L number of times, where L is a positive integer greater than or equal to 1) which is preset or is indicated by the base station. Alternatively, it may be configured that the UE requests the base station to change the resource type. Characteristically, in order to configure this way, the base station shall configure a plurality of PURs in a corresponding cell, and the resource type need to be configured with both the dedicated resource type and the shared resource type. If the UE transmits a request to change the resource type from the shared resource to the dedicated resource and the base station wishes to respond to the request, the base station may newly configure a UE-specific PUR to the corresponding UE. In this instance, the base station may be configured to change the resource type as requested by the UE and also newly indicate TX power. Alternatively, if the UE receives an indication of the base station that the resource type can be changed, it may be configured to be reset to the initial TX power value used for a previous PUR.

On the other hand, after the UE transmits UL data to a PUR using a specific TX power value, if the UE has received ACK within a preset specific time as many times as a specific number of times (e.g., C number of times, where C is a positive integer greater than or equal to 1) which is preset or is indicated by the base station, the UE may be configured to reduce the TX power in the next PUR transmission. Characteristically, an interval for reducing power may be set as indicated by the base station, and the smallest TX power value may also be set as indicated by the base station.

In addition, if the UE fails to transmit PUR more than a preset specific number of times (e.g., N number of times) using MAX power that can be transmitted through the power ramping by repeating the aforementioned power ramping, it may be configured to self-release the corresponding PUR and perform a fallback operation. Here, the fallback operation may include attempting to transmit data through an EDT procedure, performing a RACH procedure for entering an RRC connected mode, or performing a predefined operation for TA update. If a PUR is shared with other users, after a transmission failure in the PUR at a specific location, data transmission is not immediately performed at a subsequent PUR and it may be configured that data transmission is performed in a PUR at a preset location.

2-3 Embodiment: Transmit Power Configuration for PUR Transmission

Next, a method of configuring UL TX power of a UE for PUR transmission is proposed. In the simplest method, it may be configured that a UE that enters an idle mode and wishes to transmit a PUR uses as it is TX power used for (N)PUSCH transmission used in the connected mode immediately before entering the idle mode. Here, using as it is the TX power used for the (N)PUSCH transmission may mean using as it is a component among TX power components, except for a value that varies depending on a path loss measurement value, the number of RB/subcarriers used for the (N)PUSCH transmission, and a coding rate. Alternatively, it may be configured to use a value obtained by adding a specific offset to all the corresponding TX power values (or a specific parameter for calculating the TX power values), and it may be configured that the specific offset is indicated by the base station UE-specifically, PUR-specifically, CE level-specifically, or the like.

Characteristically, if PUR configuration is not proceeded in the connected mode (e.g., if the PUR configuration is indicated through EDT), it may be configured to use as it is TX power values used for PUSCH transmission containing MSG3, and it may be configured to use a value obtained by adding a specific offset to all the corresponding TX power values (or to a specific parameter for calculating the TX power values). Characteristically, in NB-IoT, it may be configured to determine the TX power such as (NPRACH target power)/(MSG3 target power)+specific offset (e.g., delat_preamble_MSG3). In eMTC, it may be configured to determine the TX power such as (PRACH target power)+specific offset (e.g., delat_preamble_MSG3). It may be configured that the aforementioned specific offset is indicated by the base station UE-specifically, PUR-specifically, CE level-specifically, or the like.

The proposed methods may be applied when it not in CE mode B in the case of eMTC, and in the case of NB-IoT when the number of RU repetitions is 2 or less and when the enhanced random access power control is not configured while the number of RU repetitions is 2 or more. That is, the above proposed method may be applied when it is in CE mode B in the case of eMTC, and in the case of NB-IoT when the enhanced random access power control is configured while the number of RU repetitions is 2 or more, but it may be configured to transmit using the maximum TX power of a PUR transmission UE.

Figure 20:
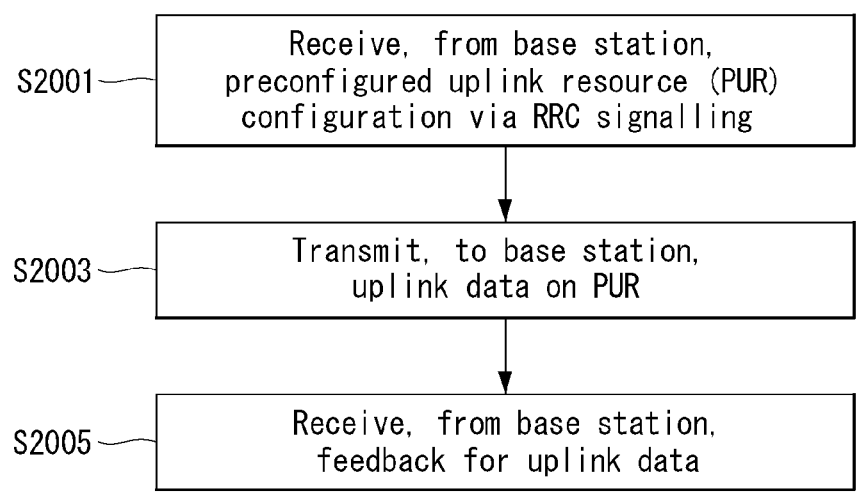
FIG. 20 is a flow chart illustrating a method for a UE to receive a feedback from a base station in a wireless communication system supporting narrowband (NB)-Internet of Things (IoT) according to an embodiment of the present disclosure.

FIG. 20 is a flow chart illustrating a method for a UE to receive a feedback from a base station in a wireless communication system supporting narrowband (NB)-Internet of Things (IoT) according to an embodiment of the present disclosure.

First, a UE may receive, from a base station, a preconfigured uplink (UL) resource (PUR) configuration via RRC signalling in S2001.

Subsequently, when the UE is in an idle mode, the UE may transmit, to the base station, uplink data on the PUR in S2003.

Finally, the UE may receive, from the base station, a feedback for the uplink data in S2005.

The feedback may be configured to be received on an NPDCCH after a specific time has passed from the PUR transmission.

The specific time may be a specific number of at least one subframe.

The specific number may be four.

The UE may monitor a feedback window on a search space for receiving the feedback and may stop the monitoring based on whether or not DCI including the feedback is received on the feedback window.

The UE may be configured to receive, from the base station, a response on other second field excluding a first field required to indicate a PUR retransmission from a plurality of fields included in a UL grant.

Figure 21:
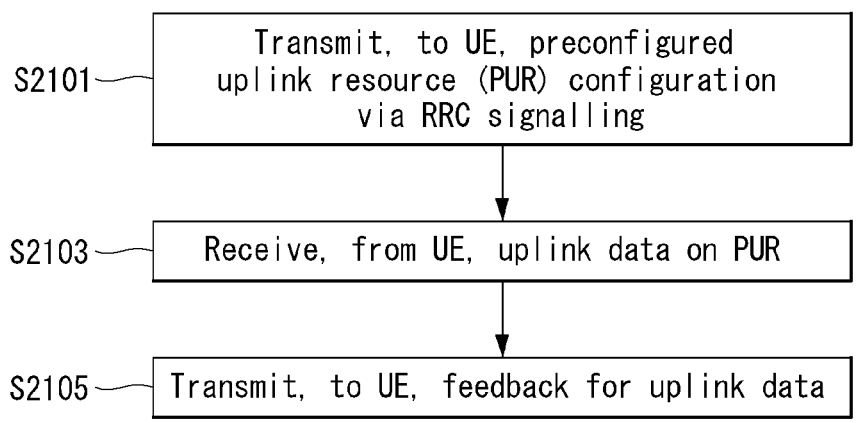
FIG. 21 is a flow chart illustrating a method for a base station to transmit a feedback to a UE in a wireless communication system supporting NB-IoT according to an embodiment of the present disclosure.

FIG. 21 is a flow chart illustrating a method for a base station to transmit a feedback to a UE in a wireless communication system supporting narrowband (NB)-Internet of Things (IoT) according to an embodiment of the present disclosure.

First, a base station may transmit, to a UE, a preconfigured uplink (UL) resource (PUR) configuration via RRC signalling in S2101.

Subsequently, when the UE is in an idle mode, the base station may receive, from the UE, uplink data on the PUR in S2103.

Finally, the base station may transmit, to the UE, a feedback for the uplink data in S2105.

The feedback may be configured to be transmitted on an NPDCCH after a specific time has passed from the PUR reception.

A UE or a device described in the present disclosure with reference to FIGS. 22 to 26 may be implemented to perform methods described in the present disclosure with reference to FIGS. 20 and 21.

Example of Communication System to which the Present Disclosure is Applied

Although not limited thereto, but various descriptions, functions, procedures, proposals, methods, and/or operation flowcharts described in the present disclosure can be applied to various fields requiring wireless communication/connection (e.g., 5G) between devices.

Hereinafter, the communication system will be described in more detail with reference to drawings. In the following drawings/descriptions, the same reference numerals will refer to the same or corresponding hardware blocks, software blocks, or functional blocks, if not differently described.

Figure 22:
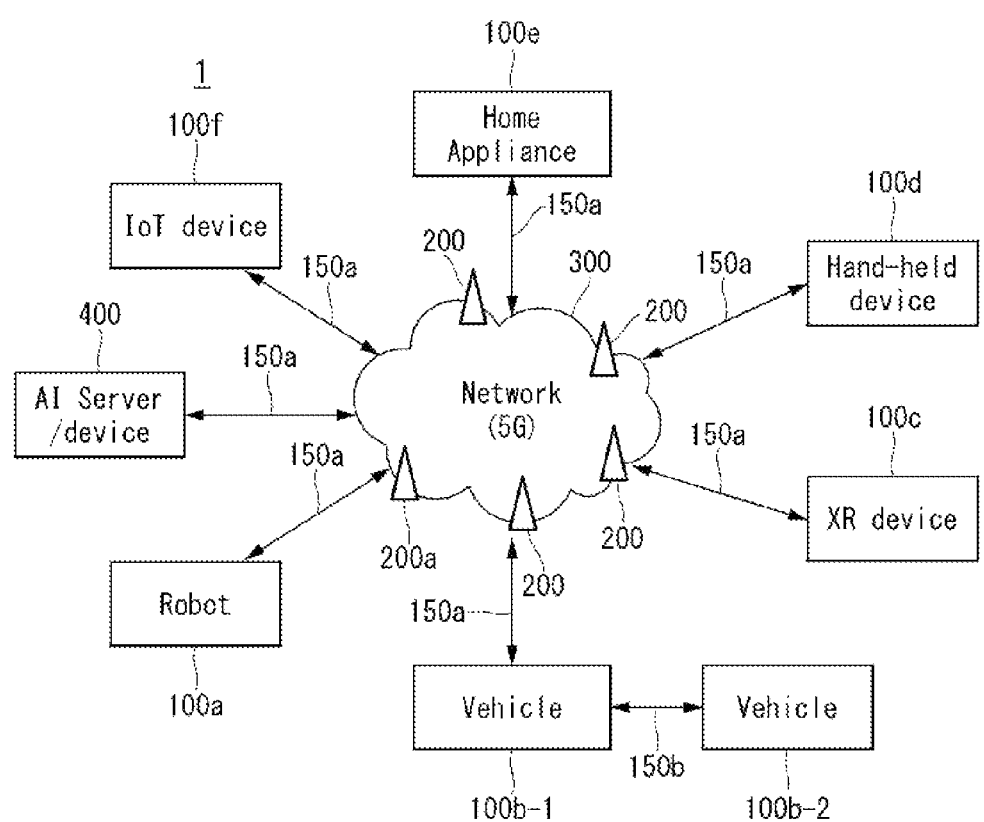
FIG. 22 illustrates a communication system 1 applied to the present disclosure.

FIG. 22 illustrates a communication system 1 applied to the present disclosure.

Referring to 22, a communication system 1 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/ 5G device. Although not limited thereto, the wireless device may include a robot 100a, vehicles 100b-1 and 100b-2, an eXtended Reality (XR) device 100c, a hand-held device 100d, a home appliance 100e, an Internet of Thing (IoT) device 100f, and an AI device/server 400. For example, the vehicle may include a vehicle with a wireless communication function, an autonomous vehicle, a vehicle capable of performing inter-vehicle communication, and the like. Further, the vehicle may include an unmanned aerial vehicle (UAV) (e.g., drone). The XR device may include an augmented reality (AR)/virtual reality (VR)/mixed reality (MR) device and may be implemented as a head-mounted device (HMD), a head-up display (HUD) provided in the vehicle, a television, a smart phone, a computer, a wearable device, a home appliance device, digital signage, a vehicle, a robot, etc. The hand-held device may include a smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even as the wireless device, and a specific wireless device 200a may operate as a base station/network node for other wireless devices.

The wireless devices 100a to 100f may be connected to a network 300 over a base station 200. An artificial intelligence (AI) technology may be applied to the wireless devices 100a to 100f, and the wireless devices 100a to 100f may be connected to an AI server 400 over the network 300. The network 300 may be comprised using a 3G network, a 4G (e.g., LTE) network, or a 5G (e.g., NR) network. The wireless devices 100a to 100f may communicate with each other over the base station 200/network 300, but may directly communicate with each other without going through the base station/network (sidelink communication). For example, the vehicles 100b-1 and 100b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 100a to 100f.

Wireless communications/connections 150a, 150b, and 150c may be made between the wireless devices 100a to 100f and the base station 200 and between the base station 200 and the base station 200. The wireless communication/connection may be made through various wireless access technologies (e.g., 5G NR) such as uplink/downlink communication 150a, sidelink communication 150b (or D2D communication), and inter-base station communication 150c (e.g., relay, integrated access backhaul (IAB)). The wireless device and the base station/the wireless device and the base station and the base station may transmit/receive radio signals to/from each other through wireless communications/connections 150a, 150b, and 150c. For example, the wireless communications/connections 150a, 150b, and 150c may transmit/receive signals on various physical channels. To this end, based on various descriptions of the present disclosure, at least some of various configuration information setting processes, various signal processing processes (e.g., channel encoding/decoding, modulation/demodulation, resource mapping/de-mapping, etc.), a resource allocation process, etc. for transmission/reception of the radio signal may be performed.

Example of Wireless Device to which the Present Disclosure is Applied

Figure 23:
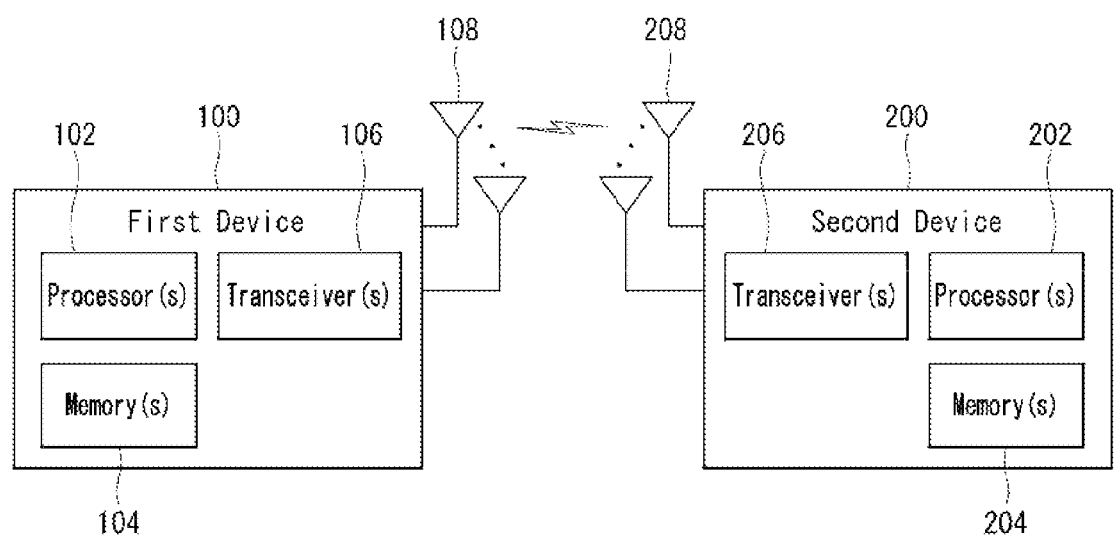
FIG. 23 illustrates a wireless device applicable to the present disclosure.

FIG. 23 illustrates a wireless device applicable to the present disclosure.

Referring to FIG. 23, a first wireless device 100 and a second wireless device 200 may transmit/receive radio signals through various wireless access technologies (e.g., LTE and NR). The first wireless device 100 and the second wireless device 200 may correspond to a wireless device 100x and a base station 200 and/or a wireless device 100x and a wireless device 100x of FIG. 22.

The first wireless device 100 may include one or more processors 102 and one or more memories 104 and may further include one or more transceivers 106 and/or one or more antennas 108. The processor 102 may control the memory 104 and/or the transceiver 106 and may be configured to implement descriptions, functions, procedures, proposals, methods, and/or operation flows described in the present disclosure. For example, the processor 102 may process information in the memory 104 and generate first information/signal and then transmit a radio signal including the first information/signal through the transceiver 106. Further, the processor 102 may receive a radio signal including second information/signal through the transceiver 106 and then store in the memory 104 information obtained from signal processing of the second information/signal. The memory 104 may be connected to the processor 102 and store various information related to an operation of the processor 102. For example, the memory 104 may store a software code including instructions for performing some or all of processes controlled by the processor 102 or performing the descriptions, functions, procedures, proposals, methods, and/or operation flowcharts described in the present disclosure. The processor 102 and the memory 104 may be a part of a communication modem/circuit/chip designed to implement the wireless communication technology (e.g., LTE and NR). The transceiver 106 may be connected to the processor 102 and may transmit and/or receive the radio signals through one or more antennas 108. The transceiver 106 may include a transmitter and/or a receiver. The transceiver 106 may be mixed with a radio frequency (RF) unit. In the present disclosure, the wireless device may mean the communication modem/circuit/chip.

The second wireless device 200 may include one or more processors 202 and one or more memories 204 and may further include one or more transceivers 206 and/or one or more antennas 208. The processor 202 may control the memory 204 and/or the transceiver 206 and may be configured to implement descriptions, functions, procedures, proposals, methods, and/or operation flows described in the present disclosure. For example, the processor 202 may process information in the memory 204 and generate third information/signal and then transmit a radio signal including the third information/signal through the transceiver 206. Further, the processor 202 may receive a radio signal including fourth information/signal through the transceiver 206 and then store in the memory 204 information obtained from signal processing of the fourth information/signal. The memory 204 may be connected to the processor 202 and store various information related to an operation of the processor 202. For example, the memory 204 may store a software code including instructions for performing some or all of processes controlled by the processor 202 or performing the descriptions, functions, procedures, proposals, methods, and/or operation flowcharts described in the present disclosure. The processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver, and the transceiver 206 may be mixed with the RF unit. In the present disclosure, the wireless device may mean the communication modem/circuit/chip.

Hereinafter, hardware elements of the wireless devices 100 and 200 will be described in more detail. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the descriptions, functions, procedures, proposals, methods, and/or operation flowcharts described in the present disclosure. One or more processors 102 and 202 may generate a message, control information, data, or information according to the descriptions, functions, procedures, proposals, methods, and/or operation flowcharts described in the present disclosure. One or more processors 102 and 202 may generate a signal (e.g., a baseband signal) including the PDU, the SDU, the message, the control information, the data, or the information according to the function, the procedure, the proposal, and/or the method described in the present disclosure and provide the generated signal to one or more transceivers 106 and 206. One or more processors 102 and 202 may receive the signal (e.g. baseband signal) from one or more transceivers 106 and 206 and acquire the PDU, the SDU, the message, the control information, the data, or the information according to the descriptions, functions, procedures, proposals, methods, and/or operation flowcharts described in the present disclosure.

One or more processors 102 and 202 may be referred to as a controller, a microcontroller, a microprocessor, or a microcomputer. One or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 102 and 202. The descriptions, functions, procedures, proposals, and/or operation flowcharts described in the present disclosure may be implemented by using firmware or software and the firmware or software may be implemented to include modules, procedures, functions, and the like. Firmware or software configured to perform the descriptions, functions, procedures, proposals, and/or operation flowcharts described in the present disclosure may be included in one or more processors 102 and 202 or stored in one or more memories 104 and 204 and driven by one or more processors 102 and 202. The descriptions, functions, procedures, proposals, and/or operation flowcharts described in the present disclosure may be implemented by using firmware or software in the form of a code, the instruction and/or a set form of the instruction.

One or more memories 104 and 204 may be connected to one or more processors 102 and 202 and may store various types of data, signals, messages, information, programs, codes, indications and/or instructions. One or more memories 104 and 204 may be comprised of a ROM, a RAM, an EPROM, a flash memory, a hard drive, a register, a cache memory, a computer reading storage medium and/or a combination thereof. One or more memories 104 and 204 may be positioned inside and/or outside one or more processors 102 and 202. Further, one or more memories 104 and 204 may be connected to one or more processors 102 and 202 through various technologies such as wired or wireless connection.

One or more transceivers 106 and 206 may transmit to one or more other devices user data, control information, a wireless signal/channel, etc., mentioned in the methods and/or operation flowcharts of the present disclosure. One or more transceivers 106 and 206 may receive from one or more other devices user data, control information, a wireless signal/channel, etc., mentioned in the descriptions, functions, procedures, proposals, methods, and/or operation flowcharts described in the present disclosure. For example, one or more transceivers 106 and 206 may be connected to one or more processors 102 and 202 and transmit and receive the radio signals. For example, one or more processors 102 and 202 may control one or more transceivers 106 and 206 to transmit the user data, the control information, or the radio signal to one or more other devices. Further, one or more processors 102 and 202 may control one or more transceivers 106 and 206 to receive the user data, the control information, or the radio signal from one or more other devices. Further, one or more transceivers 106 and 206 may be connected to one or more antennas 108 and 208, and one or more transceivers 106 and 206 may be configured to transmit and receive the user data, control information, wireless signal/channel, etc., mentioned in the descriptions, functions, procedures, proposals, methods, and/or operation flowcharts described in the present disclosure through one or more antennas 108 and 208. In the present disclosure, one or more antennas may be a plurality of physical antennas or a plurality of logical antennas (e.g., antenna ports). One or more transceivers 106 and 206 may convert the received radio signal/channel from an RF band signal into a baseband signal, in order to process the received user data, control information, radio signal/channel, etc., using one or more processors 102 and 202. One or more transceivers 106 and 206 may convert the user data, control information, radio signal/channel, etc., processed using one or more processors 102 and 202, from the baseband signal into the RF band signal. To this end, one or more transceivers 106 and 206 may include an (analog) oscillator and/or filter.

Example of Signal Processing Circuit to which the Present Disclosure is Applied

Figure 24:
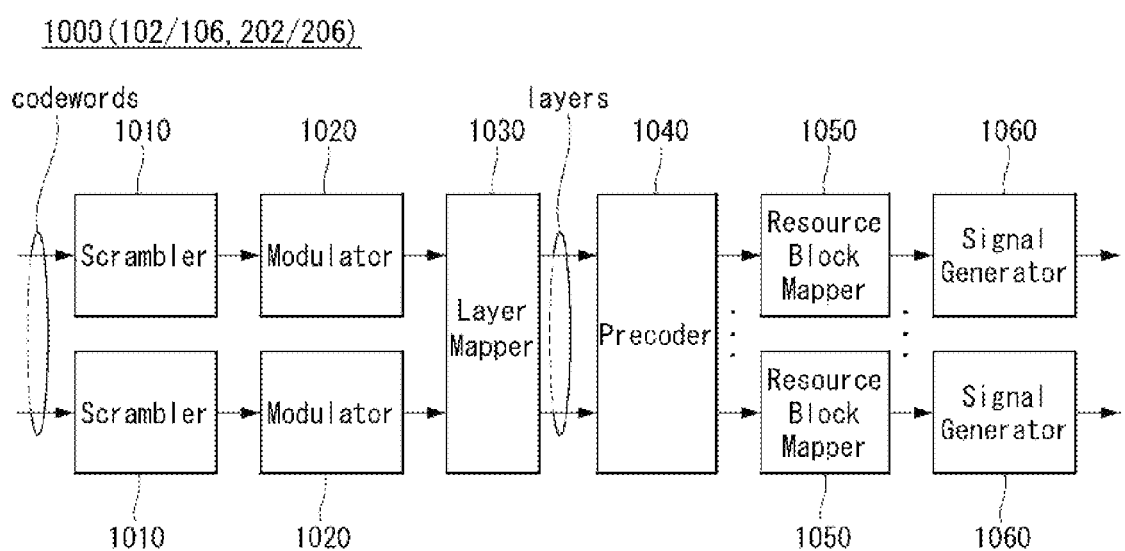
FIG. 24 illustrates a signal processing circuit for a transmission signal.

FIG. 24 illustrates a signal processing circuit for a transmission signal.

Referring to FIG. 24 a signal processing circuit 1000 may include a scrambler 1010, a modulator 1020, a layer mapper 1030, a precoder 1040, a resource mapper 1050, and a signal generator 1060. Although not limited thereto, an operation/function of FIG. 24 may be performed by the processors 102 and 202 and/or the transceivers 106 and 206 of FIG. 23. Hardware elements of FIG. 24 may be implemented in the processors 102 and 202 and/or the transceivers 106 and 206 of FIG. 23. For example, blocks 1010 to 1060 may be implemented in the processors 102 and 202 of FIG. 23. Further, blocks 1010 to 1050 may be implemented in the processors 102 and 202 of FIG. 23, and the block 1060 may be implemented in the transceivers 106 and 206 of FIG. 23.

A codeword may be transformed into a radio signal via the signal processing circuit 1000 of FIG. 24. The codeword is an encoded bit sequence of an information block. The information block may include transport blocks (e.g., a UL-SCH transport block, a DL-SCH transport block, etc.). The radio signal may be transmitted on various physical channels (e.g., PUSCH, PDSCH, etc).

Specifically, the codeword may be transformed into a bit sequence scrambled by the scrambler 1010. A scramble sequence used for scrambling may be generated based on an initialization value, and the initialization value may include ID information, etc. of a wireless device. The scrambled bit sequence may be modulated into a modulated symbol sequence by the modulator 1020. A modulation scheme may include pi/2-binary phase shift keying (BPSK), m-phase shift keying (PSK), m-quadrature amplitude modulation (QAM), etc. A complex modulated symbol sequence may be mapped to one or more transport layers by the layer mapper 1030. Modulated symbols of each transport layer may be mapped to a corresponding antenna port(s) by the precoder 1040 (precoding). An output z of the precoder 1040 may be obtained by multiplying an output y of the layer mapper 1030 by a precoding matrix W of N*M, where N is the number of antenna ports, and M is the number of transport layers. The precoder 1040 may perform precoding after performing transform precoding (e.g., DFT transform) on complex modulated symbols. Further, the precoder 1040 may perform the precoding without performing the transform precoding.

The resource mapper 1050 may map the modulated symbols of each antenna port to time-frequency resources. The time-frequency resources may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols, and the generated radio signal may be transmitted to another device over each antenna. To this end, the signal generator 1060 may include an inverse fast Fourier transform (IFFT) module, a cyclic prefix (CP) insertor, a digital-to-analog converter (DAC), a frequency uplink converter, and the like.

A signal processing process for a received signal in the wireless device may be configured in the reverse of the signal processing processes (1010 to 1060) of FIG. 24. For example, the wireless device (e.g., 100 and 200 of FIG. 23) may receive the radio signal from the outside through the antenna port/transceiver. The received radio signal may be converted into a baseband signal through a signal reconstructor. To this end, the signal reconstructor may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Figure 25:
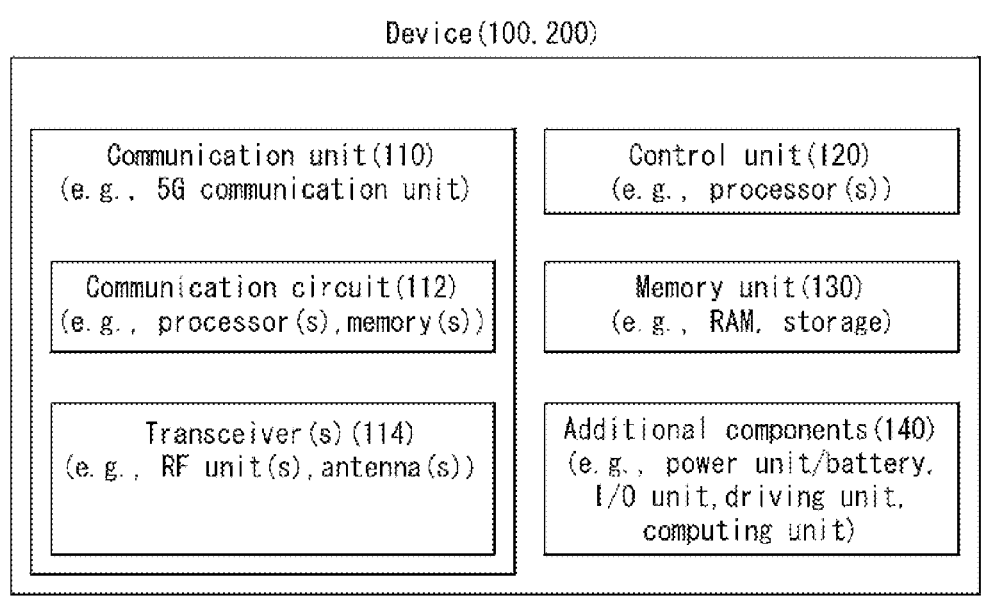
FIG. 25 illustrates another example of a wireless device applied to the present disclosure, and the wireless device can be implemented in various types according to use-example/service.

Utilization Example of Wireless Device to which the Present Disclosure is Applied FIG. 25 illustrates another example of a wireless device applied to the present disclosure. The wireless device may be implemented in various types of devices according to usage examples/services.

Referring to FIG. 25, wireless devices 100 and 200 may correspond to the wireless devices 100 and 200 of FIG. 23 and may be comprised of various elements, components, units, and/or modules. For example, the wireless devices 100 and 200 may include a communication unit 110, a control unit 120, and a memory unit 130, and an additional element 140. The communication unit may include a communication circuit 112 and a transceiver(s) 114. For example, the communication circuit 112 may include one or more processors 102 and 202 and/or one or more memories 104 and 204 of FIG. 23. For example, the transceiver(s) 114 may include one or more transceivers 106 and 206 and/or one or more antennas 108 and 208 of FIG. 23. The control unit 120 is electrically connected to the communication unit 110, the memory unit 130, and the additional element 140 and controls an overall operation of the wireless device. For example, the control unit 120 may an electrical/mechanical operation of the wireless device based on a program/code/instruction/information stored in the memory unit 130. Further, the control unit 120 may transmit the information stored in the memory unit 130 to the outside (e.g., other communication devices) through the communication unit 110 via a wireless/wired interface, or store information received from the outside (e.g., other communication devices) via the wireless/wired interface through the communication unit 110.

The additional element 140 may be variously configured according to the type of wireless device. For example, the additional element 140 may include at least one of a power unit/battery, an input/output (I/O) unit, a driving unit, and a computing unit. Although not limited thereto, the wireless device may be implemented as a form such as the robot 100a of FIG. 22, the vehicles 100b-1 and 100b-2 of FIG. 22, the XR device 100c of FIG. 22, the portable device 100d of FIG. 22, the home appliance 100e of FIG. 22, the IoT device 100f of FIG. 22, a digital broadcasting terminal, a hologram device, a public safety device, an MTC device, a medical device, a FinTech device (or financial device), a security device, a climate/environment device, an AI server/device 400 of FIG. 22, the base station 200 of FIG. 22, a network node, etc. The wireless device may be movable or may be used at a fixed place according to use examples/services.

In FIG. 25, all of various elements, components, units, and/or modules in the wireless devices 100 and 200 may be interconnected via the wired interface or at least may be wirelessly connected through the communication unit 110. For example, the control unit 120 and the communication 110 in the wireless devices 100 and 200 may be wiredly connected and the control unit 120 and the first unit (e.g., 130 or 140) may be wirelessly connected through the communication unit 110. Further, each element, component, unit, and/or module in the wireless devices 100 and 200 may further include one or more elements. For example, the control unit 120 may be constituted by one or more processor sets. For example, the control unit 120 may be configured a set of a communication control processor, an application processor, an electronic control unit (ECU), a graphic processing processor, a memory control processor, etc. As another example, the memory unit 130 may be configured as a random access memory (RAM), a dynamic RAM (DRAM), a read only memory (ROM), a flash memory, a volatile memory, a non-volatile memory, and/or combinations thereof.

Example of Portable Device to which the Present Disclosure is Applied

Figure 26:
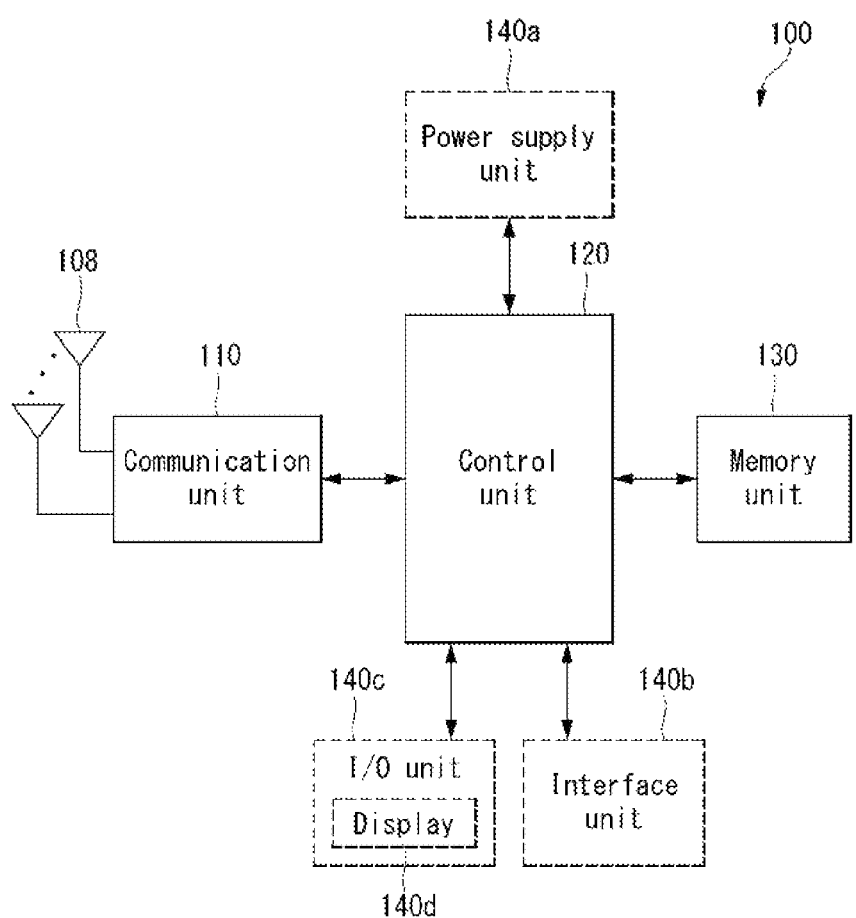
FIG. 26 illustrates a portable device applied to the present disclosure.

FIG. 26 illustrates a portable device applied to the present disclosure.

The portable device may include a smart phone, a smart pad, a wearable device (e.g., a smart watch, a smart glass), and a portable computer (e.g., a notebook, etc.). The portable device may be referred to as a mobile station (MS), a user terminal (UT), a mobile subscriber station (MSS), a subscriber station (SS), an advanced mobile station (AMS), or a wireless terminal (WT).

Referring to FIG. 26, a portable device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 25, respectively.

The communication unit 110 may transmit/receive a signal (e.g., data, a control signal, etc.) to/from other wireless devices and base stations. The control unit 120 may perform various operations by controlling components of the portable device 100. The control unit 120 may include an application processor (AP). The memory unit 130 may store data/parameters/programs/codes/instructions required for driving the portable device 100. Further, the memory unit 130 may store input/output data/information, etc. The power supply unit 140a may supply power to the portable device 100 and include a wired/wireless charging circuit, a battery, and the like. The interface unit 140b may support a connection between the portable device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display 140d, a speaker, and/or a haptic module.

For example, in the case of data communication, the input/output unit 140c may acquire information/signal (e.g., touch, text, voice, image, video, etc.) input from the user, and the acquired information/signal may be stored in the memory unit 130. The communication unit 110 may transform the information/signal stored in the memory into the radio signal and directly transmit the radio signal to another wireless device or transmit the radio signal to the base station. Further, the communication unit 110 may receive the radio signal from another wireless device or base station and then reconstruct the received radio signal into original information/signal. The reconstructed information/signal may be stored in the memory unit 130 and then output in various forms (e.g., text, voice, image, video, haptic) through the input/output unit 140c.

INDUSTRIAL APPLICABILITY

Although the present disclosure has been described focusing on examples applying to the 3GPP LTE/LTE-A/NR system, it can be applied to various wireless communication systems other than the 3GPP LTE/LTE-A/NR system.

The invention claimed is:

1. A method for transmitting, by a base station, a feedback in a narrowband (NB)-Internet of Things (IoT) system, the method comprising:
transmitting, to a user equipment (UE), a preconfigured uplink (UL) resource (PUR) configuration via radio resource control (RRC) signaling;
receiving, from the UE in an idle mode, uplink data on the PUR ending in subframe n; and
transmitting, to the UE, Downlink Control Information (DCI) related to a feedback for the uplink data through a narrowband physical downlink control channel (DCCH) in a feedback window whose a starting subframe is a Downlink (DL) subframe after 4 DL subframes from the subframe n, such that monitoring of the UE for the feedback window is stopped after the transmission of the DCI,
wherein a first state of a specific field included in the DCI is related to the feedback, and a second state of the specific field is related to a fallback indication for the UE.

2. The method of claim 1, wherein the DCI related to the feedback for the uplink data is transmitted on a carrier based on the PUR configuration.

3. A method for receiving, by a user equipment (UE), a feedback in a narrowband (NB)-Internet of Things (IoT) system, the method comprising:
receiving, from a base station, a preconfigured uplink (UL) resource (PUR) configuration via radio resource control (RRC) signaling;
while in an idle mode, transmitting, to the base station, uplink data on the PUR ending in subframe n; and
receiving, from the base station, Control Information (DCI) related to a feedback for the uplink data through a narrowband physical downlink control channel (NPDCCH) in a feedback window whose a starting subframe is a Downlink (DL) subframe after 4 DL subframes from the subframe n, such that monitoring of the UE for the feedback window is stopped after the transmission of the DCI, wherein a first state of a specific field included in the DCI is related to the feedback, and a second state of the specific field is related to a fallback indication for the UE.

4. The method of claim 3, wherein the DCI related to the feedback for the uplink data is transmitted on a carrier based on the PUR configuration.

5. A base station transmitting a feedback in a narrowband (NB)-Internet of Things (IoT) system, the base station comprising:

a radio frequency (RF) module configured to transmit and receive a radio signal; and a processor functionally connected to the RF module, wherein the processor is configured to:

transmit, to a user equipment (UE) a preconfigured uplink (UL) resource (PUR) configuration via radio resource control (RRC) signaling;

receive, from the UE in an idle mode, uplink data on the PUR ending in subframe n; and transmit, to the UE, Downlink Control Information (DCI) related to a feedback for the uplink data through a narrowband physical downlink control channel (NPDCCH) in a feedback window whose a starting subframe is a Downlink (DL) subframe after 4 DL subframes from the subframe n, such that monitoring of the UE for the feedback window is stopped after the transmission of the DCI, wherein a first state of a specific field included in the DCI is related to the feedback, and a second state of the specific field is related to a fallback indication for the UE.

6. The base station of claim 5, wherein the DCI related to the feedback for the uplink data is transmitted on a carrier based on the PUR configuration.

7. A user equipment (UE) receiving a feedback in a narrowband (NB)-Internet of Things (IoT) system, the UE comprising:

a radio frequency (RF) module configured to transmit and receive a radio signal; and a processor functionally connected to the RF module, wherein the processor is configured to:

receive, from a base station, a preconfigured uplink (UL) resource (PUR) configuration via radio resource control (RRC) signaling;

while in an idle mode, transmit, to the base station, uplink data on the PUR ending in subframe n; and receive, from the base station, Downlink Control Information (DCI) related to a feedback for the uplink data through a narrowband physical downlink control channel (NPDCCH) in a feedback window whose a starting subframe is a Downlink (DL) subframe after 4 DL subframes from the subframe n, such that monitoring of the UE for the feedback window is stopped after the transmission of the DCI, wherein a first state of a specific field included in the DCI is related to the feedback, and a second state of the specific field is related to a fallback indication for the UE.

8. The UE of claim 7, wherein the DCI related to the feedback for the uplink data is transmitted on a carrier based on the PUR configuration.

* * * * *